(12) United States Patent
Mavinahally et al.

(10) Patent No.: US 9,856,819 B2
(45) Date of Patent: Jan. 2, 2018

(54) PISTON AND CYLINDER FOR TWO-STROKE ENGINE

(71) Applicants: Nagesh Siddabasappa Mavinahally, Granada Hills, CA (US); Vinayaka Shanmukhappa Mavinahalli, Shanivarasanthe (IN)

(72) Inventors: Nagesh Siddabasappa Mavinahally, Granada Hills, CA (US); Vinayaka Shanmukhappa Mavinahalli, Shanivarasanthe (IN)

( * ) Notice: Subject to any disclaimer, the term of this patent is extended or adjusted under 35 U.S.C. 154(b) by 230 days.

(21) Appl. No.: 14/604,753

(22) Filed: Jan. 26, 2015

(65) Prior Publication Data

US 2015/0219007 A1    Aug. 6, 2015

Related U.S. Application Data

(60) Provisional application No. 61/934,843, filed on Feb. 2, 2014, provisional application No. 61/948,564, filed
(Continued)

(51) Int. Cl.
*F02F 3/20* (2006.01)
*F02B 33/44* (2006.01)
(Continued)

(52) U.S. Cl.
CPC .............. *F02F 3/20* (2013.01); *F02B 19/08* (2013.01); *F02B 19/16* (2013.01); *F02B 23/10* (2013.01);
(Continued)

(58) Field of Classification Search
CPC ............ F02B 33/44; F02B 19/08; F02B 19/16
See application file for complete search history.

(56) References Cited

U.S. PATENT DOCUMENTS 2,669,980 A    2/1954  Yarrington
3,340,854 A *  9/1967  Foster ..................... F02B 25/00
                                              123/257
(Continued)

*Primary Examiner* — Daniel J Colilla

(57) ABSTRACT

A two-stroke internal combustion engine includes at least one gaseous communication charge passage between a crankcase chamber and a combustion chamber of the engine and a piston to open and close the top end of the transfer passage. The air inlet port to the transfer passage for stratified scavenging is opened and closed by the piston that has passages and cutouts. The charge inlet to the crankcase chamber is opened and closed by the piston. The air inlet passage is substantially asymmetrical to the layout of the transfer passages and are closer to one transfer passage compared to the other. The internal air passage in the piston is substantially parallel to the piston pin and the single air inlet passage is laterally off-set from the air-fuel inlet passage. The transfer passages are cover by plates to make them closed passages having opening at the transfer port in the cylinder and opening in the crankcase chamber for periodical gaseous communication between the crankcase chamber and the combustion chamber. The cover plate is a single piece covering the transfer passage channel along the cylinder and the crankcase. The air channel in the piston is below the piston crown and at least portion is above the piston pin. A spiraling transfer passage in the cylinder cavity is longer than the length of the transfer passage in a conventional stratified two-stroke engine.

18 Claims, 32 Drawing Sheets

Related U.S. Application Data on Mar. 6, 2014, provisional application No. 61/950,198, filed on Mar. 9, 2014, provisional application No. 61/976,504, filed on Apr. 8, 2014, provisional application No. 62/077,238, filed on Nov. 9, 2014.

(51) Int. Cl.

| | | |
|---|---|---|
| *F02B 19/08* | (2006.01) | |
| *F02B 19/16* | (2006.01) | |
| *F02B 23/10* | (2006.01) | |
| *F02B 33/04* | (2006.01) | |
| *F02F 3/24* | (2006.01) | |
| *F02B 25/20* | (2006.01) | |
| *F02B 25/22* | (2006.01) | |
| *F02B 75/02* | (2006.01) | |
| *F02F 3/00* | (2006.01) | |

(52) U.S. Cl.
CPC ............ *F02B 25/20* (2013.01); *F02B 25/22* (2013.01); *F02B 33/04* (2013.01); *F02B 33/44* (2013.01); *F02F 3/24* (2013.01); *F02B 2023/108* (2013.01); *F02B 2075/025* (2013.01); *F02F 2003/0007* (2013.01); *Y02T 10/125* (2013.01)

(56) References Cited

U.S. PATENT DOCUMENTS

| | | | |
|---|---|---|---|
| 4,248,185 A * | 2/1981 | Jaulmes | F02B 25/20 123/65 A |
| 4,598,673 A * | 7/1986 | Poehlman | F01L 3/205 123/65 A |
| 4,821,787 A | 4/1989 | Swanson | |
| 4,995,349 A * | 2/1991 | Tuckey | F01P 1/02 123/323 |
| 5,134,976 A | 8/1992 | Towner et al. | |
| 5,379,732 A | 1/1995 | Mavinahally | |
| 6,112,708 A | 9/2000 | Sawada et al. | |
| 6,289,856 B1 | 9/2001 | Noguchi | |
| 6,367,432 B1 | 4/2002 | Araki | |
| 6,491,006 B2 | 12/2002 | Jonsson et al. | |
| 6,497,204 B1 | 12/2002 | Miyazaki et al. | |
| 6,564,760 B2 | 5/2003 | Laydera-Collins | |
| 6,848,399 B2 | 2/2005 | Watkins et al. | |
| 6,895,910 B2 | 5/2005 | Geyer et al. | |
| 6,901,892 B2 | 6/2005 | Mavinahally | |
| 6,973,899 B2 | 12/2005 | Warfel et al. | |
| 7,025,021 B1 | 4/2006 | Andersson et al. | |
| 7,093,570 B2 | 8/2006 | Mavinahally | |
| 7,210,433 B2 | 5/2007 | Mavinahally | |
| 7,331,276 B2 | 2/2008 | Schleßmann et al. | |
| 7,363,888 B2 | 4/2008 | Klimmek et al. | |
| 7,513,225 B2 | 4/2009 | Geyer et al. | |
| 2004/0244758 A1 | 12/2004 | Weng | |
| 2006/0037566 A1 | 2/2006 | Sugano | |
| 2011/0146641 A1* | 6/2011 | Kunert | F02B 25/02 123/65 P |
| 2011/0146642 A1* | 6/2011 | Geyer | B22C 9/10 123/73 PP |
| 2011/0146643 A1 | 6/2011 | Geyer et al. | |
| 2013/0263812 A1 | 10/2013 | Geyer et al. | |

\* cited by examiner

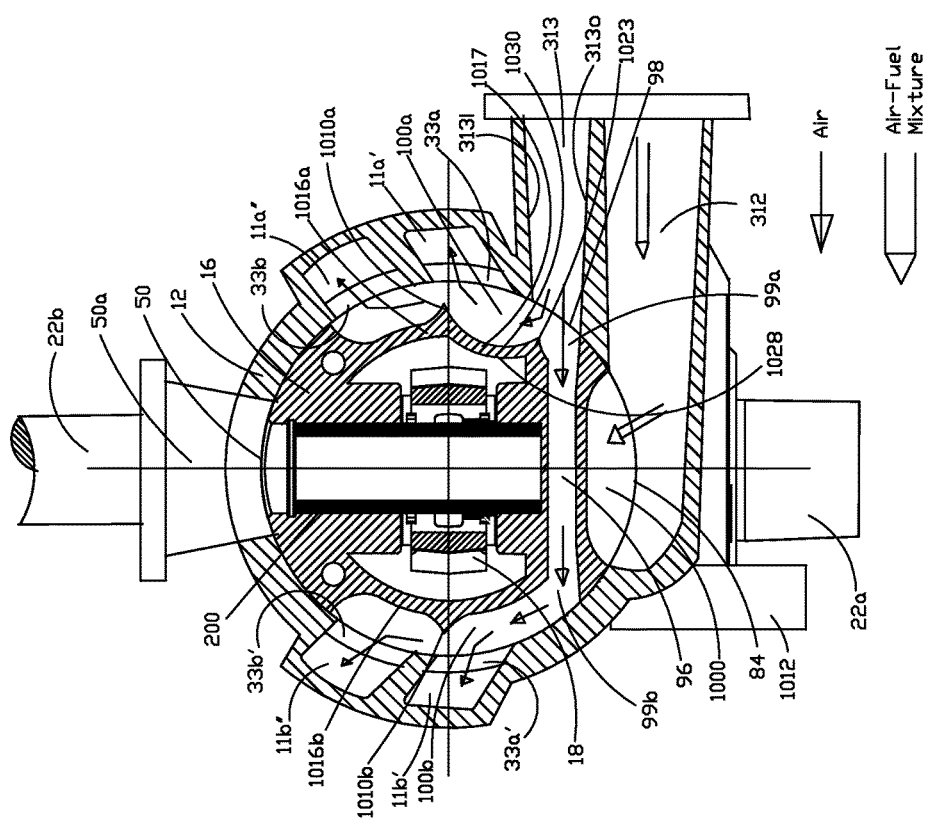
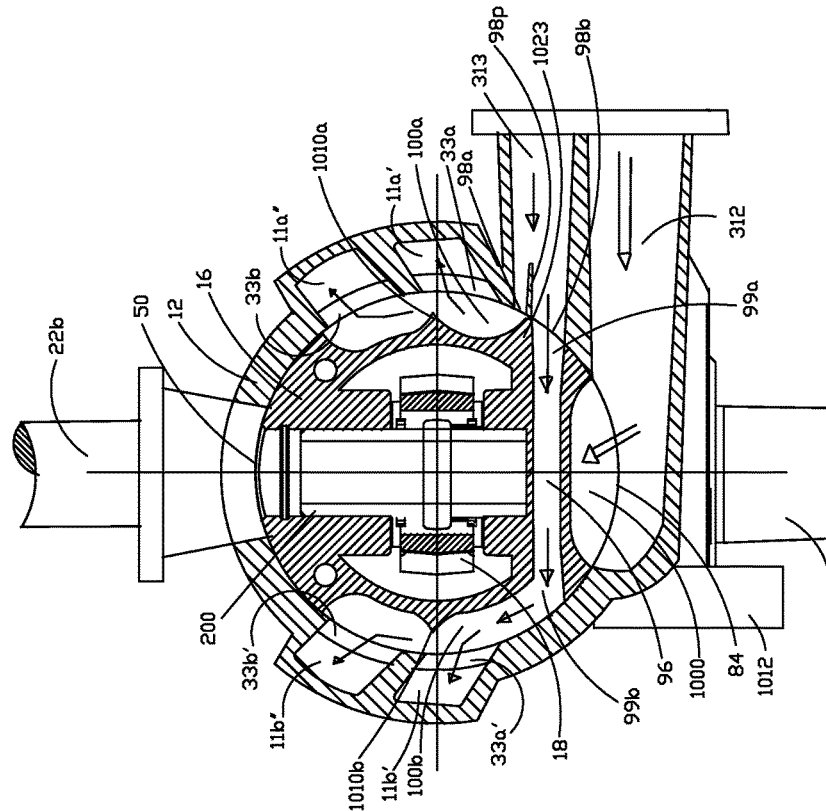

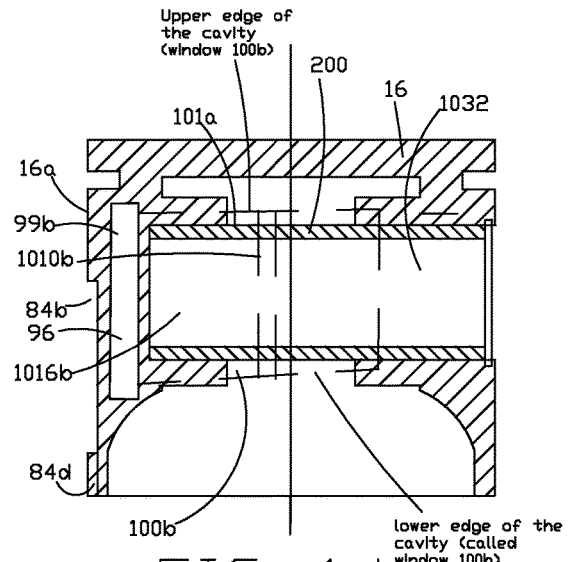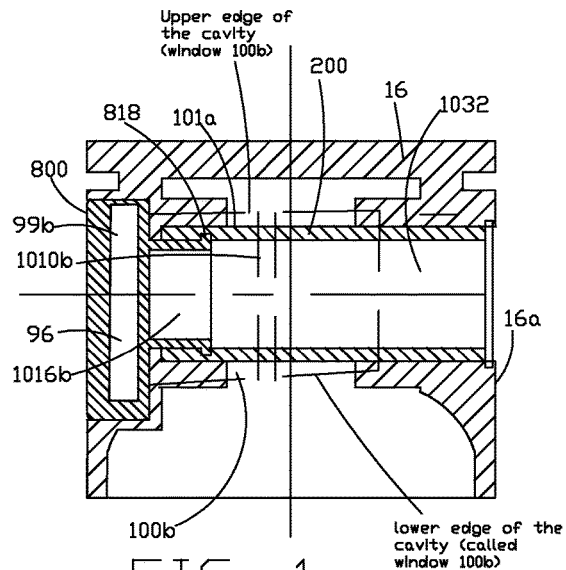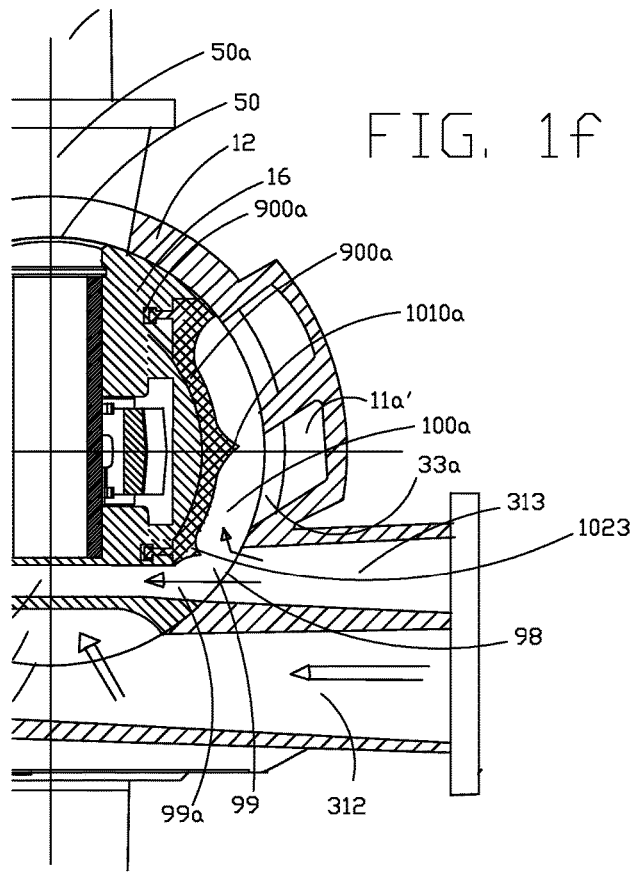

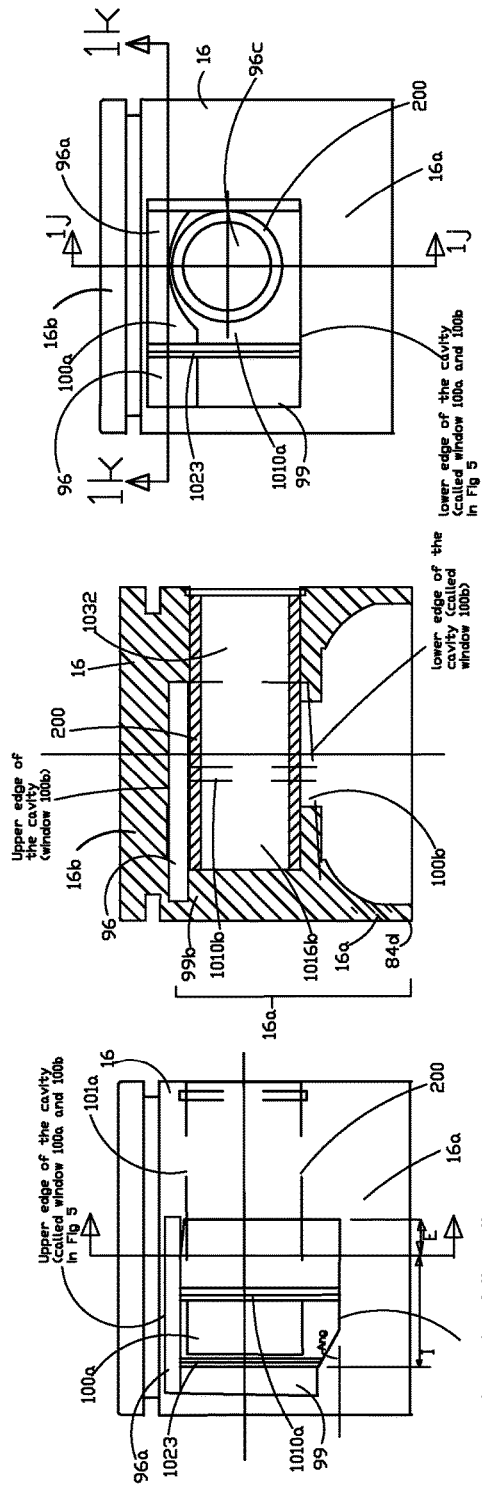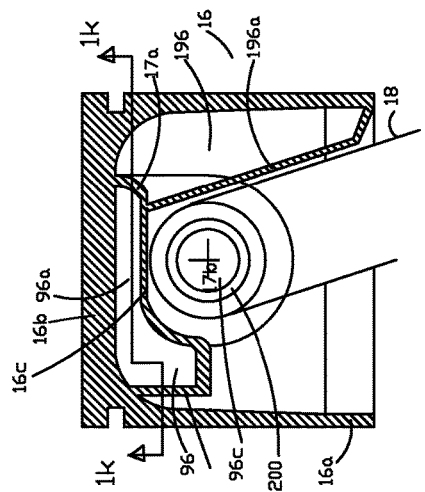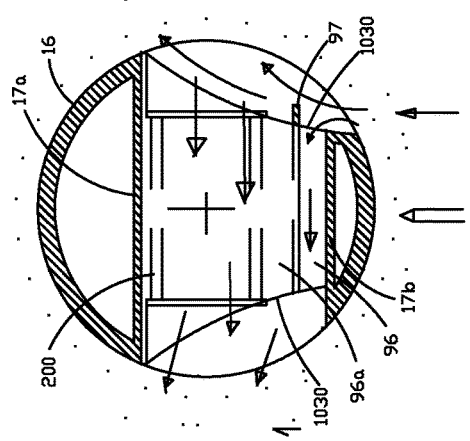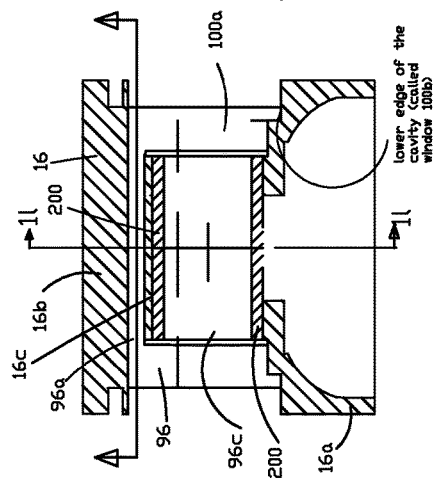

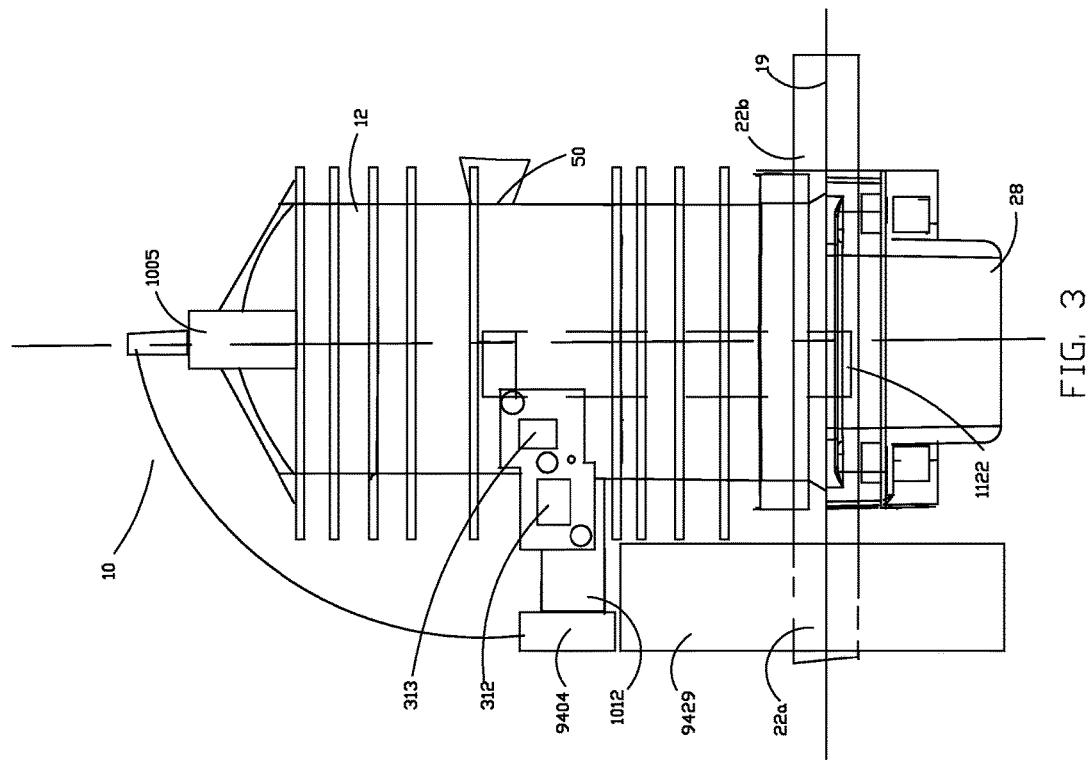
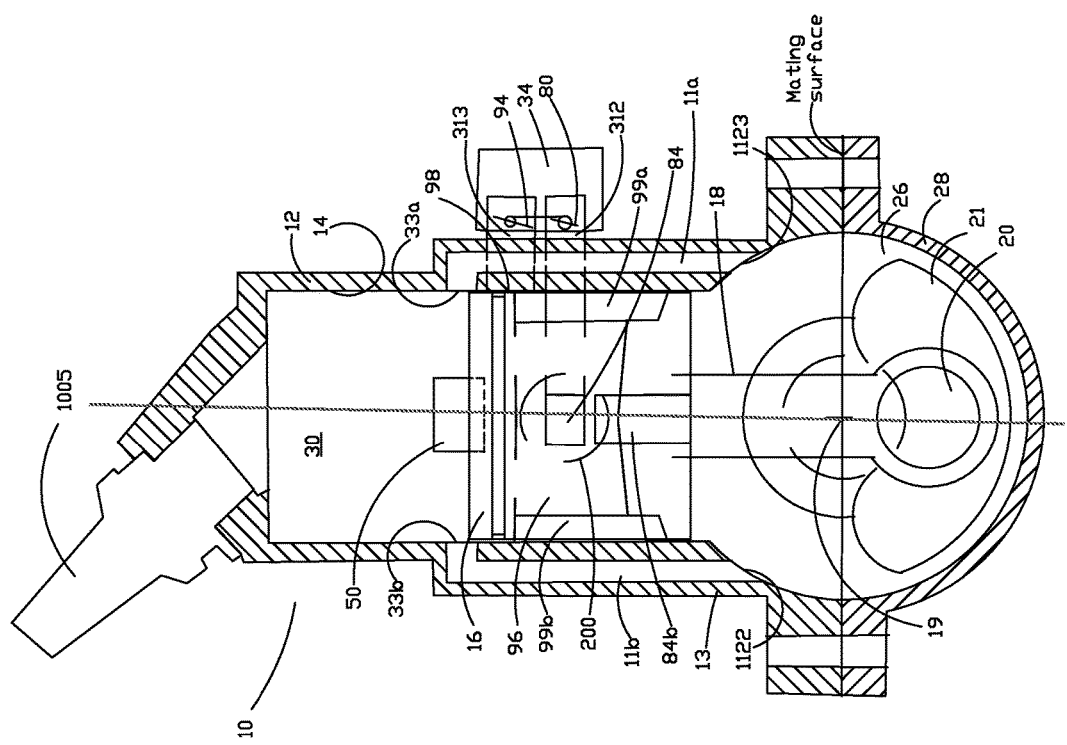

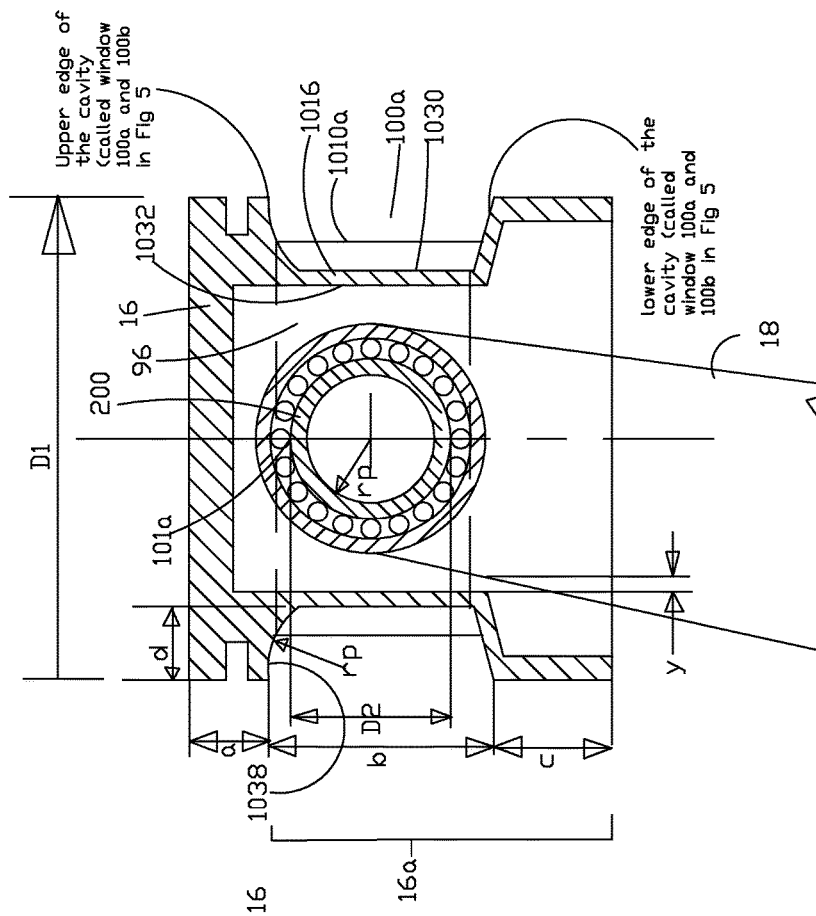
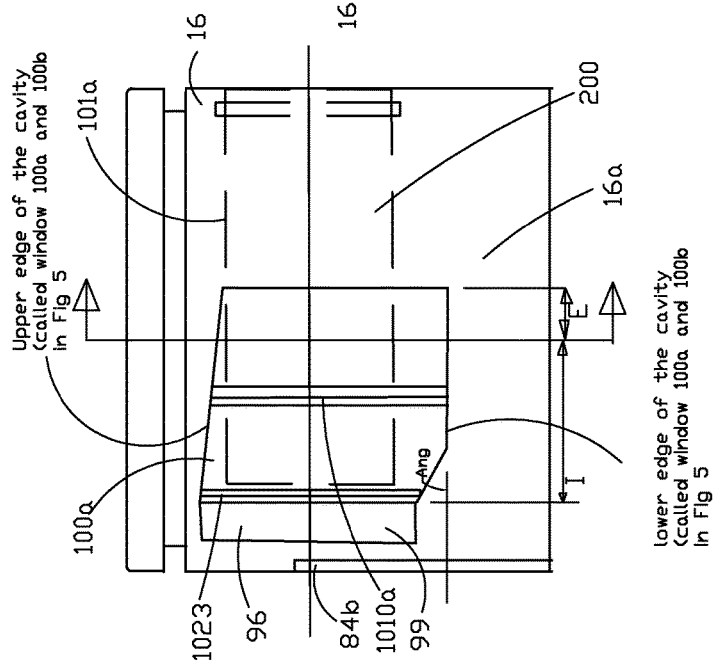

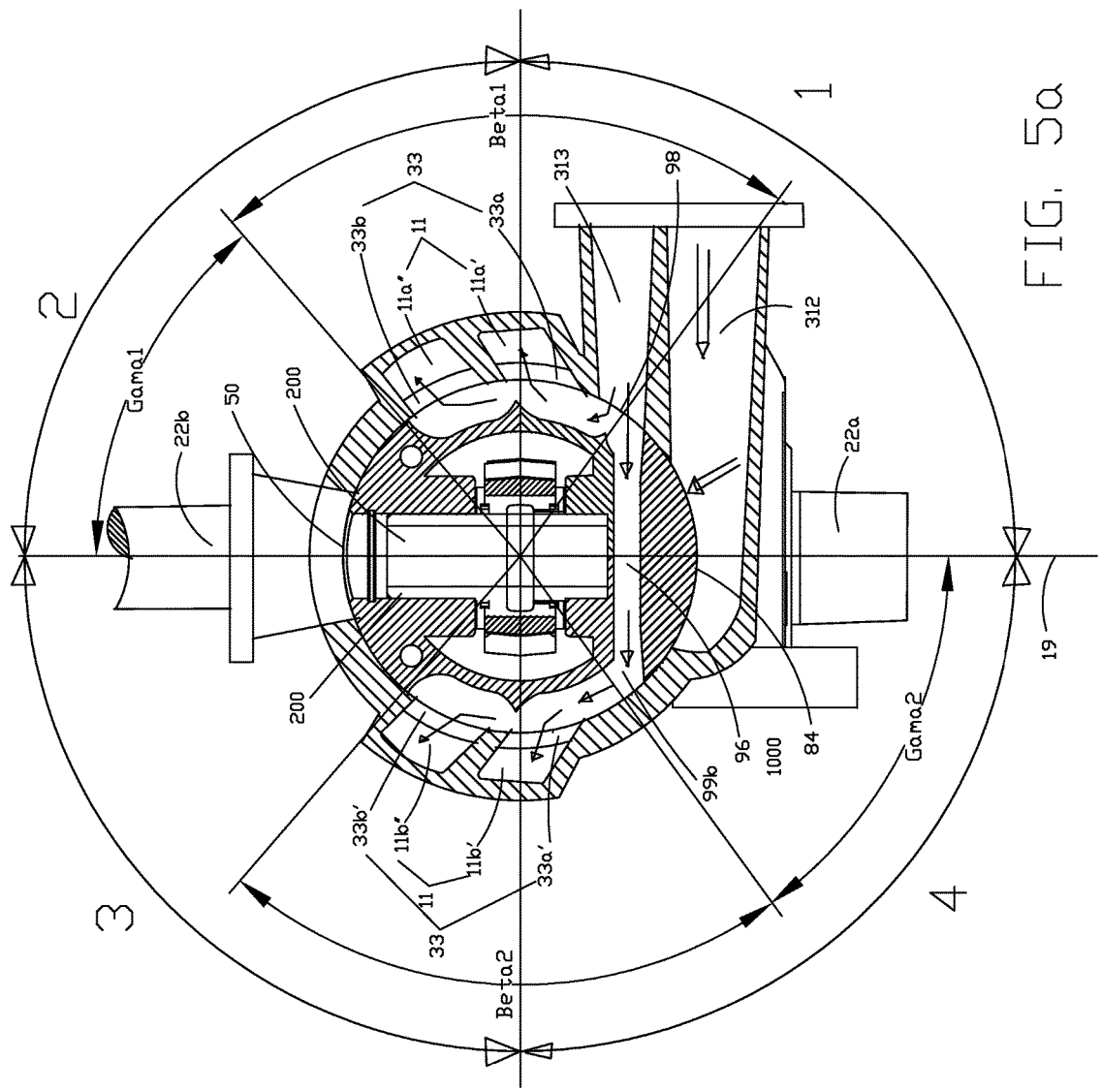

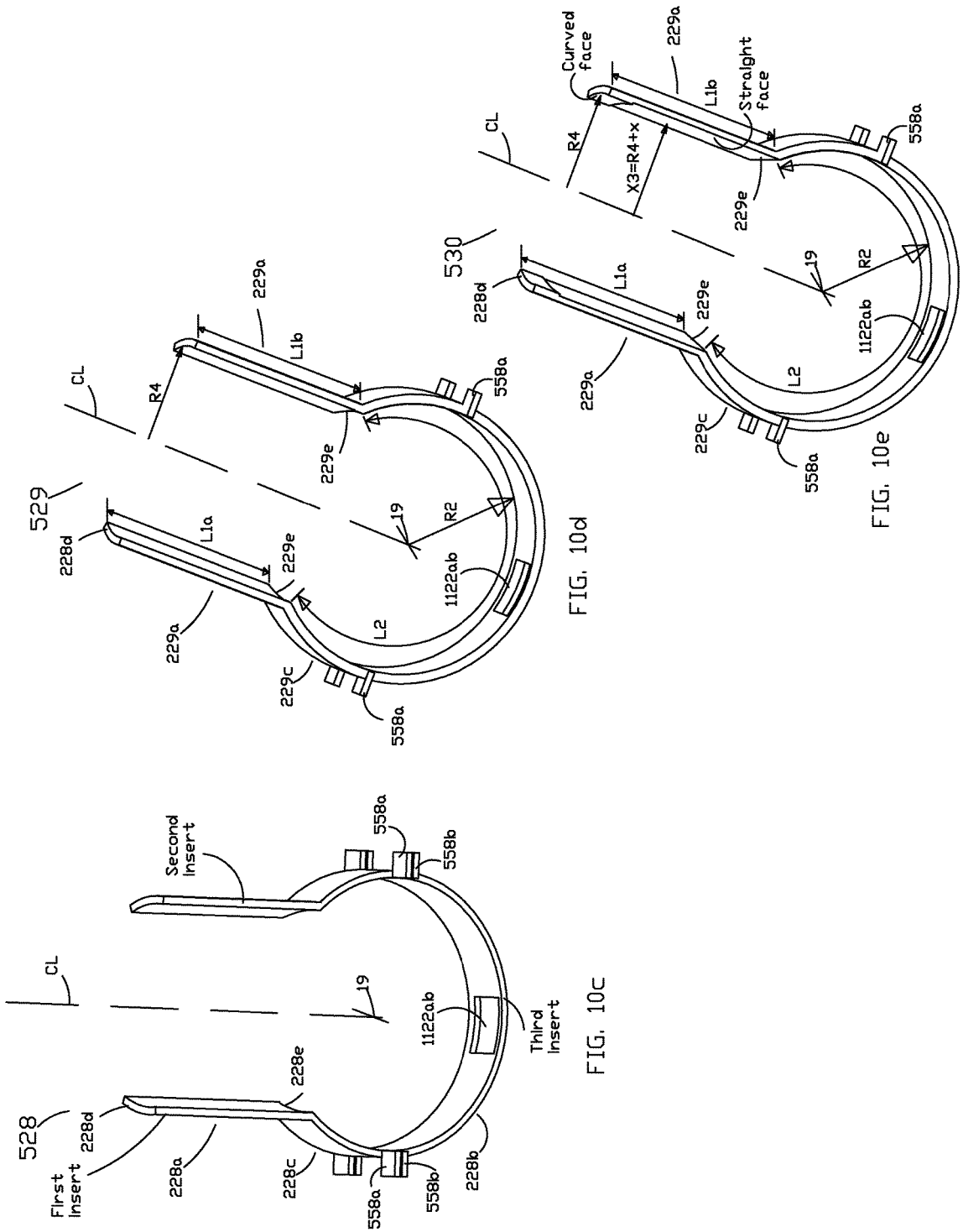

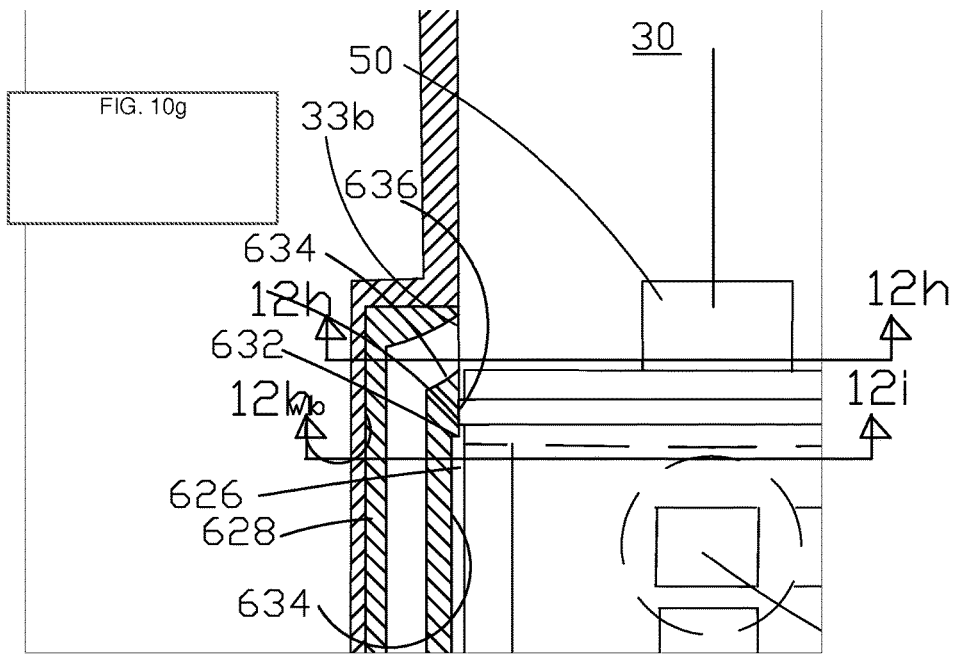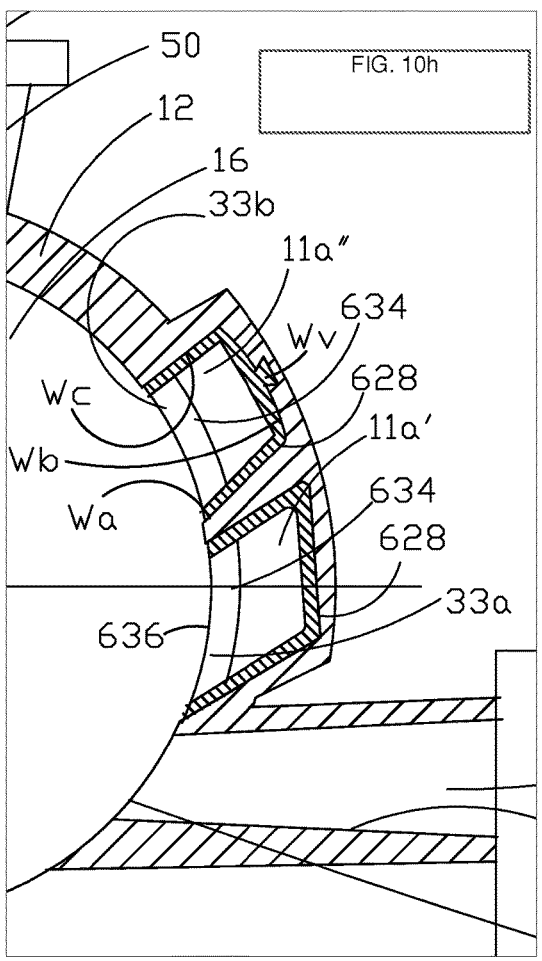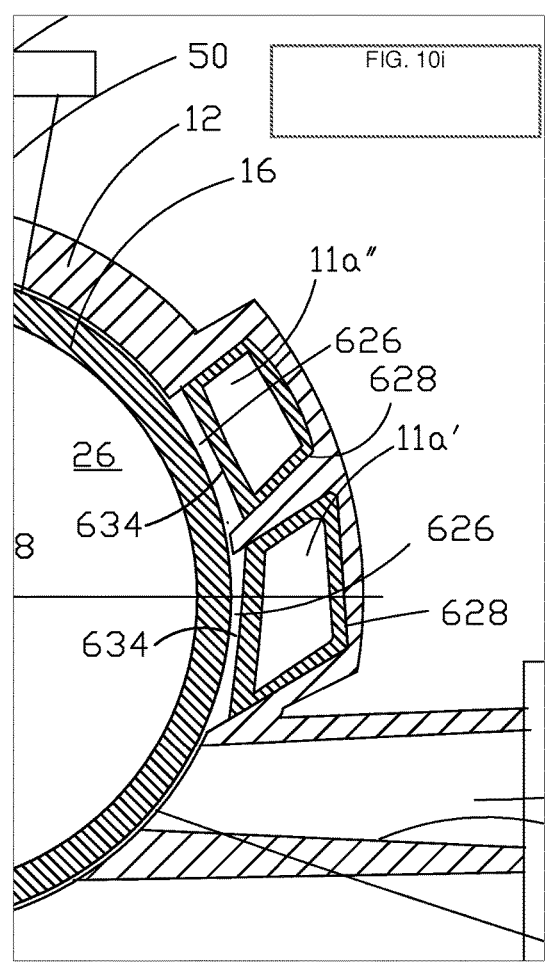

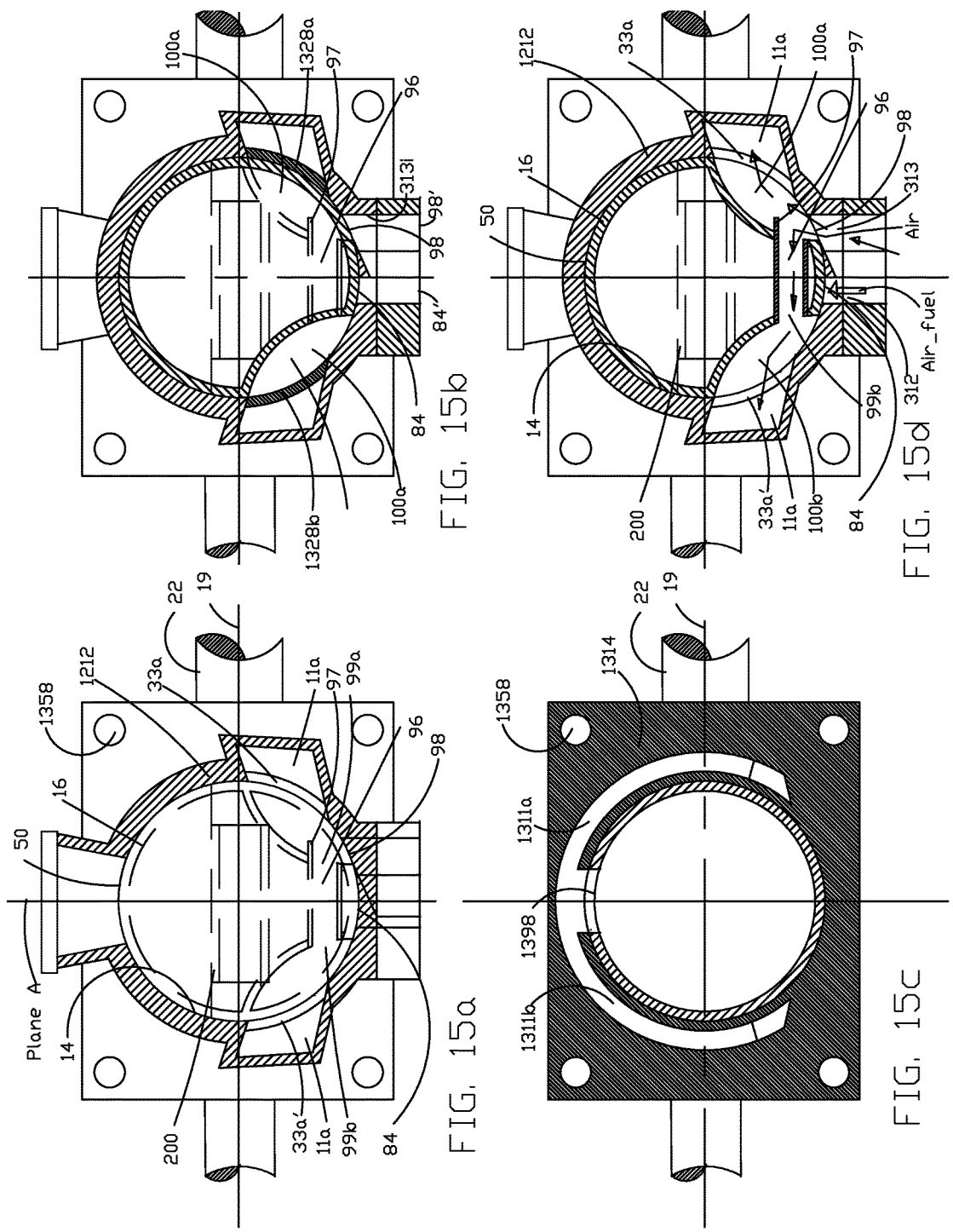

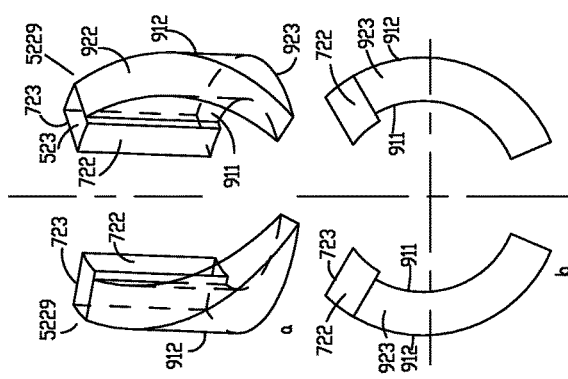
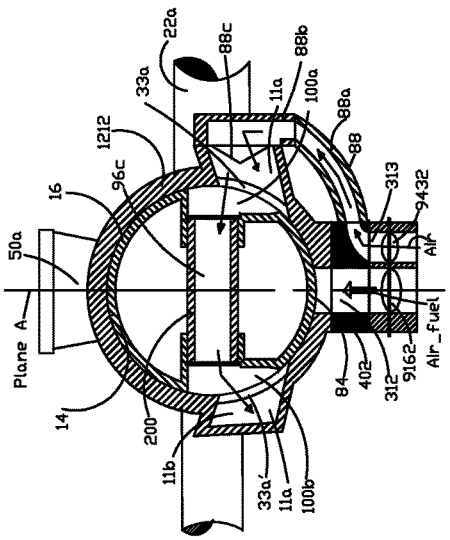
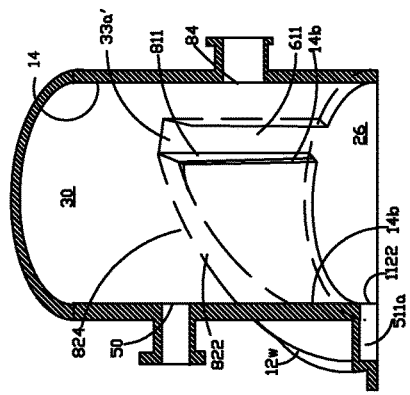
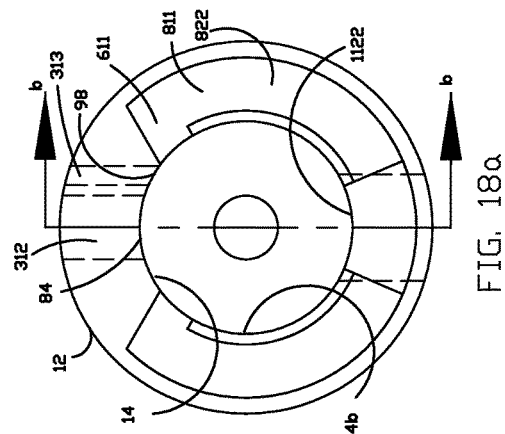
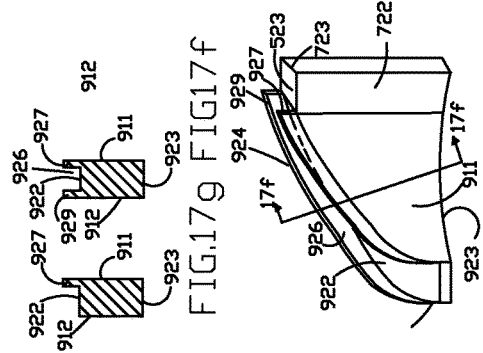
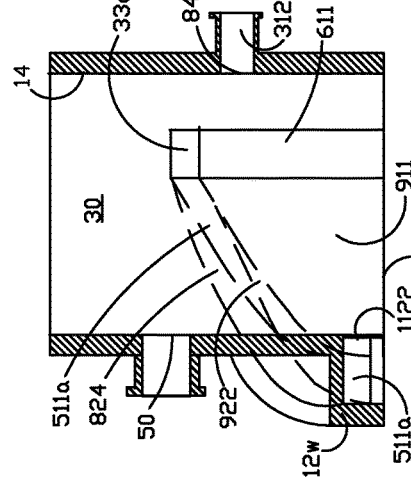

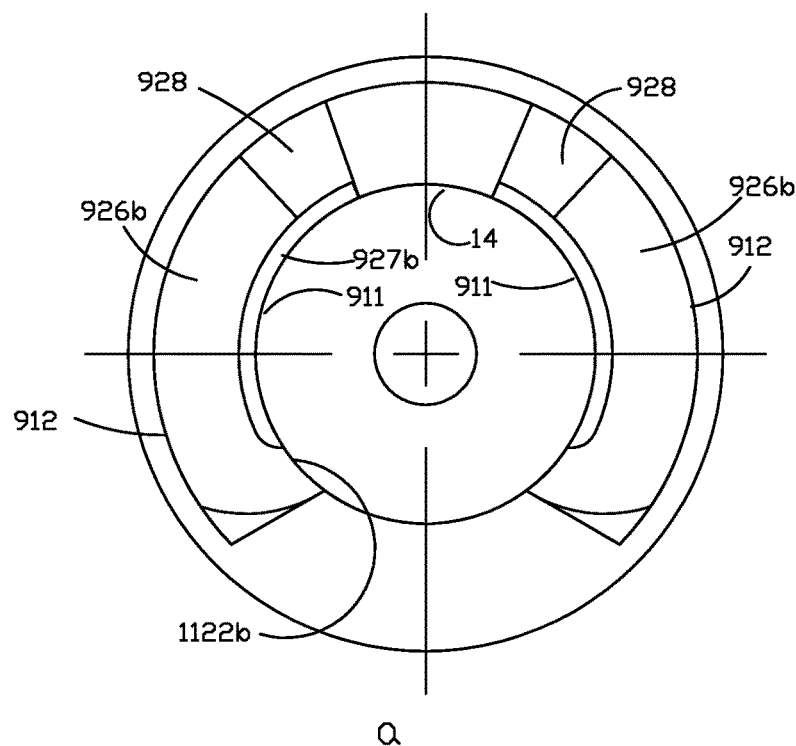
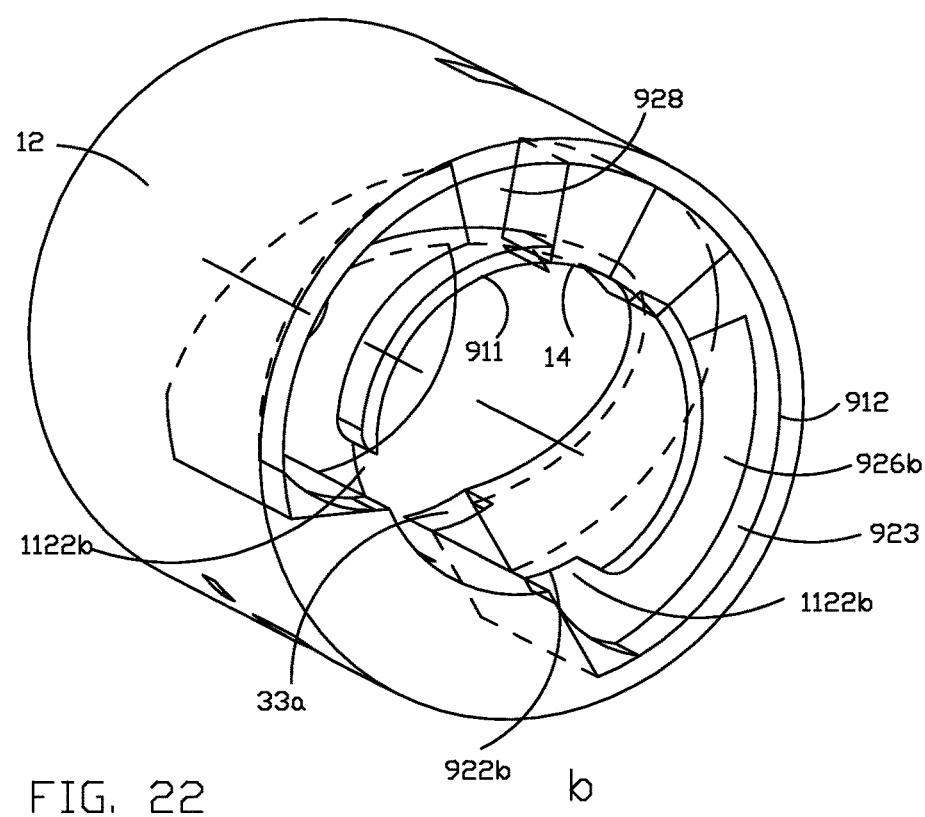
FIG. 22

PISTON AND CYLINDER FOR TWO-STROKE ENGINE

RELATED APPLICATIONS

The present application claims the benefit of priority of U.S. Provisional Patent application No. 61/934,843, filed Feb. 2, 2014, entitled "TWO-STROKE ENGINE", Provisional Patent application No. 61/948,564, filed Mar. 6, 2014, entitled "TWO-STROKE ENGINE", Provisional Patent application No. 61/950,198, filed Mar. 9, 2014, entitled "TWO-STROKE ENGINE", Provisional patent application No. 61/976,504, filed Apr. 8, 2014, entitled "Two-stroke engine cylinder and piston", and Provisional Patent application No. 60/772,38, filed Nov. 9, 2014, entitled "TWO-STROKE ENGINE PISTON AND SPIRAL TRANSFER PASSAGE" the entirety of which is incorporated by reference herein for all purposes the entirety of which is incorporated by reference herein for all purposes.

FIELD

Various embodiments relate to improvements to two-stroke internal combustion engines.

BACKGROUND

One drawback of the simple two-stroke engine is a loss of a portion of the fresh unburned fuel charge from the cylinder during the scavenging process. Several concepts and technologies have been proposed or tried to circumvent the short-circuit loss of fresh charge. Air-head scavenging systems disclosed in U.S. Pat. Nos. 4,821,787, 6,112,708, 7,210,433, and 6,367,432 describe reed valve controlled air passages in air-head scavenged two-stroke engines. U.S. Pat. Nos. 7,363,888, 6,973,899, 7,025,021, 6,895,910, 6,289,856, 7,331,276, 6,564,760, and 6,497,204 describe piston controlled air head scavenging. However, all have imitations to achieving the best and cost effective method of making the engine with best the location of the ports, geometry of cavity and passages in the piston, geometry of the transfer passages in the cylinder. And also have limitations with respect to the crankshaft do not meet the configuration necessary to have the exhaust port in line with the crankshaft as packaged by, for example, Echo brand chainsaw. Secondly, the inlet of air requires dual ports to supply air to transfer passages on either side of the exhaust port. The U.S. Pat. Nos. 7,331,276, 7,363,888 and 6,564,760 describe cavity or window in the piston at two ends of the piston pin. The window or the cavity aligns with the transfer port and the cavity is significantly perpendicular to the axis of the piston pin. The piston and the cylinders disclosed in prior arts have cavity/window on the piston skirt and two separate air inlet ports in the cylinder one for each of the cavities. The invention disclosed by Mavinahally has one inlet passage in the cylinder aligning with one cavity in the piston and has internal air channel/passage in the piston either perpendicular to the piston pin or parallel to the pin as disclosed in this application. An air channel/passage inside of the piston interconnects the two cavities. In another embodiment disclosed here, the air passage connecting the two cavities/windows in the piston is above the piston pin and below the piston crown also known as piston top. The crown forms one of the walls for the passage. Therefore, the air passing from one cavity to the other cavity cools the piston crown. Therefore, it is advantageous to have at least a fraction of the air passing under the piston crown. Alternatively, hallow piston pin 200 can act as an air channel without needing or supplementing the separate air channel in the piston. The advantage with the air passage within the piston is that it offers the shortest air path between the two windows (cavities) in the piston and also offers shortest distance between the sets of transfer passages on either sides of the exhaust port. The air channel/passage offers shortest air path from the air inlet port from ambient into the transfer passage farthest from the air inlet port 98, when only one air inlet port is used in comparison to the prior arts. Secondly, in the embodiment described here, the air path from ambient into the crankcase chamber has unequal lengths of air paths from the air inlet port to the crankcase ports of transfer passages. The path through the transfer passage closest to the air inlet port is shorter than the air path through the transfer passage farthest from the air inlet port. However, the lengths of the flow paths for the air and the air-fuel mixture during the scavenging process is about equal for the both the sets of transfer passages. Having only one air inlet has the advantage of widening the air-fuel inlet port and also off-setting the air-fuel inlet port as necessary with respect to the plane passing through the axis of the cylinder and perpendicular to the piston pin, without limitations as in prior arts. Another advantage of having the passage parallel to the piston pin 200 is that the die casting of the piston is easier as the core for the piston pin bore, window 100a and 100b, and air passage 96 can be pulled in the same direction. As result a simpler and low cost die can be made. Secondly die casting of the internal air passage parallel to the piston pin can be machined on the same machine set up, and when the passage is a tubular passage, same tool can be used for machining the pin bore and the air passage. Advantage of having air inlet passage 313 and air-fuel inlet passage 312 perpendicular to the pin 200 is that the cooling air flowing across the cylinder from the fly-wheel or from front of the engine is obstructed as in the case where the inlet passage is in the front. Secondly, packaging of the fuel system and exhaust muffler in a hand-held engine as in a trimmer is easier and compact. Overall length of the engine including the muffler and carburetor and air filter is shorter when measured in the direction of the crankshaft when the inlet passages are perpendicular to the piston pin 200.

U.S. Pat. No. 5,379,732 teaches the art to vary the length of the transfer passage in a telescopic manner. U.S. Pat. Nos. 7,093,570 and 7,210,433 describe the transfer passages on the side walls (not the radial wall) of the crank case and on the flange between the crankcase and the upper cylinder block. U.S. Pat. No. 6,491,006 describes transfer passage which requires lid on the outside of the cylinder that can increase the cost of manufacturing the engine and secondly increases the risk of leaking fuel into ambient if the lid is not tightly fitted on to the engine or if the gasket or fastener holding the lid is broken.

U.S. Pat. No. 6,848,399 describes a scavenging conduit, also known as transfer passage, having an insert (100 (also known as cover) retained main crankshaft bearing. The insert may include a curve along the length of the longitudinal axis (of the cylinder, obvious from the description and the Figures) and the body 168 is circular in shape (col 4, line 4-8). It is also clear and obvious from FIGS. 1 and 2 that the insert stops above the bearing and is supported by the bearing. If it is extended below the cylinder, as shown in FIG. 1, the insert would be hit by the rotating (crank web) crankshaft 155 (col 2, line 33). Secondly, it becomes impossible to extend the length of the scavenging conduit (transfer passage) past the top of the main crankshaft bearing along the length of the longitudinal axis. If it is extended below the cylinder, as shown in FIG. 1 of prior art, the insert would be hit by the rotating (crank web) crankshaft 155 (col 2, line 33). The reason is that the main bearing and the crankshaft will interfere with the insert and damage the insert during operation of the engine. Thirdly the main bearing is a physical limitation for the extension of the insert described in the prior art. It is also obvious from the FIG. 1 and FIG. 2 that the insert outer surface 175 has a curvature in one dimension only, that is on a plane perpendicular to the axis of the cylinder (as described that the insert has a curve along the axis of the cylinder). It is also clear and obvious from FIGS. 1 and 2 that the insert stops above the bearing. The disadvantages of this prior art is that the length of the insert is restricted and limited by the main crankshaft bearing. Also, the length of the conduit is shorter and limited by the crank web (crankshaft 155) and the bearings. Extending the length into the crankcase as disclosed in the referenced prior art is impossible as it is obvious that the crankshaft bearing is in the way. In some applications, the length of the transfer passage is important and as disclosed in prior art by Nagesh Mavinahally and others, the transfer passage can extend into the crankcase chamber internally with the combination of cylinder and crankcase being cast such a way as to provide an enclosed conduit (transfer passage), and it does not have the insert. Therefore the prior art offers only a limited advantage and does not provide a solution to having a longer transfer passage (conduit). The prior art does not disclose a method to provide a spiraling channel. Also, the embodiment disclosed here offers a single or multiple but continuous insert that extends from the transfer port in the cylinder all the way, including a portion of, into the crankcase chamber below the cylindrical section of the cylinder.

It is desirable to have a spiraling transfer passage (channel/conduit) for more than two reasons; a) to increase the length of the passage within the length of the cylinder above the crankcase and above the centerline of the crankshaft, and b) to achieve the toroidal vertices in the flow of the charge into the combustion chamber during the scavenging process. Toroidal vertice is achieved by virtue of spiraling geometry of the transfer passage disclosed in the embodiment. Also, the spiraling passage directs the flow of the charge farther away from the exhaust port, and therefore reduces exhaust emissions significantly. Therefore, the embodiments disclosed in the invention, overcome the limitations of the prior arts and provide a cost effective design to overcome short comings of the prior arts. The embodiments disclose spiraling transfer passage and an insert to make a cylinder for stratified engines cost effectively and to induce toroidal flow into the combustion during the scavenging process.

SUMMARY

It is an object of the present inventions to provide a two-stroke engine of the aforementioned designs that are simple to manufacture, achieve longer transfer passages, provide asymmetric lengths air paths, spiral transfer passages to achieve toroidal vertices in the scavenging charge in the combustion chamber during scavenging process, and to have air passage inside the piston cool the piston by the ambient air and dead space inside the piston to reduce the crankcase chamber volume.

An engine according to various embodiments include a cylinder with at least one transfer passage, preferably at least two, that is a channel in the cylinder bore. The top end of the channel opens into the combustion chamber through transfer port and the lower end opens into the crankcase chamber. The transfer port is opened and closed by the piston. Connection of ambient air into transfer passage to and into crankcase chamber is alternative and is accomplished by a cut out in the piston and synchronized with the air inlet port in the cylinder. In a reed valve type stratified engine, air from ambient is supplied through reed valve into the top of the transfer passage on one side of the exhaust port and the air distributed to the transfer passage on the oppose side through air passage in the piston. The charge inlet into the crankcase chamber takes place in a usual manner either through the piston-controlled inlet, rotary valve, or a reed valve system. Only a piston controlled inlet is shown, as an example, in the illustrations of the exemplary embodiments.

In a quadruplet type transfer passage, the top end of the said passage is may be connected to the adjacent transfer passage either through a cavity or a window in the piston or directly through a passage at the top between the pair of transfer passages. The quadruplet passage increases the total volume of air, which acts as a buffer medium in the transfer passages. It also helps clear the fresh charge in the transfer passages from the previous cycle. The amount of air getting into each of the passages may be distributed and controlled by the deflectors on the piston window. Quadruplet type is where there are four sets of transfer ports, two on either sides of the exhaust port and each transfer port may have its own transfer passage or a common transfer passage per pair of ports.

The total length of the transfer passage may be increased by having the transfer passage continue into the crankcase as a groove/channel on the inside wall of the crankcase or on the outside wall, and preferably covered by a lid or an insert or by the periphery of the crank web. It is possible to have the passage in the crankcase without any lid, if the crank case is molded by sand casting or similar type of casting. However, invention disclosed here makes it feasible to use low cost die casting method to make the cylinder and crankcase. Further, the embodiments show the cover or insert in the cylinder extending from transfer port at first end and into the crankcase chamber at the second end. The insert is extended as one piece cover or multiple pieces and a method of having longer transfer passages extending beyond the cylinder block and into the lower crankcase is illustrated in this disclosure. It is expensive to sand cast the crankcase to have cast conduit/passage of irregular shapes and sizes and therefore providing a open channel/groove in the crankcase is an inexpensive and simpler method, while having a cover as disclosed here offers the passage to be enclosed, which is essential for stratified scavenging. Alternatively, the length of the transfer passage can be increased by having a spiraling transfer passage within the cylinder block, as disclosed here, without increasing the complexity or cost of making such a cylinder.

The embodiment described in this disclosure allows for significant cooling of the pin eyes as the cooler ambient air is passing across the ends of the eye, particularly when the air passage (96 is at the end of the piston pin closer to the exhaust port (50.

U.S. Pat. No. 5,379,732 describes the art to vary the length of the transfer passage in a telescopic manner. U.S. Pat. No. 6,492,006 describes an elongated transfer passage, but requires additional parts for covering the passages in the cylinder block and inserts in the crankcase. It is obviously expensive and making the cylinder block is complex requiring manual labor to assemble multiple parts. The two directional curvature of the transfer passage 7 makes it complex to manufacture. Also, the transfer passage 7 in the cylinder block requires an external cover plate 26' that has a potential to leak if the assembly is not done correctly.

Therefore, it automatically increases the number of parts and cost to make such an engine. Secondly such an arrangement is not suitable for an air-head scavenging system, where the air passage in the piston is significantly perpendicular to the piston pin described in this disclosure. Embodiment described in this disclosure will show significant advantages from cost, manufacturing, simplicity, and performance point of view. Secondly, the embodiment disclosed here allows for a simpler mold for die casting the engine block and the crankcase. The expensive and complex shaped insert 9 disclosed in the U.S. Pat. No. 6,491,006 will be eliminated by a simple cover plate inside the crankcase. The invention also eliminates the need to make the cylindrical liner insert of same material as the cylinder block as disclosed in prior art US publication 2013/0263812 and also eliminates the need for a securing element. The embodiment disclosed here reduces the cost of the parts by being able to make the inert of plastic and non-metallic material. Yet, in another embodiment, an open channel inside the crankcase will become an enclosed passage by virtue of the rotating crank web. The axial width of each web will be slightly wider than the width of the open channel, and therefore the web acts as cover or a lid for the open channel and forms effectively a closed passage until the opening which is off-set from the passage. Therefore, the embodiment disclosed eliminates need for cover plate. Additionally, the transfer passage timing and the active length of the passage can be automatically varied depending on the engine speed. A circumferential plate on the crank web rotates with respect to the crank web depending on the speed and therefore varies the effective length of the passage. Yet, in another embodiment the transfer passage is spiraling inside the cylinder block, such that the length of the transfer passage is longer than achieved in a conventional engine. Longer and spiraling passage is achieved without having to use any external cover, sealing gasket or fasteners as in the case of prior art. It can be appreciate that the cylinder inner wall adjacent to the cavity of the transfer passage can be undersized, where in the piston never contacts that section of the cylinder inner wall, even when the inner wall is integral to the upper cylinder block or the bore. Additionally, that section of the inner wall when integral to the upper cylinder block need not be plated, which saves cost of plating the cylinder wall.

It will be appreciated that various embodiments described herein may be applicable to two stroke engines, to four stroke engines, and/or to any other type of engine.

BRIEF DESCRIPTION OF THE DRAWINGS

The foregoing aspects and other features are explained in the following description, taken in connection with the accompanying drawings where:

FIG. 1a is horizontal sectional view of an exemplary embodiment of the piston and cylinder showing divided air inlet passage.

FIG. 1b is horizontal sectional view of the piston and cylinder showing curvature of the outer wall in the first window (100a) in the piston.

FIG. 1d is a vertical sectional view of the piston shown in FIG. 1b.

FIG. 1e is a vertical sectional view of the piston having a third piston insert (800).

FIG. 1f is a horizontal sectional of the view of a piston having a inserted (first insert and second insert) window (900).

FIG. 1g shows a view of the piston having an air channel below the piston crown and above the piston pin. Piston has windows on both sides of the long axis of the piston pin 200.

FIG. 1h is a cross sectional view of the piston shown in FIG. 1g.

FIG. 1i shows view of the piston having an air channel below the piston crown and above the piston pin. Piston has windows on both ends of the piston pin 200.

FIG. 1j shows cross sectional view of the piston shown in FIG. 1i.

FIG. 1k shows horizontal sectional view of the piston shown in FIG. 1i.

FIG. 1l shows sectional view of the piston shown in FIG. 1j

FIG. 2 is a longitudinal sectional view illustration of an exemplary embodiment of a two-stroke engine shown in FIG. 1.

FIG. 3 is a front view of an exemplary embodiment of a two-stroke engine showing locations of the air and charge inlets.

FIG. 4 is a view illustration of the piston showing air channel and the window (cavity), according to some embodiments.

FIG. 4b shows sectional view of the piston 16 shown in FIG. 4.

FIG. 5a is a view illustration of the engine embodiment shown in FIG. 1 showing the quadrants of the engine as seen from the top.

FIGS. 10c and 10d show separately just the cover plates used in engines shown in FIGS. 8a and 8b respectively.

FIG. 10e shows another embodiment of the plate having curvature only in the top end of the cylinder portion of the plate.

FIG. 10g shows enlarged view of the tubular transfer passage.

FIG. 10h shows cross sectional view of the cylinder and the tubular passage when the piston is at BDC.

FIG. 10i shows cross sectional view of the cylinder at a plane below the piston ring when the piston is at BDC.

FIGS. 15a through 15c show cross section views of the cylinders shown in FIG. 15 at plane 15a through 15c when the piston is at BDC.

FIG. 15d shows cross sectional view of the engine 1000 when the air inlet port 98 is open and the air-fuel inlet port 84 is closed.

FIG. 17e, FIG. 17f, and FIG. 17g show views of the insert (5229) having two different variations of the channel section of the insert.

FIG. 18 shows a view of the cylinder having closed cavity 811 (in plane is through the centerline Cl and the exhaust port).

FIG. 18a shows bottom view of the cylinder having spiraling transfer and shows cavity 811 (insert is removed).

FIG. 18b shows sectional view of the cylinder shown in FIG. 18a, but without the insert (5229).

FIG. 18c shows perspective view and bottom view of the inserts for the cylinder shown in FIG. 18.

FIG. 19 shows sectional view of a reed valve stratified engine having only one reed valve assembly on one side of the engine.

FIG. 21a through FIG. 20d shows various views of an insert (5229b) having a channel (portion of the transfer passage) cut out in the bottom of the insert.

FIG. 22a and FIG. 22b show a cylinder and insert assembly.

DETAILED DESCRIPTION

Figure 1C:
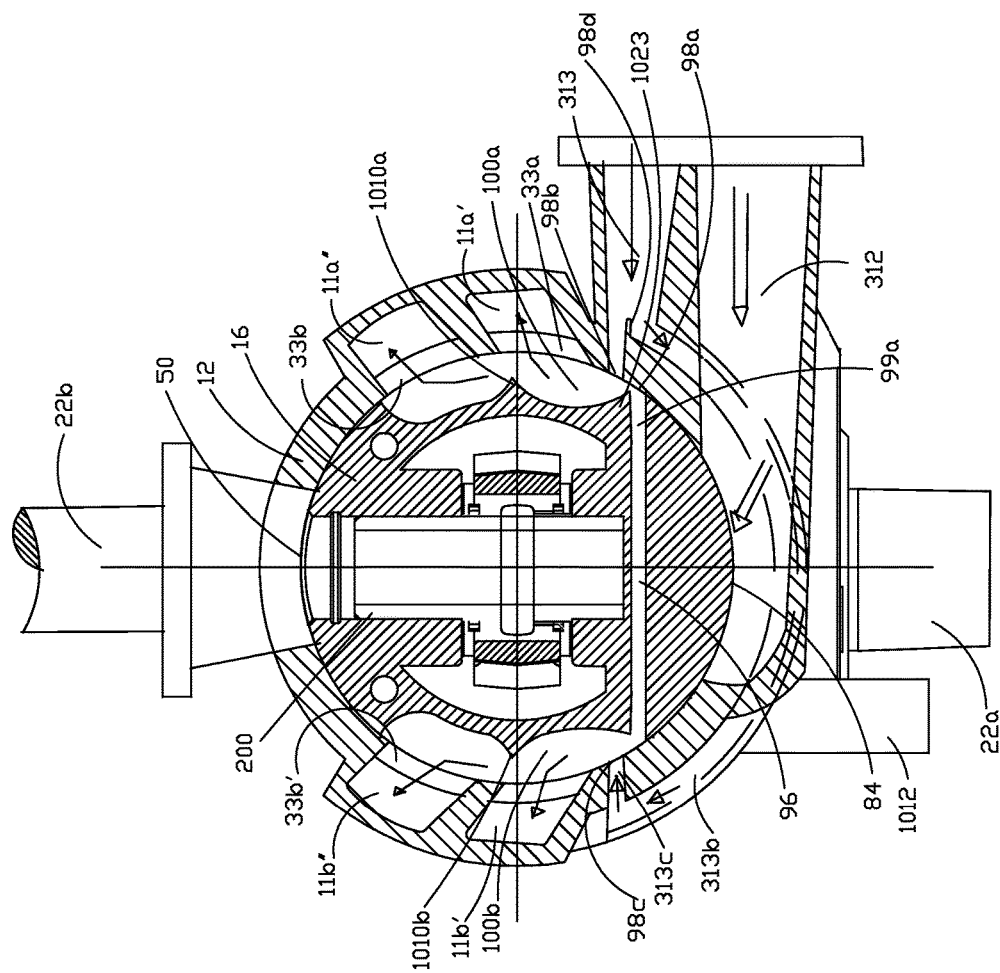
FIG. 1c is horizontal sectional view of the piston and cylinder showing second air inlet passage (313c) on the left side of long axis of the pin (200).

Various embodiments include stratified charge two-stroke engine 10 including a cylinder block 12, charge inlet port (second port) 84, piston 16 having an air channel 96 providing shortest distance between the two cavities (windows) in the piston and substantially perpendicular in one embodiment and parallel in another embodiment to the piston pin 200 and having piston windows 100a and 100B having deflector 1023 to divide the incoming air to two sides of the piston pin 200, air inlet passage 313 and charge inlet passage 312. The inner wall 313i of the air inlet passage 313 is closer to the transfer passage 11(11a') (11a in FIG. 15d) and the outer wall 313o is farthest from the transfer passage 11(11a') and is on the opposite side of the inner wall 313i. As can be seen in FIG. 1b (and FIG. 15a, 15d), the deflector 1023 (97) is about between the inner wall 313i and the outer wall 313o. The outer wall 313o more or less lines up with the outer wall of the air channel 96 for a smoother air flow. The outer wall 1030 of the first window 100a curves (concave) inward from the tip of the deflector 1023. It must be noted that the deflector 1023 my contact the cylinder wall 14 and the deflector 1023 may be wider to take up some of the thrust load on the piston. In some embodiments the air channel 96 may be across the axis of the pin 200.

Illustrated in FIGS. 1-5a are exemplary two stroke engines 10 having a cylinder block 12 that houses a cylinder bore 14, in which a piston 16 reciprocates within the cylinder bore 14 and is connected by means of a connecting rod 18 to a crank pin 20 on a crank web 21 of a crankshaft 22 and a piston pin 200 in the piston. The crankshaft 22 is journaled for rotation about a crankshaft axis 19 within a crankcase chamber 26 of a crankcase 28 that is affixed to the lower end of the cylinder block 12 in a suitable manner. A combustion chamber 30 is defined as a region within the cylinder bore 14 above the piston 16. The engine includes a two-way scavenging system including transfer passages 11 between the crankcase chamber 26 and the combustion chamber 30. The transfer passages 11 are used for scavenging and allowing a fresh air followed by fuel/air charge to be drawn from the crankcase chamber 26 into the combustion chamber 30 through a transfer port 33 in the cylinder block 12 at the completion of a power stroke. Transfer passage 11 may consist of pair of passages 11a and 11b, one on each side of the exhaust port 50 or a pairs of passages 11a' and 11a" and 11b' and 11b" on each side of the exhaust port 50. Each side is referred to as on either sides of a plane (Plane A) passing through the center of the exhaust port 50, axis (Cl) of the bore 14. Each transfer passage 11 has its transfer port 33 at the top end opening into the combustion chamber 30.

A rich fuel/air mixture is inducted into the combustion chamber 30 of the cylinder bore 14 by a charge induction system 32 which includes a carburetor 34, charge inlet passage 312, charge inlet port (second port) 84. The charge inlet port (second port) 84 is opened and closed by the piston 16. The fresh (ambient air) air inlet system consists of the induction system 32 including the carburetor 34 having air control valve 94, air inlet passage 313, and air inlet port 98. The air inlet port 98 is opened and closed by the cut out 99 (100a), also known as cavity or window, in the piston 16, which has one window 100a on the air intake side and another window 100b on the opposite side, farther away from the air inlet port 98. The window 100a aligns with the transfer port 33 (33a and 33b) at the appropriate time, as the piston moves upward after closing the exhaust port (third port) 50. The window 100b aligns with the transfer ports 33a' (33b') in the same manner and timing as the window 100a with the ports 33a (and 33b). The piston windows 100a and 100b are in gaseous communication with each other through the air channel/tunnel or passage 96 in the piston 16. The air channel 96 may be of different cross sectional area than the area of the cut out 99. The height of the cut out 99 in the vertical direction (same as axis of the cylinder 12 may be taller than the height of the first window 100a. The top edge of air channel 96 may be above or below the axis of the pin 200 or encircle the eye of the pin 200. If necessary the channel 96 may be cut through ends of a section of the pin 200, preferably on the bottom side of the pin 200. A section of the piston skirt 16a may have an insert 800 forming the air channel 96 and the insert is attached to the piston 16 or to the pin 200, as shown in FIG. 1e. Alternatively, the air channel 96 can be of a composite material, which means the inner side of the channel toward the pin 200 is the parent piston 16, while the outer side toward the charge inlet port 84 is the insert 800 of a different material. Therefore, it is possible to have a section of the skirt as an insert to form an air channel between the insert and the piston 16. The advantage is that the piston can have an open cut out in a section that does not take any side load, and still be part of a tunnel with an insert on the outside. The advantage with the insert is that the air passage can be molded to any shape and size without increasing the cost of the piston, particularly when the insert is of low cost material, such as plastic. The insert 800 may be made of non-metal material and easy to mold the through passage 96 as a one piece insert. The insert 800 may also act as end cap for the pin 200 and the pin 200 may be inserted from the air channel side. A similar end cap may be inserted on the other side of the pin 200 which is toward the exhaust port 50.

In another embodiment disclosed in FIGS. 1g through 1l, the air channel 96a is across the piston and has piston crown 16b on the top side, a wall 16c formed above the piston pin 200 is on the bottom side, while side walls 17a and 17b together with 16c and 16b form a the air passage 96a. FIGS. 1i through 1l show that a section of the air channel 96 having a vertical wall 17b. It is possible to have just the air channel 96a formed below the piston crown 16b as shown in FIG. 1h. The advantage of the air channel 96a being below the piston crown 16b is that the ambient air passing through this channel cools the hot piston crown and prevents the piston from getting hot and scuffing the piston. It must be noted that the air channel below the crown may be formed by using an articulated piston, in which piston is formed of two separate pieces; one having the piston crown 16b, and the piston boss to hold the pin 200, while the second piece is the piston skirt (16a) with the piston boss. Most commonly used pistons in small engines have single piece piston where the skirt 16a is integral with the piston crown 16b, and the piston pin boss which retains pin 200. Alternatively, a separate cover piece may be attached to the piston crown from the inside of the piston. Also, non-functional channel, shown in FIG. 1l on the exhaust port side may be formed to reduce the dead volume inside the piston and therefore reduce the overall volume of the crankcase chamber. Therefore, the piston 16 having a crown 16b, piston skirt 16a, a piston pin 200, air passage 96 connecting to the two cavities on either sides of the piston can have a dummy passage 196 opposite side of the air passage 96 and dummy passage 196 creates a dead space or trapped volume inside of the piston and the space having the piston skirt 16a on one side, crown 16b on the top, a wall 196a opposite side of the skirt and a wall on the bottom, having at least one opening facing the cylinder bore 14, as shown in FIG. 1l. A section of the passage 196 has recess in the middle of the piston for proving clearance for the piston rod 18, when the piston is about mid way between the top dead center and bottom dead center. Alternatively, the passage 196 may have an opening at the bottom facing the crankcase chamber, but having a lid sealing the passage 196 from crankcase chamber. The air passage 96 may also be constructed in the same manner as the dummy passage 97d, but connecting the two windows 100a and 100b. The passage can be as big as possible for better air flow from window 100a to window 100b. It is possible to have larger size, when the clearance between the connecting rod 18 and the outer wall of the passage has minimum possible clearance at all positions of the connecting rod 18 and it is at least 0.5 mm and that the connecting rod does not contact the wall of the passage even at the highest piston and engine temperatures.

Figure 1M:
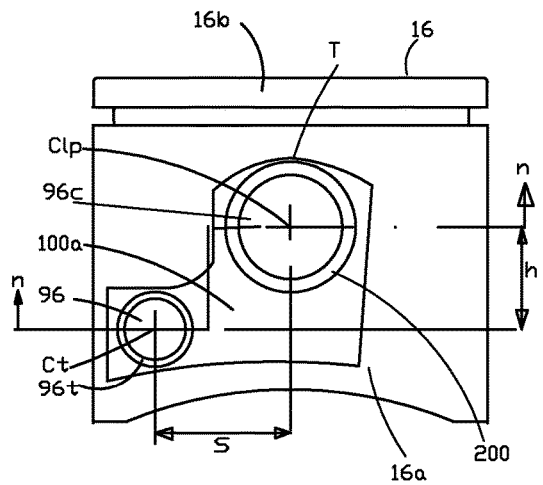
FIG. 1m shows view of the piston having air channel in the hollow piston pin 200. Air channel connects the piston windows on both ends of the piston pin 200.

The hallow piston pin 200 may also act as an air channel 96c, as shown in FIG. 1m. The air entering the piston window 100a (99) through the air inlet passage 313 is communicated to the other window 100b on the other side of piston skirt through the air channel 96, 96a, and or 96c, where 96 in the FIG. 1l is substantially vertical, has a wall closer to the piston skirt on side closer to front on one side. Air channel 96a is substantially horizontal and is formed below the piston crown and has crown is a wall on one side, and is above the piston pin 200, whereas hollow piston pin 200 forms an air channel 96c, as shown in FIG. ij.

Figure 1N:
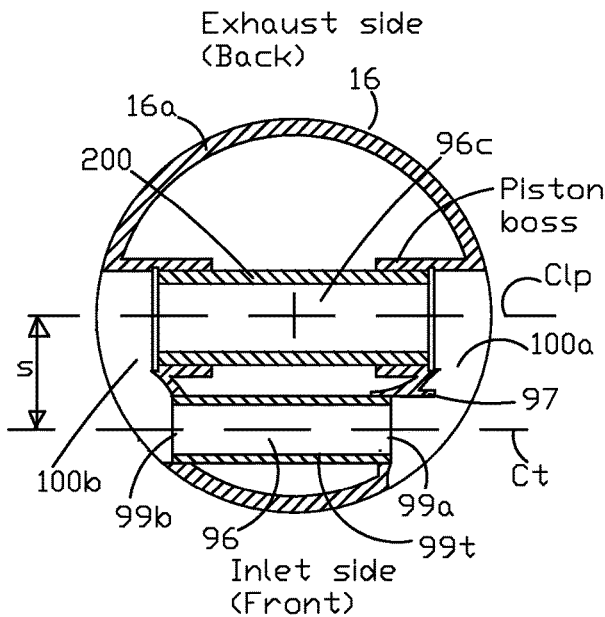
FIGS. 1n and 1o show sectional views of the piston shown in FIG. 1m having inserted tubular air passage and integrally cast air passage way, respectively.
Figure 1O:
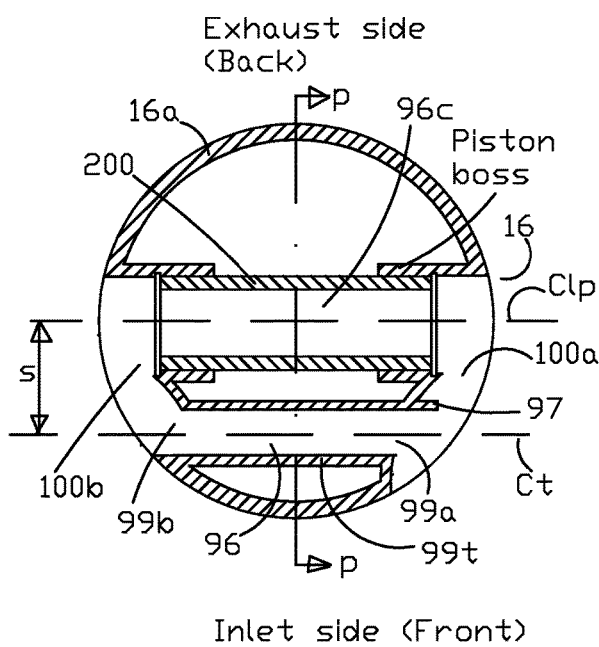
Figure 1P:
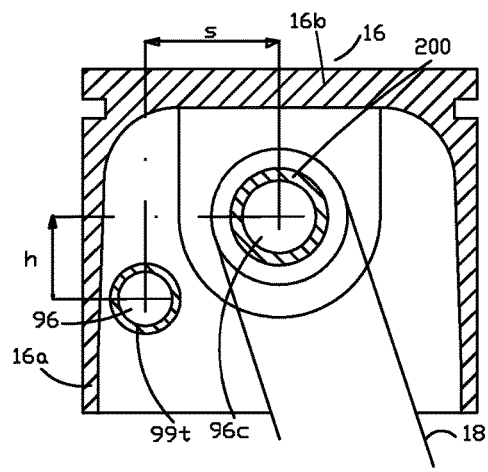
FIG. 1p show vertical sectional view of the piston shown in FIG. 1m.
Figure 7:
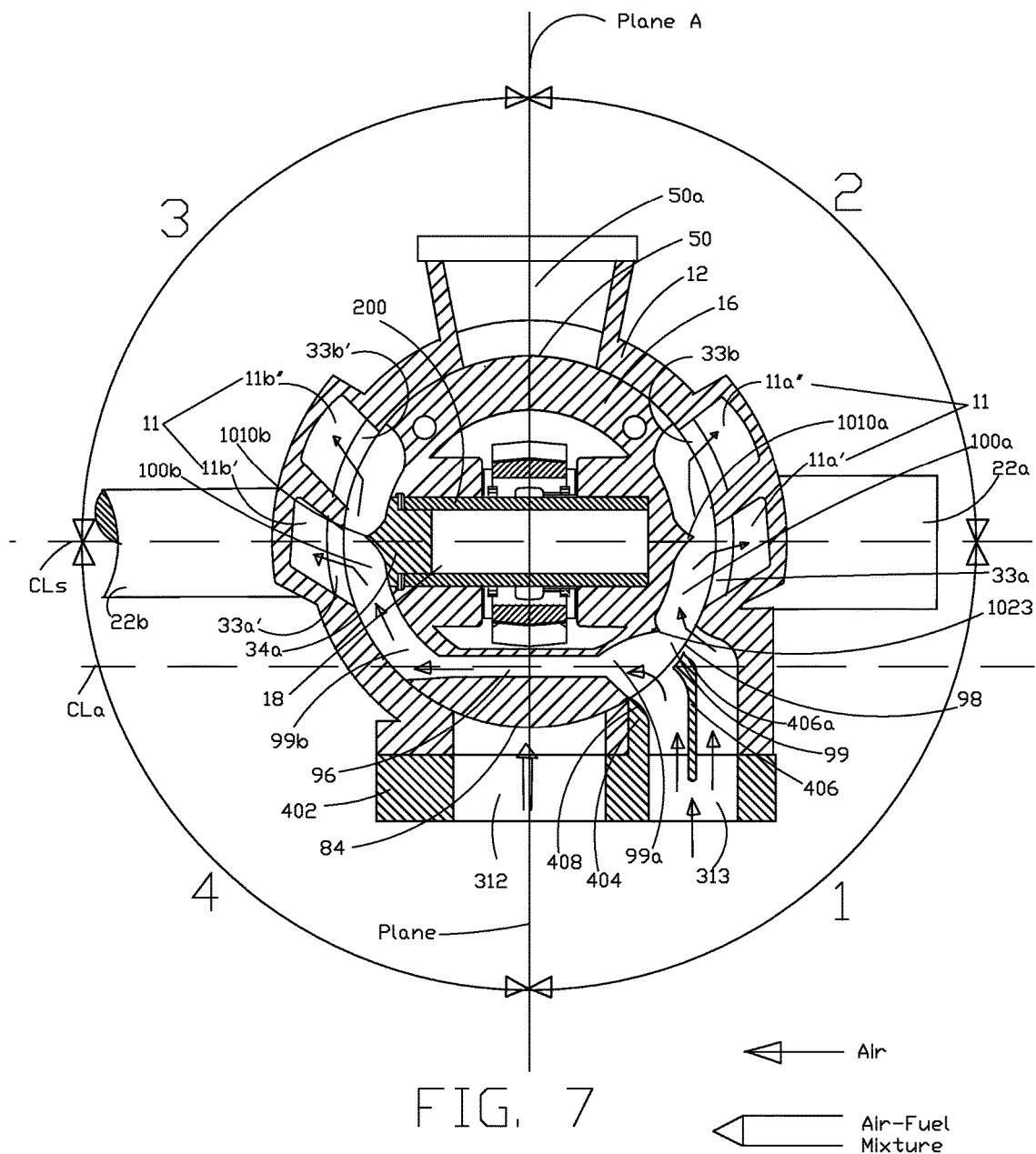
FIG. 7 is a horizontal sectional view of the piston, cylinder, the heat dam, and in which air passage is parallel to the piston pin and air-fuel inlet passage is substantially perpendicular to the piston pin.
Figure 8:
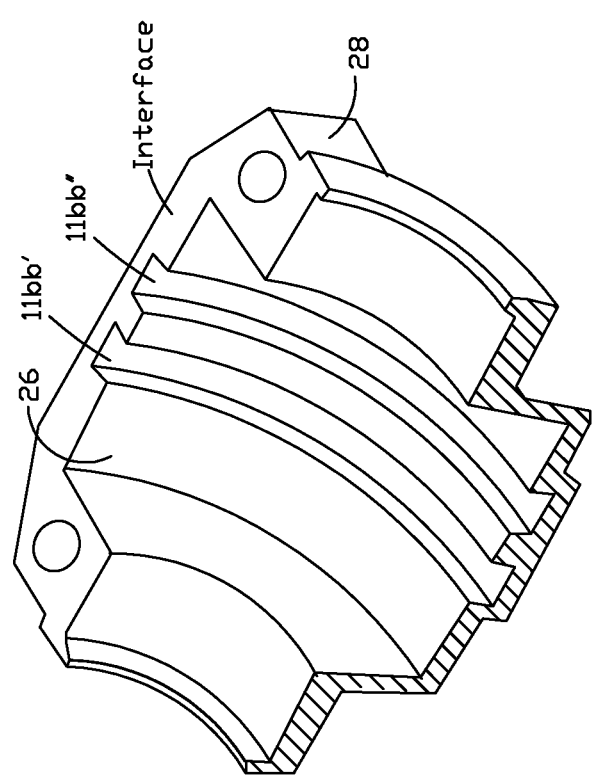
FIG. 8 is a horizontal sectional view illustration of the crankcase having a section of transfer passage in the form of an open channel in the lower crankcase.

FIG. 1m shows the window 100a curving upward encompassing end of the piston pin 200 and therefore, air in the window 100a on one side of the piston is communicated to the other window 100b on the other side of the piston through the passage 96c in the hollow piston pin 200 and the air flow is unidirectional, which means the air flows in one direction only during intake process from window 100a to the window 100b and into the transfer passage closer to the window 100b and NOT the opposite direction. Therefore, there is no need for a separate air channel in the piston. A separate tube 96t may be inserted parallel to the piston pin 200, as shown in FIGS. 1m, 1n, 1o, and 1p, to provide gaseous communication between the windows 100a and 100b for unidirectional flow of ambient air from one window to the other only during the induction process. The tubular passage can also be die cast to be integral to the piston, shown in FIG. 1o, and the cores for the piston boss and the air passage, and window can be pulled together and easily, particularly when the pin boss and passages are parallel. The diameter of the air passage 96 at the ends is slightly larger than the diameter of the passage at middle of the passage. The center (Ct) of the passage or tubular passage 96 is located below the axis of the piston 200 and substantially parallel to the pin 200. Top edge 'T' of the passage is below the outer diameter of the piston pin 200, as shown in FIG. 1m. However, the top edge "T" of the window 100a and 100b may be either below the pin 200 or above the pin 200. The lower edge of the window is below the piston pin 200. As described above the center (Ct) of the tubular passage 96 having a tube 96t is axially and laterally off-set, at distance h and distance s respectively, from the centerline of the piston pin 200, as shown in FIGS. 1m, 1n, 1o, and 1p. As illustrated in FIG. 1, the air channel 96 and the charge inlet through inlet port (second port) 84 appear to be at right angles to each other. FIG. 1n shows a tubular piece 99t inserted into the second bore that is parallel to the piston pin bore in the piston 16 to form a tubular air passage 96 entirely inside the piston 16. Also, the projection of the projected areas of air inlet port 98 and charge inlet port (second port) 84 are substantially at right angles to each other in some embodiments. However, these need not necessarily be so, in some embodiments. FIGS. 7 and 15*b* show that the air inlet port 98 and charge inlet port 84 are beside one another and are not perpendicular to each other, but are off-set from each other.

The windows 100*a* and 100*b* which are cavities in the piston on the skirt have deflectors 1010*a* and 1010*b* to deflect the air into the transfer ports 33*a* and 33*a*'. Deflectors are the projected sections having a narrow width on the skirt, particularly in the middle or edges of the windows. Projected sections are significantly along the skirt in a vertical direction along the axis of the cylinder (Cl). There is also one deflector 1023 at the edge of the cut out 99 to help deflect the incoming air through the air inlet port 98 into the window 100*a* and may be designed to provide restriction for the flow of air into air channel 96. The objective of the deflector 1023 is to divide the incoming air into two streams so as to distribute the air into the transfer ports 33*a* being closer to the air intake port 98 and the other port 33*a*' on the opposite side farthest from the air intake port 98.

Figure 5:
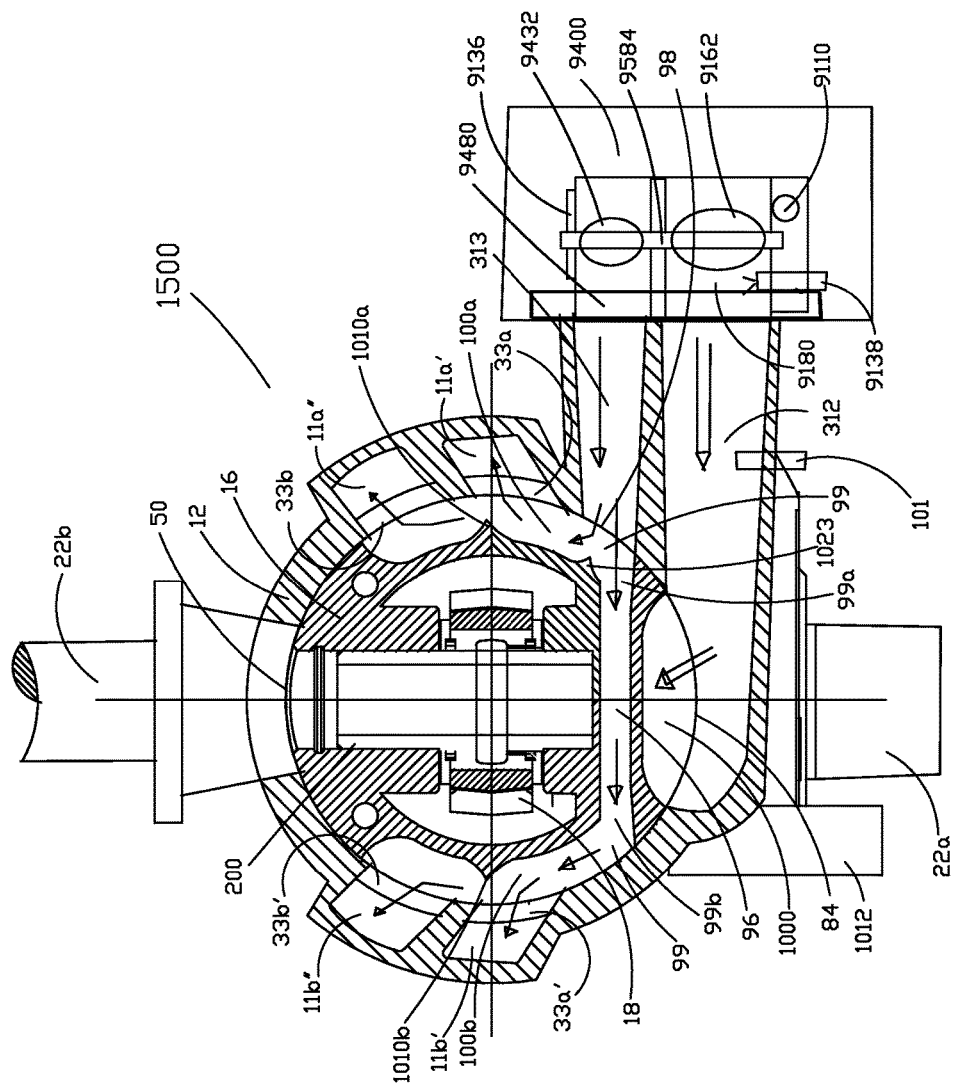
FIG. 5 is a longitudinal sectional view illustration of an exemplary embodiment of a two-stroke engine shown in FIG. 1 having an electronic LPG fuel injected throttle body.
Figure 6:
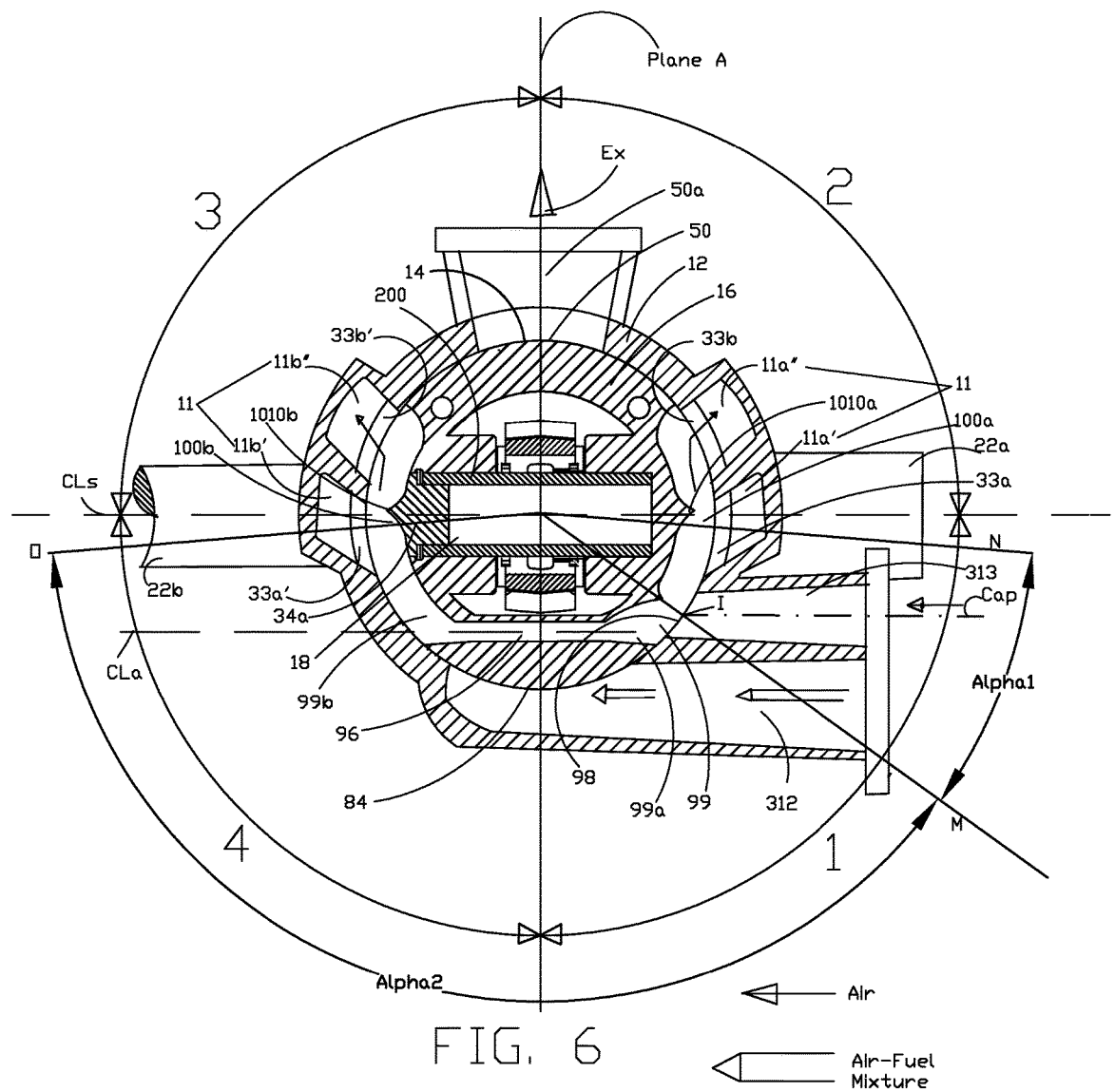
FIG. 6 is a horizontal sectional view of the piston and cylinder with passage in the piston parallel to the piston pin.
Figure 15:
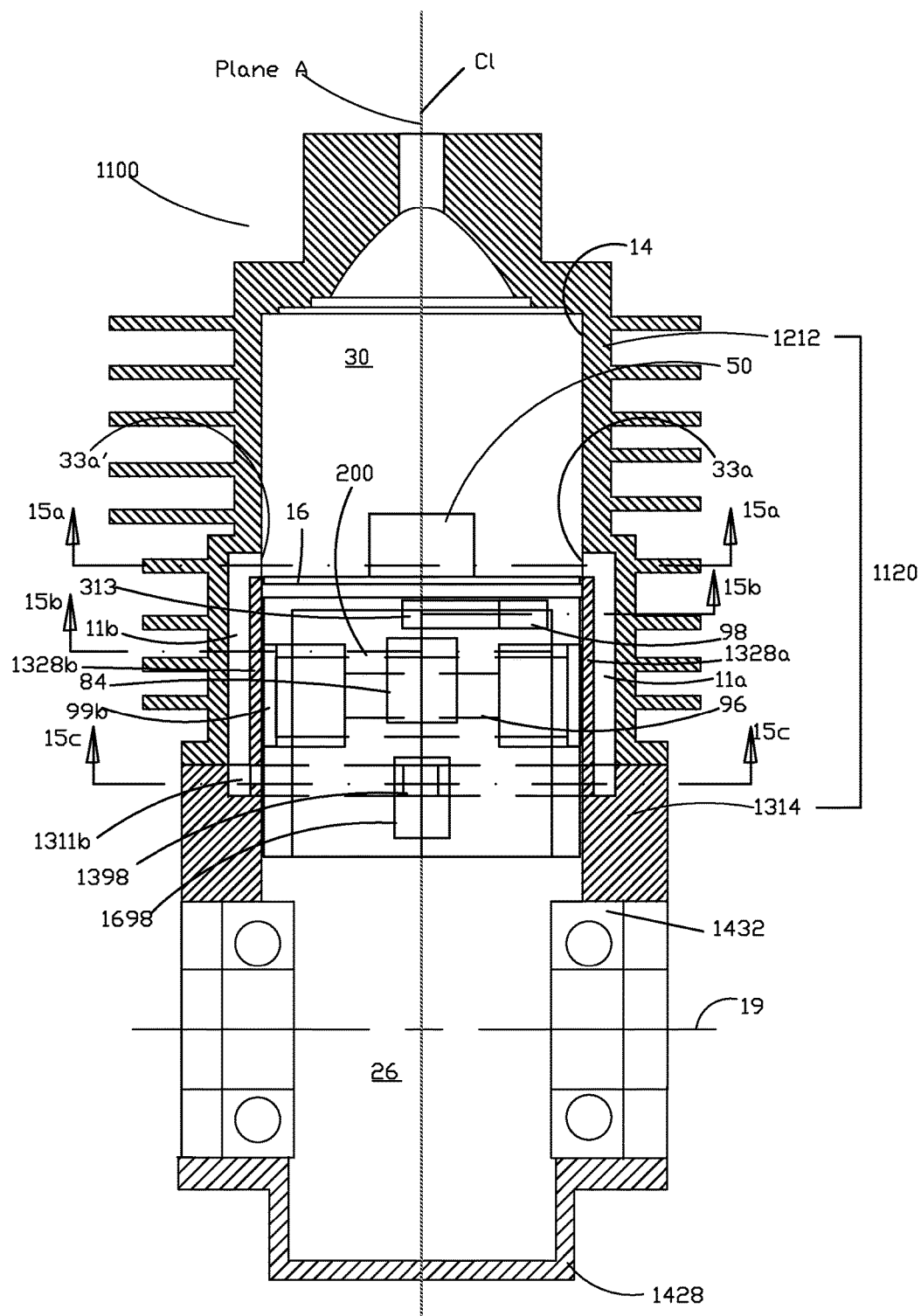
FIG. 15 is a vertical sectional view of a two-stroke engine 1100 and its cylinder (1210) made of two portions; upper portion 1212 and the lower portion (upper crankcase) 1314.

The area for the flow of air into respective transfer ports 33*a* and 33*b* may vary and become smaller in the direction moving away from the air inlet port (first port) 98 toward the exhaust port 50. FIG. 4*b* shows the cross sectional view of the piston 16 shown in FIG. 4, and the distance of wall 1030 to the bore 14 would be wider than the distance between 1010*a* to the bore 14, which is indicative of narrower area toward the deflector 1010*a*. The windows 100*a* and 100*b* are on either sides of the long axis (CLp) of the piston pin 200 in one embodiment some embodiments, as shown in FIG. 4*b*. Alternatively the windows are closer to ends of the pin 200 as shown in FIGS. 6, 7, and 15. The depth of the window (d) can be as deep as possible but have a minimum clearance of (y) between the inner wall 1018 and 1032 at the lower edge of the window and the connecting rod 18 at all angular positions of the connecting rod 18. The depth of the window varies becoming narrower toward the far end of the window away from the air inlet port 98. The height of the window (b) can be as much as possible, smaller or larger than the diameter of the piston pin 200 to provide for the optimum port timing for aligning the air inlet port 98 to the transfer port 33*a*, 33*b* and the height on the inside of the window can be narrower if need be. The height of the top face 1038 and lower edge of the window depends on the port timing for optimum port timings. The top edge may slant one way or the other depending on port timings. The depth (d1-d2) of the deflector 1010*a* and 1010*b* depends on how the air inducted into multiple transfer passages 11*a*' and 11*a*" (for example) is distributed between the front and the rear transfer passages, in which the rear transfer passage 11*a*" (11*b*") is closer to the exhaust port 50. Smaller the fraction of air that should enter the transfer passage 11*a*" larger is the height of the deflector 1010*a*. The curvature (rc) of the deflector 1010*a* and 1010*b* helps direct the flow of air into the transfer ports 33*a* and 33*b*. The curvature (rc) on the deflector 1023 and how far it protrudes above the surface of the piston determines how much air flows through the air channel 96. The curvatures (rc) on the deflectors and protrusion of the deflector are the factors that affect the flow of air into the transfer passages. The curvature (rc) is measured in a plane perpendicular to the axis of the cylinder 12 and the curvature can be two directional, which means it curves along a path optimum for flow of air from the air inlet port 98 and into the transfer ports 33*a* and 33*a*'. But it can also be curved only in one direction. The air from the air intake passage 313 is directed toward the outer wall 1030 which is vertical and curved inward as to have a smoother flow of air from passage 313 and into the transfer ports 33*a* closest to the air intake port 98. The air flow into the transfer port 33*a*' on the left side of the pin 200 as seen in FIG. 5 is assisted by the curvature of the cylinder wall 14 and by the curvature of the outer wall 1020 of the window 100*b*. The embodiment discloses in FIG. 1*b* the curvature of the outer wall 1030 of the window wall 1016*a* closest to the air intake port 98 and curvature of the outer wall 1020 of the window wall 1016*b* are more or less in the same direction, that is inward or concave in the wall closer to the intake passage 313 and outward or convex on the wall on opposite side of the long axis of the pin 200. Also, a radius (rp) or curvature to the top wall 1038 is equal to the radius of the pin 200, as shown in FIG. 4*b*. In the prior art U.S. Pat. No. 7,363,888, the eye of the piston pin 25 limits the shape of the window, and the angle (Alpha) of the air passage 15 shown in FIG. 3 is not perpendicular to the axis of the pin 25. Secondly, the ceiling 19 is moving away from the port 16 as the piston moves upward and therefore reduces the effectiveness of the angle ALPHA of the air passage 15, because the air flow depends on the rebounding of the air at the ceiling into the transfer ports 14, as explained in column 6, lines 19-31. Therefore, the effectiveness of the shape of the ceiling diminishes as the piston moves upward. However, in the embodiment disclosed here the curvature of the wall 1030 with respect to the intake port 98, remains more or less optimum even as the piston moves upward, because the curvature of the wall 1030 with respect to the cylinder wall remain more or less constant along the vertical face of the deflector. Another advantage with the disclosure made in this application is that the angle of air channel 313 with respect to the axis of the pin 200 is in the quadrant 1 and can be varied on a plane perpendicular to the axis of the cylinder bore and the flow is assisted by the inward curvature on a section 1017 of the side wall 1016*a* closer to air intake passage 313.

The sections of piston skirt 16*a* on either sides of the longer axis of the piston pin 200, where the windows are located, are commonly referred to as the thrust sides of the piston. The thrust sides of the piston experiences side load and are prone to wear more. A common practice in some engines is to have a coating (like Teflon). Since the window in this embodiment is on the thrust side, the contact area of the piston is smaller. Therefore, the height (c), shown in FIG. 4*b*, below the window is important and it is recommended to have at least 10% of the diameter of the piston pin 200. However, if the piston skirt 16*a* is coated with special material other than parent material of the piston 16 or if the special surface finish to help retain the lubricant is used, then the height (c) can be different than 10% of the diameter of the piston pin 200. A certain ratio of c/(c+b+a) can also be applied. Also, in order to increase the contact area in the skirt 16*a* in the region of the window 100*a* and 100*b*, the height and width of the deflector 1010*a* and 1010*b* can be such that a section of the deflector can contact the cylinder wall 14. In other words the deflector acts as a supporting structure to take the thrust load. In order to allow air to flow into both the transfer ports 33*a* and 33*b*, a cut out in the deflector or a through hole may be provided, that pass through the deflector 1010*a*, 101*b*. Alternative to casting the windows 100*a* and 100*b* to be of parent material of the piston 16, the window can be a separate piece and can be attached to the piston 16 as an insert (first and second insert) 900. FIG. 1*f* shows a horizontal sectional partial view of the piston having an inserted window 100*a*. The insert 900 can be made of non-metal material, which is easier to mold into complex shapes. The insert is attached to the piston skirt. The section of the piston skirt 16*a* can have a cavity and cavity prevents the piston insert 900 from dislocating from its position when the piston 16 is moving up and down. The advantage is that the weight of the piston may be significantly reduced and the insert can be molded as a separate piece. Alternative to inserting only a section of the piston skirt, the entire skirt can be of separate material and attached to the piston through the piston pin 200, which is known as articulated piston. Many prior arts describe the articulated piston. However, articulated piston in automobile four-stroke engines do not have window for carrying air into the transfer passage 11 or are they designed of non-metal material. The main objective of the embodiment disclosed in this application is to insert a window having specific purpose and shape, which is to carry ambient air into the transfer passage 11.

FIG. 1*a* illustrates a divided intake air passage 313 leading into two separate air inlet first port 98*a* and twelfth port 98*b*, each supplying air into respective windows 100*a* and 100*b*. FIG. 1*b* illustrates first window 100*a* with the outer wall 1030 being concave in the front section 1017 closer to the intake air port 98 while the outer wall 1020 of the second window 100*b* being convex.

In various embodiments, an intake system may be one of a one-way valve type, or a rotary valve type. In the rotary intake system, the intake port (second port) 84 is in the crankcase 28 and the intake port (second port) 84 is opened and closed by a cut out in the crank web 21.

FIG. 5*a* shows the location of the ports and windows of the embodiments and the sectional view in a plane perpendicular the axis of the cylinder 12. The sectional view encompasses 360 degrees starting from lower right side of the long axis of the pin 200 in the anti-clock direction. The view is divided into 4 equal quadrants; 1, 2, 3, and 4 as named in FIG. 5*a*-8. Quadrant 1 is between the long axis of the pin 200 (center line of the crankshaft 22*a*) and the perpendicular line passing through the axis of the cylinder and perpendicular to the long axis of the pin 200 (between 3 O' clock and 6 O' clock). The quadrants 2, 3, and 4 are self explanatory. In embodiments disclosed in FIGS. 6 and 7, the attitude of the piston pin 200 and the crankshaft 22*a* and 22*b* are similar to conventional engines, where the exhaust port (EX) of the exhaust port 50 is substantially perpendicular to the axis CLs of the crankshaft and piston pin 200. However, direction of the air passage 313 and the air-fuel passage 312 are substantially in line with the axis CLs of the crankshaft, as shown in FIG. 6. In the embodiment the centerline CLa of the air passage 96 is now substantially parallel to the axis CLs of the crankshaft 22*a* (and the pin 200). The windows 100*a* and 100*b* are on either sides of plane (Plane A in FIGS. 6 and 7). The shape and size are similar to the window shown in FIG. 4. In FIG. 6, the center line 'Cap' of the air inlet passage 313 intersects the bore 14 at "I" and the line M shown is to pass through the intersecting point "I" and the center of the bore or the axis Cl. The line N passes through the midpoint of the transfer port 33*a* on the bore, which is closest to the air inlet port 98 and one side of the plane A, and center of the bore 14. Line O passes through the midpoint of the transfer port 33*a*' on the bore, which is on the other side of the plane A, and center of the bore 14. The angle between the line M and N is Alpha 1, which is less than 40 degrees and the angle between the line M and line is Alpha 2, which is at least degrees 60 degrees. This indicates the ratio of the angle Alpha 2 to Alpha 1 is at least 1.5. Therefore, it is clear that the layout of the transfer ports 33*a* and 33*a*' that are on either side of the plane A are asymmetrically positioned with respect to the location of the air inlet port 98. As a result of this layout, the length of the air flow into the crankcase chamber 26 through the respective transfer passages is also asymmetrical. The length the air has to flow through the transfer passage 11*b*' is longer than length through the transfer passage 11*a*'.

FIG. 7 shows an embodiment wherein layout of the intake passage 312 is in a direction substantially perpendicular to the axis CLs of the crankshaft similar to most conventional two-stroke engines. However, the embodiment discloses the single air passage 313 that is laterally off-set from a plane (Plane A) perpendicular to the axis CLs of the crankshaft 22*a* and the air passage 313 is also vertically off-set upward in relation to the intake passage 312 (shown in FIG. 15). The referenced plane (Plane A) intersects the centerline CLs of the crankshaft 22*a* and the plane A is along the axis of the cylinder, which is perpendicular to the plane of the paper. In the view shown in FIG. 7, the air passage 313 is to the right of the air-fuel intake passage 312. The intake passage 312 may be offset farther to the left of the plane so as to provide for larger flow area for the air intake passage 313. The direction of the air entering the cut out 99*a* (inlet of passage way 96) in the piston 16 is substantially in line with the axis CLs of the crankshaft 22*a* (and the piston pin 200). In other words, the air entering the air passage 313 in the heat dam 402 is perpendicular to the axis of the crankshaft 22*a* and turns about 90 degrees as it enters air passage 96 in the piston shown in FIG. 7. The direction of the air in the air passage 313 is substantially perpendicular to the centerline CLa of the air passage 96 as it enters the heat dam 402, shown in FIG. 7. However, in the embodiment disclosed in FIG. 15-16, the air passage 313 is at an angle to the plane A. In this embodiment also, the air passage 96 is a passageway (or channel) (tunnel) completely inside the piston 16. The passage way allows for continuous fluidic communication between the cut outs 99*a* (inlet to passage way) and 99*b* (outlet of passage way 96). And the passage way 96 is substantially parallel to the piston pin 200 and offers shortest distance between the windows 100*a* and 100*b*. The air passage 96 may be a cast feature in the piston 16 or may be drilled during the machining operation of the piston. The air passage 96 may be circular or rectangular or any suitable shape when viewed from the side and projected on to a plane perpendicular to the center line CLa. One example of the projected shape of the air passage 96 is shown in FIG. 4. The passage way 96 may also be made of different material, such as high temperature plastic inserted into the piston to help manufacture the piston economically. The advantage with the air passage 96 within the piston 16 is that it offers the shortest air path between the two windows (cavities) 100*a* and 100*b* in the piston and also offers shortest distance between the sets of transfer passages 11*a*' and 11*b*' on either sides of the exhaust port 50. The air tunnel/passage offers shortest air path from the air inlet port 98 from ambient into the transfer passage 11*b*' farthest from the air inlet port 98. Secondly, in the embodiment described here, the air path from ambient into the crankcase chamber 26 has unequal lengths of air paths from the air inlet port 98 to the crankcase ports 1122 and 1123 of the transfer passages. The air path through the transfer passage 11*a*' closest to the air inlet port 98 is shorter than the air path through the transfer passage 11*b*' farthest from the air inlet port 98. However, the lengths of the flow paths for the air and the air-fuel mixture during the scavenging process is more or less equal for the both the sets of transfer passages 11*a*' and 11*b*', for example, because the air does not have to travel through the air passage 96 during the scavenging process.

The embodiment also discloses a manifold 402 also commonly known as heat dam. It is insulating part between the cylinder 12 and the carburetor (or a flow control valve) and helps prevent heat transfer between the cylinder 12 and the carburetor. In the embodiment, the heat dam 402 has an air-fuel inlet passage 312 and an air only passage 313 those align with their respective passages in the cylinder 12. A section 404 of heat dam in the air only inlet passage 313 extends deeper into the air passage in the cylinder and the purpose of the extension is to provide proper curvature 408 at the end of the straight section of the passage 313. The curvature transitions smoothly from 313 to the air inlet port 98. As described, the air inlet passage 313 and air passage way 96 are at certain angle with each other and a smooth curvature 408 in section 404 helps in flow of air from ambient into the transfer passages 11 and crankcase chamber 26. The heat dam 402 also may also have a partition wall 406 to divide the air stream in the passage 313 to help flow of air into two sets of transfer passages 11b' and 11b" on left side and 11a' and 11a" on the right side. The partition wall 406, shown in FIG. 7 also has radius on the inside face toward 408 to help smoother flow of air. The air is divided into two streams; a left stream and a right stream. The left stream flows into the air passage 96 and into the transfer passages on the left 11b' and 11b", while the right stream flows into the window 100a and into the transfer passages on the right 11a' and 11a". However. It must be noted that it is not necessary to divide the air stream in the air passage 313.

The advantage of the embodiment disclosed in FIG. 7 is that there can be only one air inlet passage 313 and only one air inlet port 98 and air is divided into two separate streams to distribute the air into left and right transfer passages, through the air passage 96 which is inside the piston, and the air inlet passage 313 is laterally off-set from the air-fuel inlet passage 312. Alternatively, the air inlet passage 313 and the air-fuel inlet passage 212 can be in line, but the air passage may be at an angle toward the port 99a, as shown in FIGS. 15a through 15d and FIG. 16. The embodiments in which only one air inlet passage 313 and air inlet port 98 distribute air in to two separate sets of transfer passages 11 on either sides of the exhaust port 50 helps in manufacture of cylinder, and have a simpler heat dam.

The angular positions of the ports; 84, 98, 33a and 33b, 50, and air passage 96 with respect to the crank shaft axis CLs can be different than illustrated in the Figures disclosed here. It is clearly shown in the embodiments having a single air inlet port 98, the air inlet port 98 and the nearest transfer port 33a are in the first segment and the farthest transfer port 33a' is in segment 4 as shown in FIGS. 6 and 7. The distance between the air inlet port 98 and the nearest transfer port 33a on one side of the pin 200 is less than 25% (that is (2*22/7*radius of the bore 14)/4) of the circumference of the bore 14. And the distance between the air inlet port 98 and the transfer port 33a' on the other side of the pin 200 is, as shown in FIGS. 6 and 7 and the distance is greater than the distance between the port 98 and transfer port 33a.

In the embodiment disclosed in FIG. 6, the end cap 34a is an insert at one end of the piston pin 200 and the insert 34a has the deflector 1010b integral to the insert 34a. As shown, the piston pin bore in the piston 200 can be a blind bore on the other end of the pin (opposite to end cap 34a). In the embodiment disclosed in FIG. 7, the inlet passage 312 is in between the segments 1 and 4, while the air inlet passage 313 and air inlet port 98 is in segment 1. Further, it must be understood that the air passage way 96 may be at an angle to the axis of the piston pin and may be formed of two passages one from each side of the pin 200 and each at angle in relation to the axis of the pin 200. In the embodiment having a single air inlet passage 313 and in which air is divided into two streams, one for each set of transfer passages, the lengths of the air paths will result in unequal lengths to the respective transfer passages. For example, in FIG. 7, the length the air has to travel to the transfer passage on the left side of the plane is longer than it is to the transfer passage on the right of the plane. However, the volumes of air entering each set of passages may be equal my virtue of having different flow areas at the exit of the divided streams and at the air inlet port 98. Therefore, the embodiment discloses ambient air paths of unequal lengths into transfer passages on either sides of the Plane A.

Figure 9:
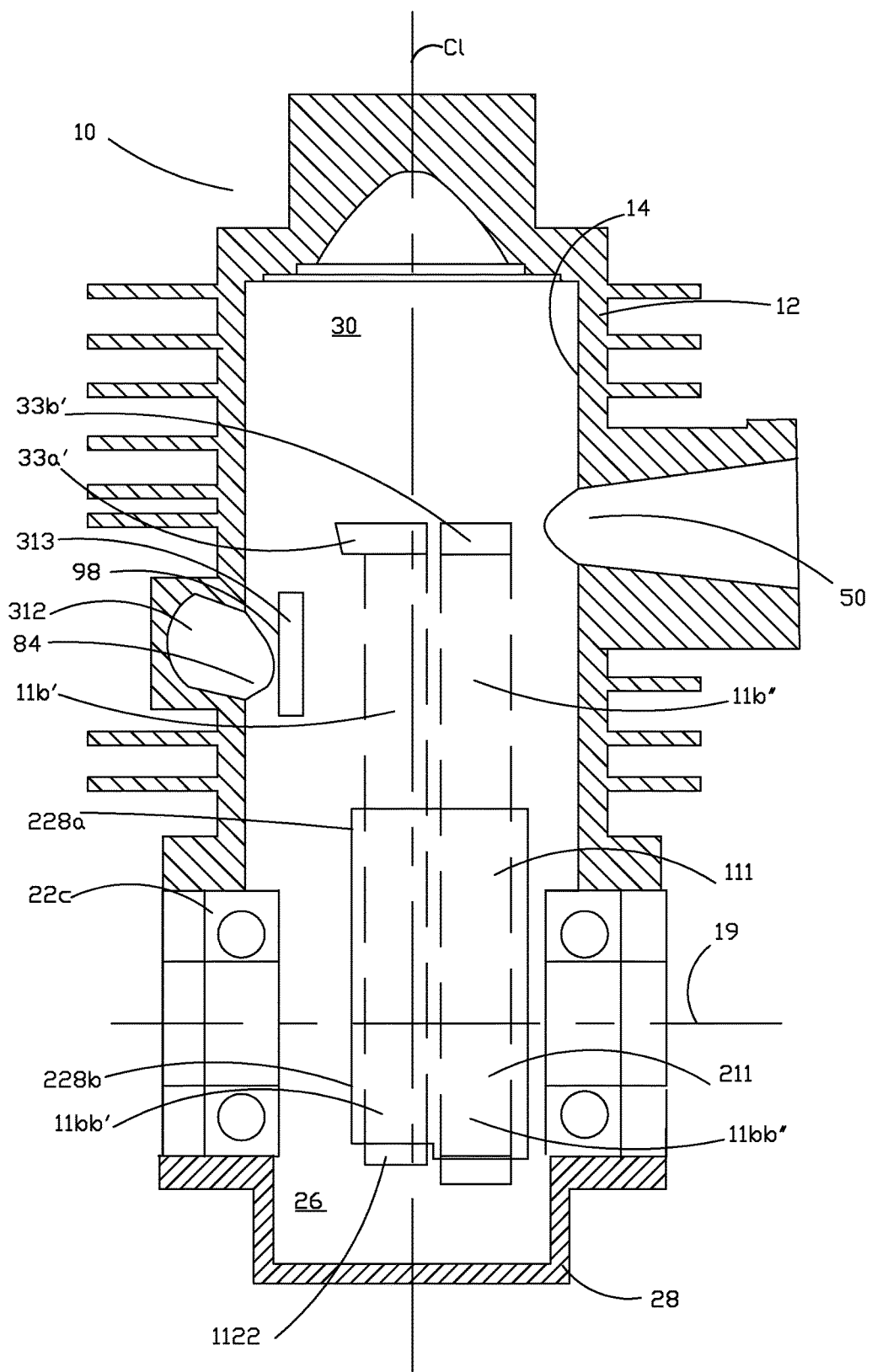
FIG. 9 is a longitudinal sectional view illustration of the two-stroke engine having the transfer passage channel in the crank case.
Figure 10:
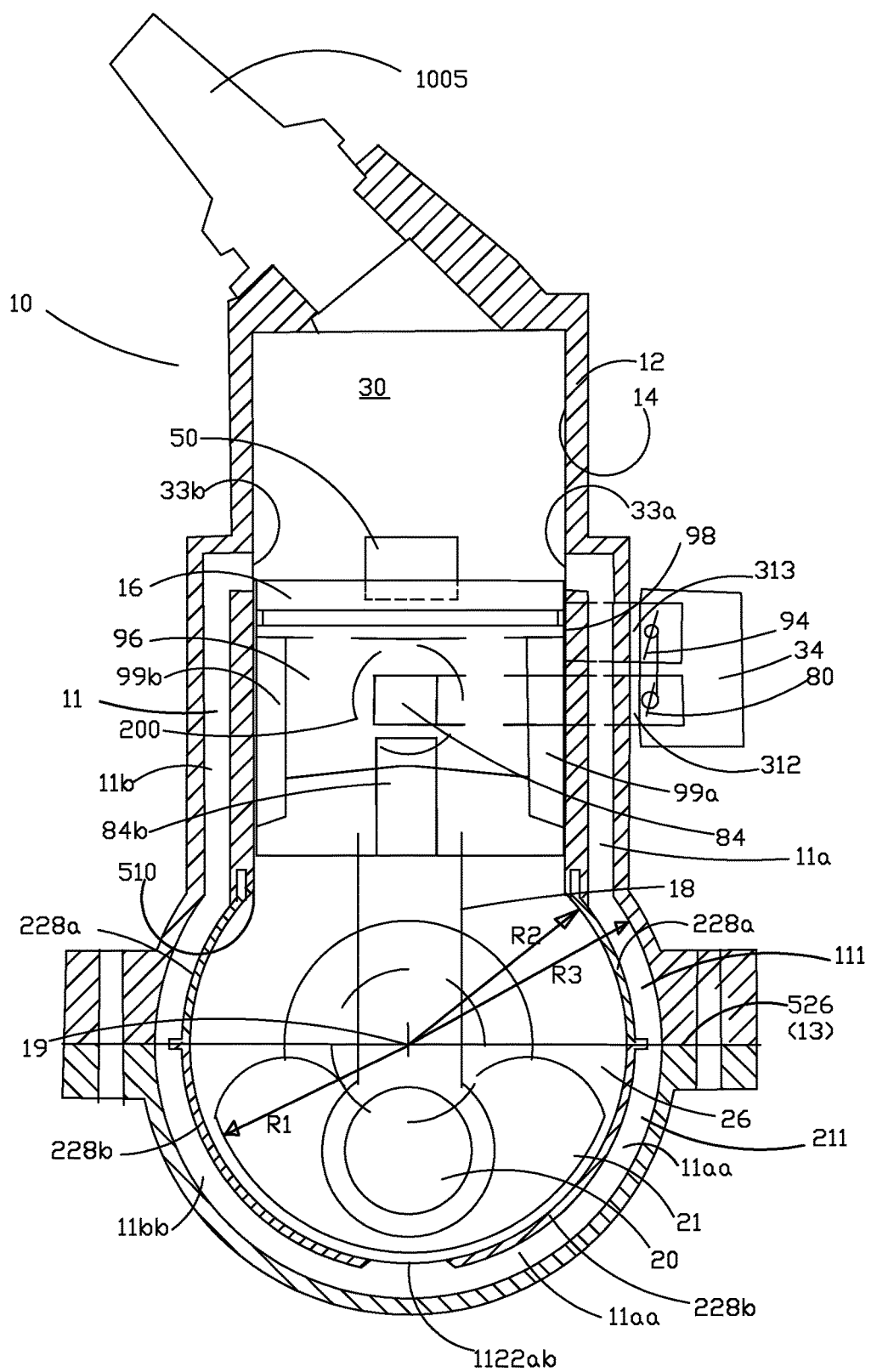
FIG. 10 is a sectional view of the engine shown in FIG. 9.
Figure 10A:
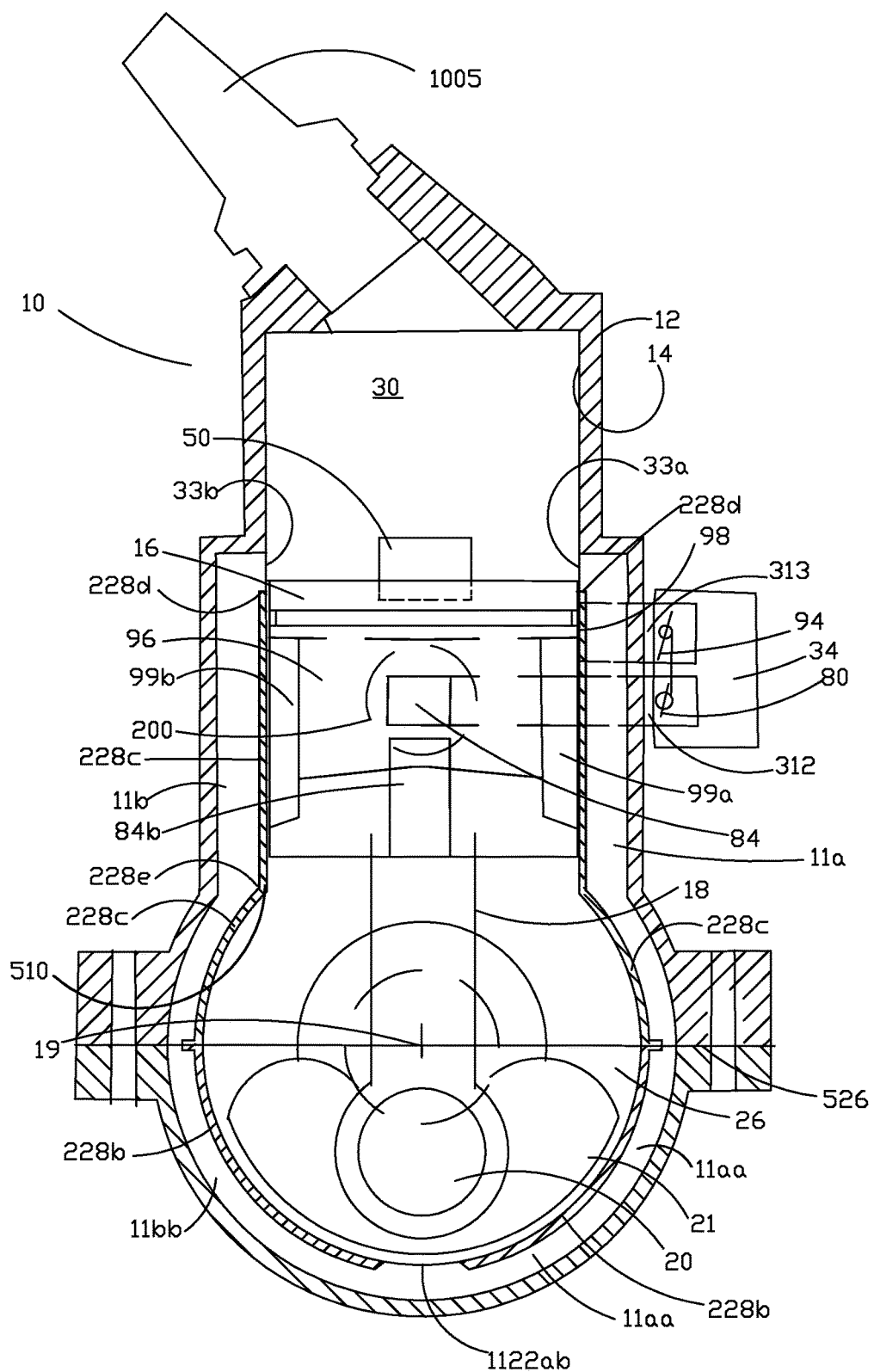
FIG. 10a is a vertical sectional view of the engine showing three pieces cover plates for transfer passages.
Figure 10B:
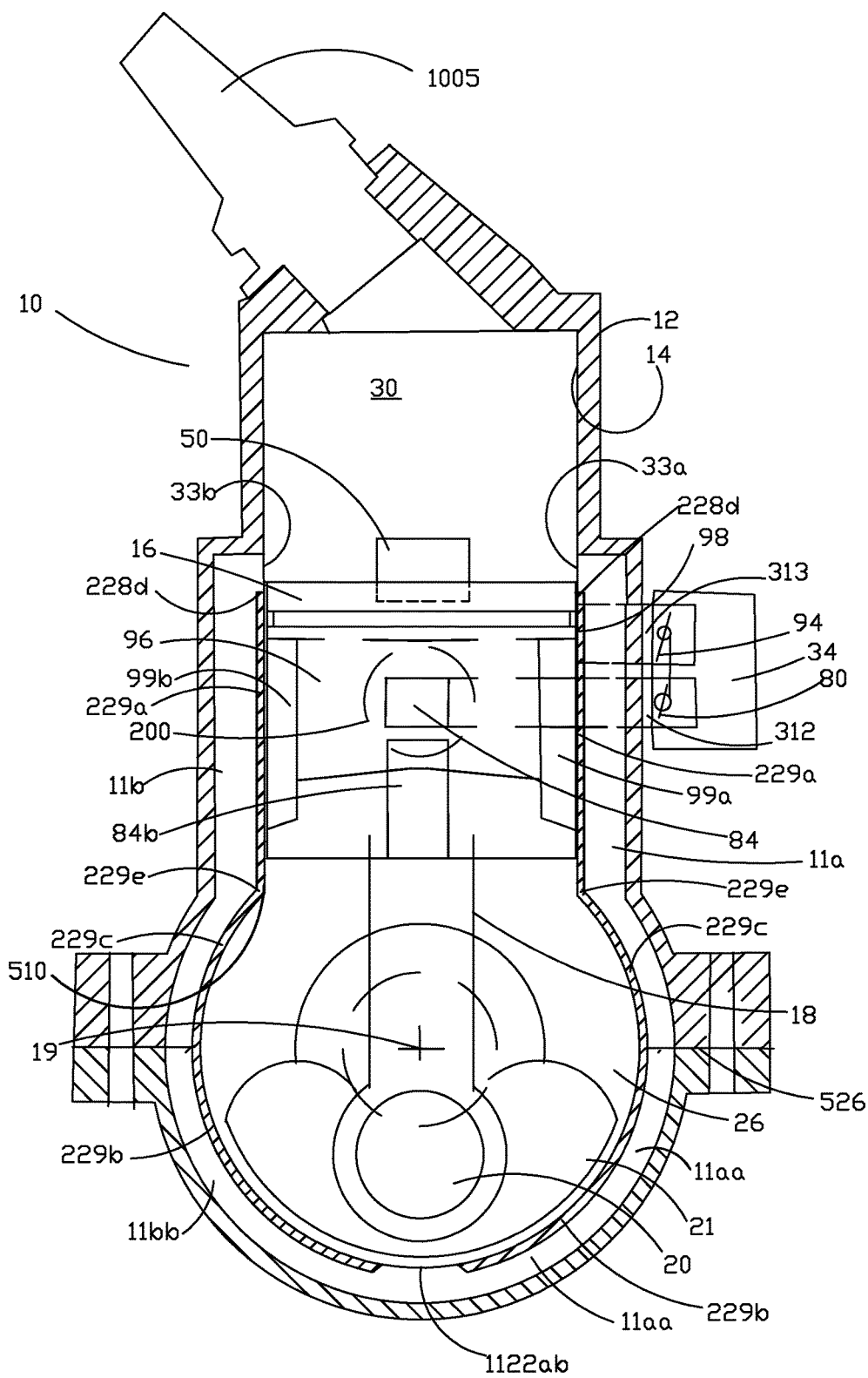
FIG. 10b is a sectional view of the engine showing a ONE piece cover plate for the transfer passages.

The following embodiments describe the open channel transfer passages in the crankcase and closing the channel passages with the lid or inserts to convert into closed transfer passages, necessary for the stratified engines. For example FIGS. 8, 9, 10b, and 10f, 11, 12, and 14 show two piece engine block consisting of an upper cylinder block 12 and a lower crankcase 28. The partition plane/mating surfaces of the two pieces is along a plane passing through the centerline 19 (CLs) of the crankshaft and the plane is perpendicular to the axis (Cl) of the cylinder 12. The upper cylinder block 12 has an upper cylindrical section having a bore 14 for sliding of the piston and section transitioning from cylindrical bore to the upper crankcase section up to the partition plane. The upper crankcase section encompasses cavity for the crank web 21 and main bearing 22c for crankshaft 22. Section where the crank web is rotating with crankshaft is more or less cylindrical and has its axis in line with the axis 19 of the crankshaft. The diameter of the crank web is larger than the diameter of the cylinder bore 14. In the embodiment disclosed in FIGS. 6 through 14, the transfer passages 11 (11a', 11a", 11b', and 11b") extend down into the crankcase 28. The unique feature of this embodiment is that the die casting of the passage (open channel) is made possible where a portion of the transfer passage in the cylinder 12 is cast as an open channel, particularly the lower section of the cylinder (upper crankcase) that has an inner wall to match in shape with the curvature of the outer diameter of the crank web 21. The passage in the crankcase has a channel that has the outer wall 228w having a radius (R3) larger than the radius (R2) of the inside radial wall 28rw of the crankcase 28 and the radius of the outer wall 228w is significantly larger than the radius of the inside wall 28rw. The radius (R3) is concentric to the centerline 19 of the crankshaft. The tooling made for die casting requires that the lower section of the transfer passage 11bb be an open channel. The section of the channel on the inside of the crankcase 28 is also an open channel, as shown in FIG. 10, because the crankcase is also die cast. Effectiveness of the longer transfer passage is nullified if the transfer passage remains as an open channel. However, by closing the channel, the channel becomes a closed passage and increases the effective length of the transfer passage. For example in the U.S. Pat. No. 6,491,006, the upper section (duct 7 in FIGS. 1, 2, and 3) of the passage is a open channel and a cast feature requiring the die casting tool to be pulled from the side. The passage (duct) requires a cover plate (lid 26, in prior art) and is fastened with screws on to the cylinder body as explained in column 5 lines 55-58. As described in column 6, lines 15-17, the insert 9 has three side walls 12, 13, 14 and requires the crank case on one side, which is the bottom side. Thus, it is clear that the transfer passage requires multiple parts, expensive insert, and additional lid on the cylinder body with fasteners to fasten the lid externally on to the cylinder. Joints are likely to cause leakage and require gaskets as well to help seal the lid. Such a design would be unsuitable for the embodiment disclosed in this application. As shown in FIGS. 9,10, 10a, 10b, 10,f, 11, 12, the transfer passage 11 has been divided into three sections; the upper passage in the cylinder 12 is 11(11a)(11b), the section of the transfer passage in the lower part of the cylinder (upper crankcase) wrapping around the crank web 21 is the lower passage 111(111a)(111b), and the section of the passage in the crankcase (lower crankcase) 28 is the 211(211a)(211b). The passage 11 in the cylinder 12 is more or less is straight and runs significantly vertically down along the cylinder. Therefore, it is easier to die cast the cylinder block. The transfer passage in the cylinder may be a closed passage and may not require any lid. However, the passage 111 in the lower section of the cylinder 12 (upper crankcase) where it wraps around the crank web 21, remains as an open channel up to the lower face 13 (526) of the cylinder block 12. The open channel 111 can be closed by a lid/plate 228a to form a closed passage. In other words, a closed passage is where it has four sides and all four sides have walls, with the exception of opening, called ports. The plate 228a is in the lower part of the cylinder (upper crankcase) above the crankcase 28 and is a segment of a ring which has a radius (R3) slightly larger than the radius (R1) of the crank web 21 and the segment its center of radius lies approximately on centerline 19 of the crankshaft 22. One end of the plate 228a is inserted inside a grove/cut out in the cylinder wall, as shown in FIG. 10. The other end may be wedged between the cylinder 12 and the crankcase 28 on the interface 526 (13), as shown in FIGS. 10-11. In the case when the transfer passage 211 continues into the (lower) crank case 28, as shown in FIG. 6-10, the open channel is closed by another plate 228b on the upper side of the channel and has a opening 1122ab in the center of the crank case 28 as shown in FIGS. 9-11 or anywhere else in the crankcase chamber, depending on the required length of the transfer passage. The plate 228b also has a radius (R2) slightly larger than the radius (R1) of the crank web 21 and the center of radius of the segment lies approximately on the center line 19 of the crankshaft.

Alternative to the plates 228a and 228b, the crank web may be of full circle (made of composite materials) having a tight clearance between the outer periphery of the web 12 and the inner surface of the crankcase 28 and the lower section (upper crankcase) of the cylinder. Thus outer periphery of the crank web itself can act as a lid to the open channel of the transfer passages 111 and 211. The opening of the transfer passage in the crank case 28 is accomplished by off-setting a section of the channel so that it is not covered by the web 21. In another embodiment shown in FIG. 12, two passages 11b" and 11b' are merged into a single passage 11bb", and the single passage 11bb" in the crank case 28 has a port 1123 that can be opened.

In embodiments disclosed in FIGS. 10a-10d, the transfer passages 11a in the cylinder portion may also have a plate 228a as shown in FIGS. 10a-10e. The invention discloses a method of extending the unique plate 528(529) into the crankcase chamber 26 to extend the length of the closed transfer passage into the crankcase chamber 26 without limitation of the crankshaft main bearing, crankshaft or the crank web. As shown in the FIGS. 10d and 10e plate 529 is a single piece for a set of transfer passages on both sides of the crankshaft 22 or the exhaust port 50. The single piece plate (or can be called cover) has a radius (R4) concentric to the axis (CL) of the cylinder 12 through the first length (L1) (L1a and L1b) of the plate in the cylinder portion 229a (228a in FIG. 10c) up to the bottom 510 of the bore 14, shown in FIG. 10a, and then transitions without discontinuity into second length (L2) of the plate in the crankcase portion 229c, shown in FIG. 10d. The second length (L2) of the plate in the crankcase portion 229c continues on both sides, to the left and right, into the first lengths (L1a and L1b, L1a=L1b in length) in the cylinder portion 229c without discontinuity. The second length (L2) is more or less concentric to the axis 19 of the crankshaft 22, but it does not have to be concentric. The second length L2 has a radius (R2) slightly more than the radius (R1) of the crank web 21 and the center of the radius is approximately on the center line 19 of the crankshaft. The crankcase portion 229c of the plate has at least one port 1122ab cut out in the plate for periodical gaseous communication between the crankcase chamber 26 and the combustion chamber 30. The port 1122ab can be opened and closed periodically by the crank web 21 if need be or kept open all the time. Therefore in the embodiment disclosed here, the plate has two radii R4 and R2, where in R4 is in the portion of the plate that is in the bore 14 and R2 in the portion of the plate that is in the crankcase chamber. The second portion 229c of the plate has at least two tabs 558a in the mid section on either side of the crankshaft axis 19, but can be at any other location, where the upper cylinder block 12 and the lower crankcase 28 meet at the interface 13 (526) and the tab 558a is intended to be sandwiched between the upper cylinder block 12 and the lower crankcase 28 for positioning the plate and help in assembling the plate. Therefore, the plates are not supported by the bearing and are farther away from the bearing in the embodiment disclosed in FIGS. 10-10e.

In another embodiment, shown in FIGS. 10a-10c, the plate is a set of at least three separate pieces per cylinder; the first and second plates are in the cylinder portion 228a and upper crankcase portion 228c partly in the upper portion of the upper crankcase in the cylinder block 12, and the third plate 228b is in the lower half of the crankcase 26, which is below the axis 19 of the crankshaft. The first and the second plates meet with the third plate at the interface 526 (13) between the upper cylinder block 12 (or upper half of the crankcase) and the crankcase 26. They all have tabs 558a in the upper crankcase plates and 558b in the lower crankcase plate) at the ends of the plates where they meet to aid in positioning the inserts in place and to aid in the assembling of the parts. The tabs are sandwiched between the cylinder 12 and the crankcase 28 at the interfacing surface 526 (13), as shown in FIG. 10a.

The upper plates have radius (R4) concentric to cylinder bore 14 in the cylinder portion of the insert 228a and continue without discontinuity into the upper half of the crankcase and the portion of the plate 228c in the upper half of the crankcase has a radius (R2) concentric to the axis 19 of the crankshaft 22. The third plate 228b in the crankcase 26 (lower crankcase) has a radius (R2) concentric to the axis 19 of the crank shaft 22. The third plate has at least one port 1122ab cut out in the insert for periodical gaseous communication between the crankcase chamber 26 and the combustion chamber 30 at the transfer port 33. Alternatively, the first and second insert may have at least one port in the upper crankcase portion of the insert. In that case, there will not be need for the third insert. The lower and the upper crankcase have corresponding channels 111 and 211 (11aa and 11bb), as shown in FIGS. 9 through 10b, 10f, 11, and 12, that form part of the transfer passages. The locking feature for the cylinder portion of plate can be like a "V" grove in the cylinder or the plate to keep the plate from moving. Also, it is not necessary for the plate in the cylinder portion 229a and 228a to be concentric to the cylinder axis (CL) along the entire length L1a. Only a fractional length near the transfer port 33a and 33b, identified as curvature face of the plate 528 in FIG. 10e can be concentric, for example just up to 2 to 3 mm below the lower edge of the piston ring. The remainder length can have a straight face (body). The straight section can be multiple sections of finer width having straight section. The inner surface of the plate within the transfer passage (duct) can have spiral (helix) shaped sections, to provide swirling action to the gas passing from crankcase chamber to the combustion chamber and to have a longer transfer passage.

Figure 10F:
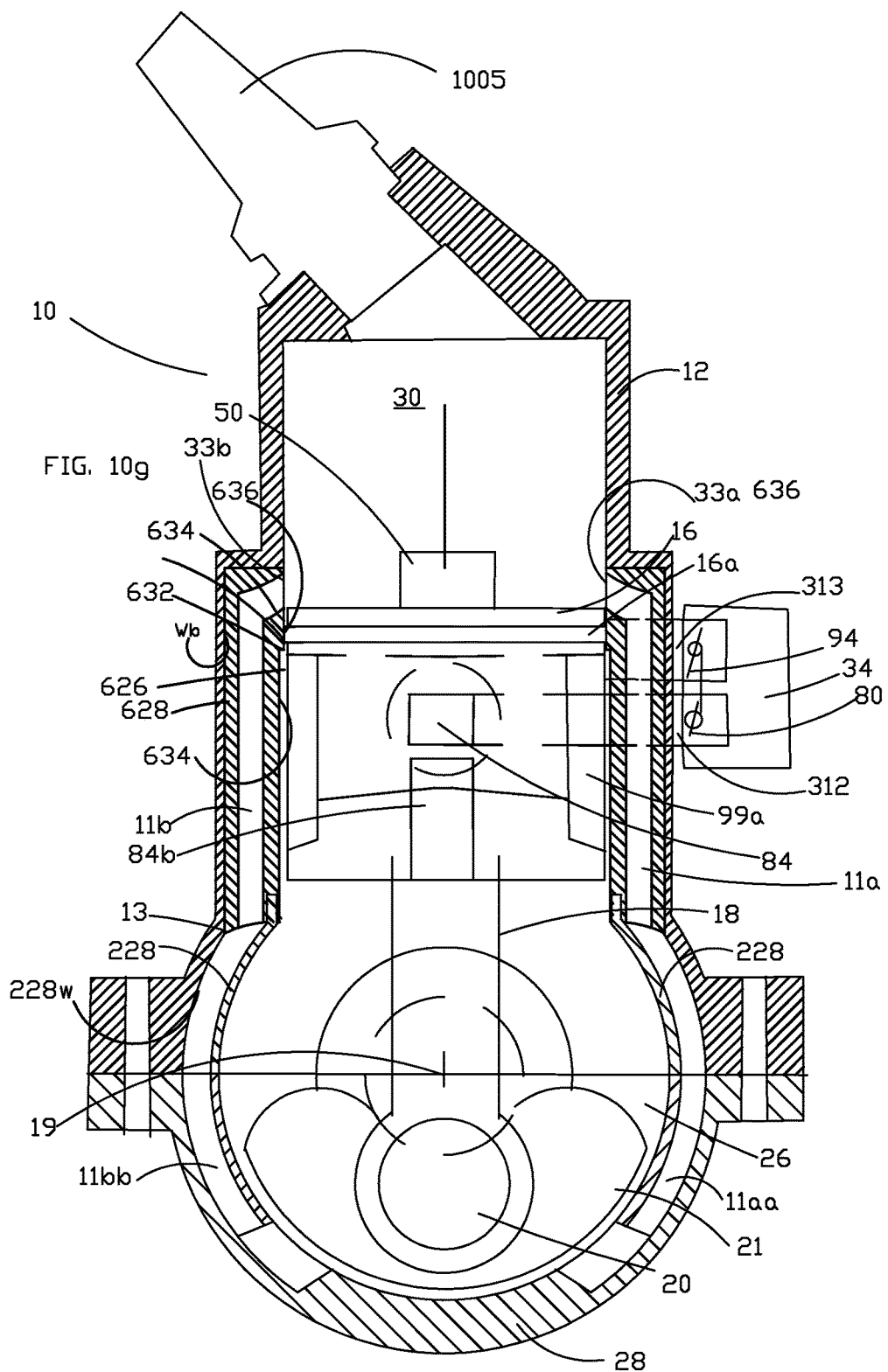
FIG. 10f shows sectional view of the engine having tubular transfer passages in the cylinder portion.
Figure 11:
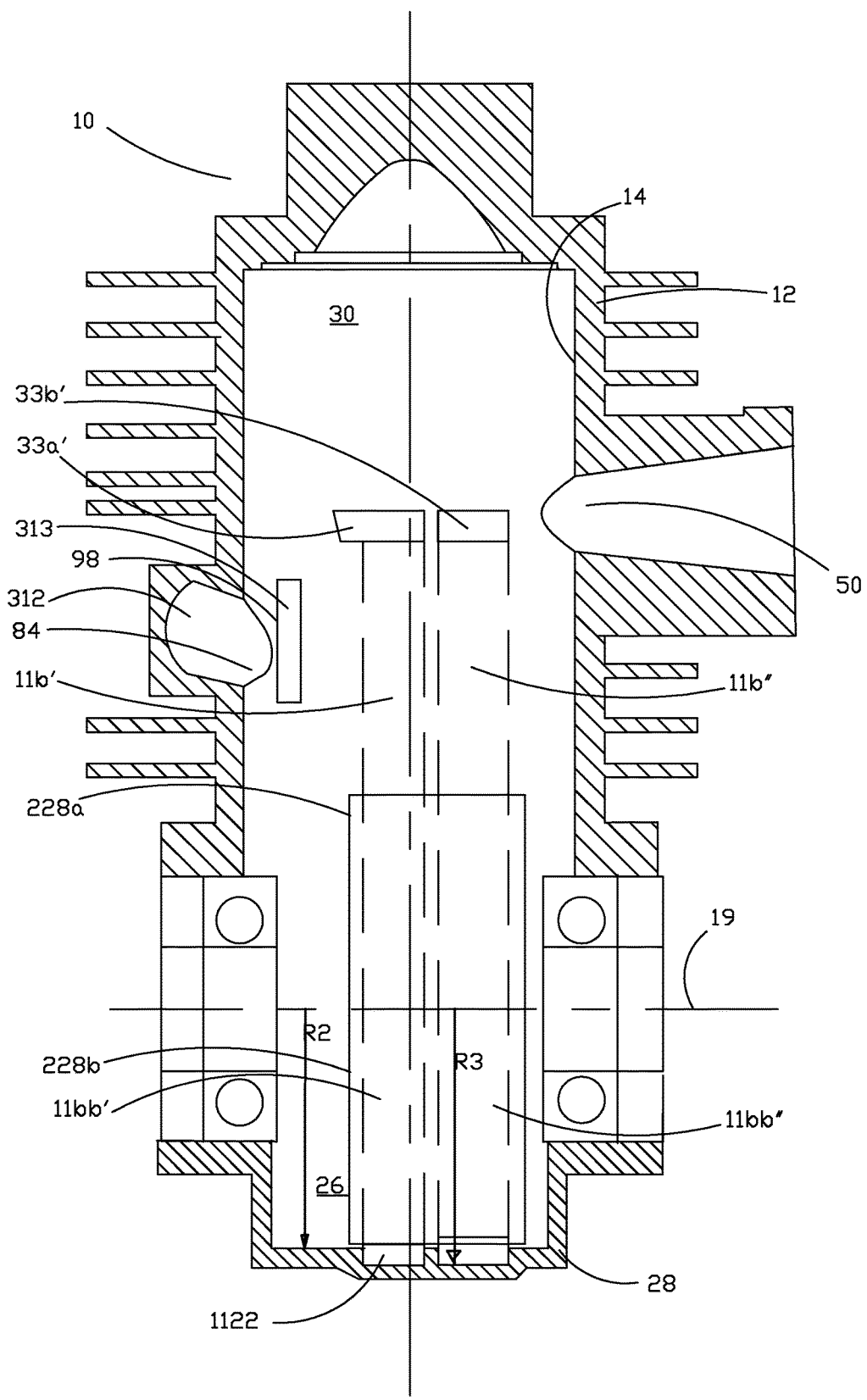
FIG. 11 is a sectional view of the engine having another version of the transfer passage in the crankcase in which transfer passage extended all the way to the bottom of the lower crankcase 28.
Figure 12:
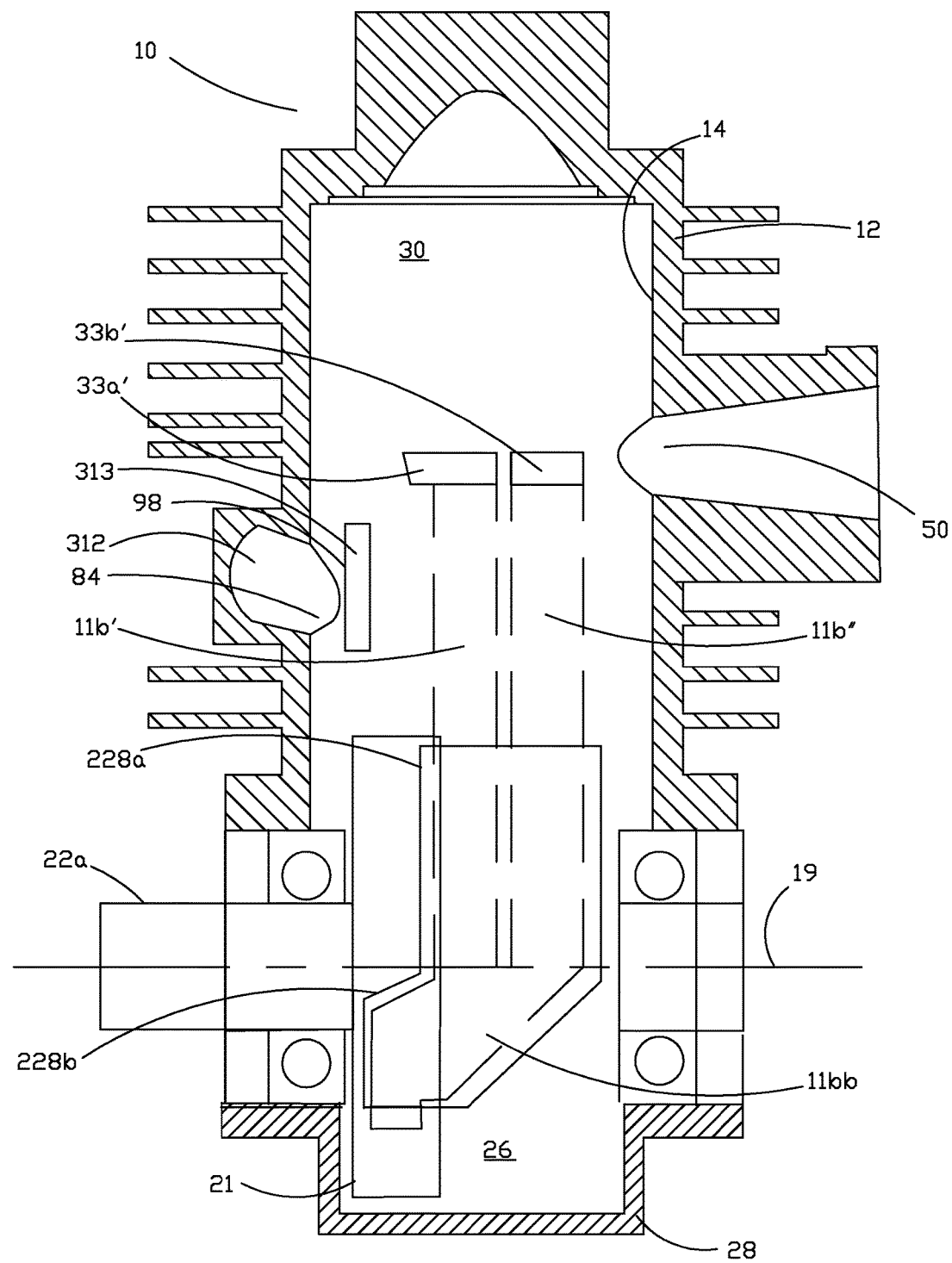
FIG. 12 is a sectional view of the two-stroke engine having transfer passage channel in the crankcase closed by the periphery of the crank web or a plate on the web.
Figures 13, 13B:
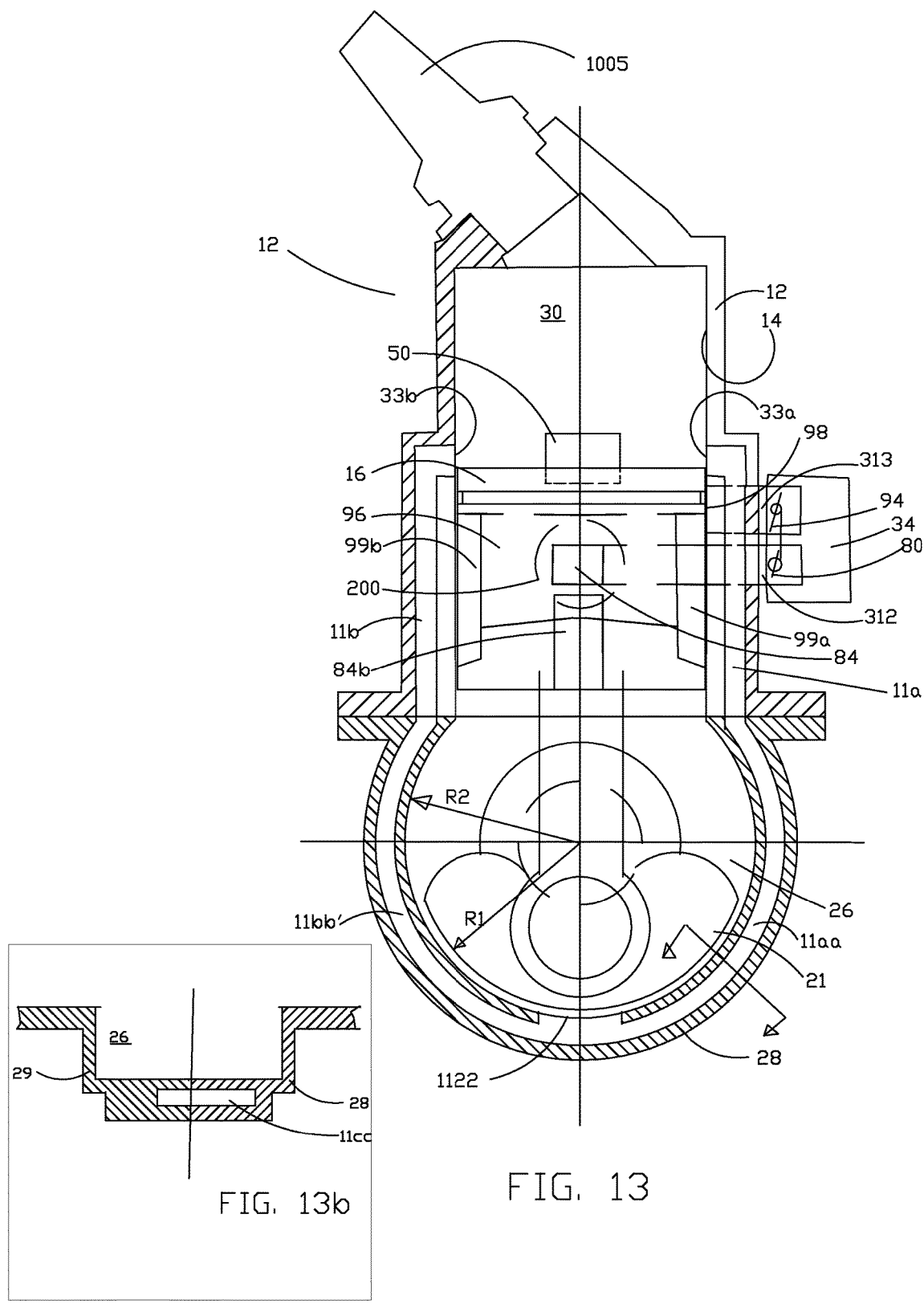
FIGS. 13 and 13b are views of the crank case showing the transfer passage channel and having a fraction of the passage on the interfacing faces of the two halves of the crankcase.
Figure 14:
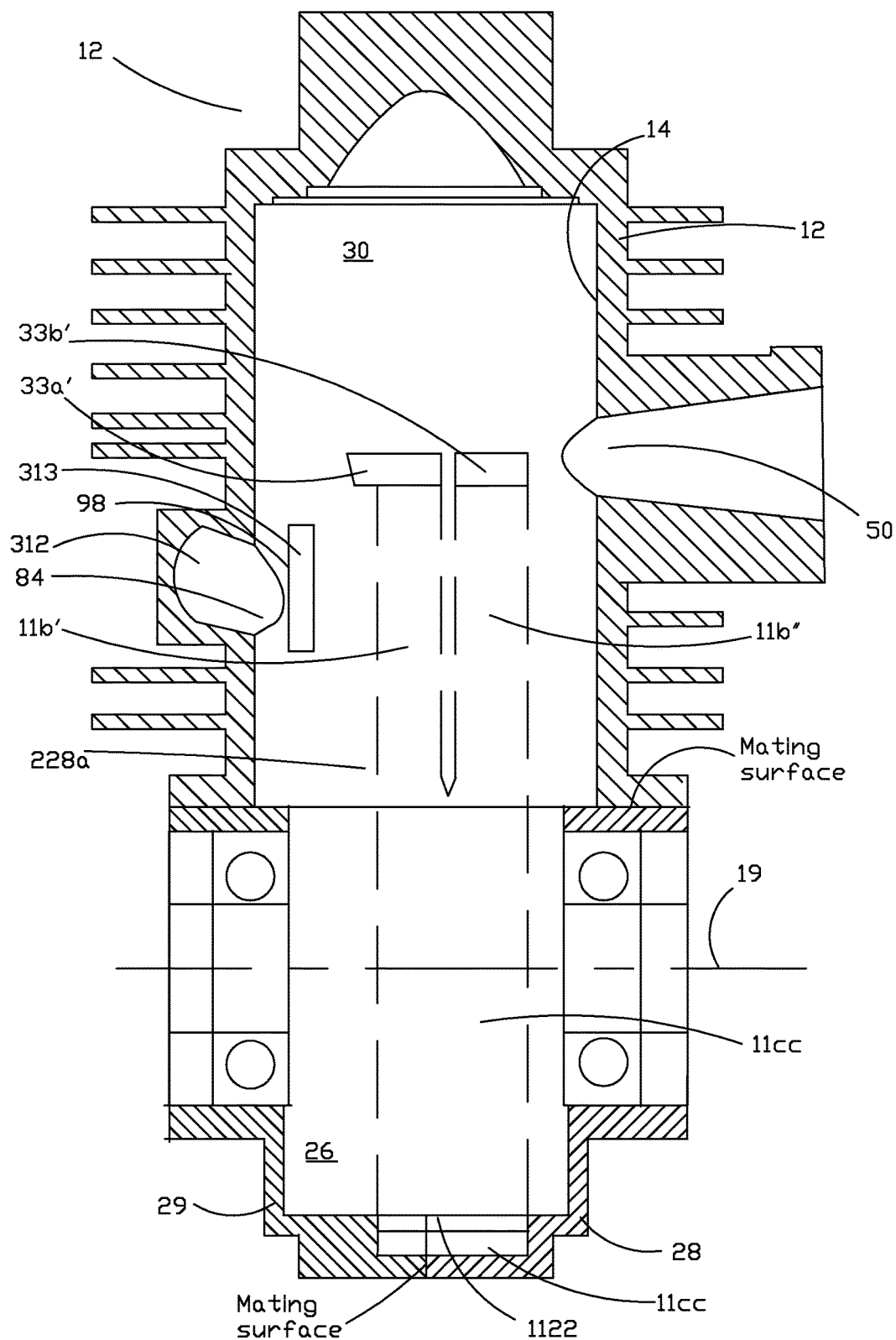
FIG. 14 is a sectional view of the engine having two transfer passages merge into one passage in the crankcase.

In another embodiment, shown in FIG. 10f, the transfer passage 11 is comprised of a duct 628 having a cross sectional shape of either circular, rectangular or any other shape that is inserted into the open die cast transfer passage having at least three walls Wa, Wb, and Wc of the cast passage 11, 11a" (11a') as shown in FIG. 10h. The tubular duct 628 is retained on all three sides of the cast passage by the respective walls (Wa, Wb, and Wc). The duct 628 has a radial shape only at the top section 636 of the duct for a fractional height from the top end 634 to just below the piston ring 16a at a position when the piston is at BDC. The height of the radial section of the duct 636 along the axis of the cylinder is only between the top edge 634 and the lower edge 632, shown is 10g, which is located just below the position of the piston ring 16a when the piston is at BDC. The section below the edge 632 is either flat in shape or has a radius, but has a radius larger than the radius of the bore 14 and radius of the piston 16. As such the face 634 of the duct 628 is flat along the length of the cylinder up to the bottom end 510 of the cylinder. The lower edge 632 is at least 4 mm to 10 mm below the lower ring reversal point when the piston is at BDC. Reversal point is the position of the lower piston ring when the piston is at BDC. The inner four walls of the duct may have at least one serrated section to prevent oil film and drop lets from entering the combustion chamber during the scavenging process. The oil drops are drawn back into the crankcase chamber 26 during the induction of ambient air into the transfer passage 11. The plate 228 in the upper crankcase is attached to the bottom of the tubular duct. Unlike the prior art disclosed in U.S. Pat. No. 5,379,732, the upper duct 628 may be of fixed length. The upper section of the duct 628 can be molded to have complex shape directing the air upward and away from the exhaust port 50. The duct 628 has an opening into the transfer port 33a (33b) and an opening into the transfer passage 11bb (111aa) in the crankcase 26, as shown in FIG. 10f. The duct 628 in the cast transfer passage can be retained by a wedge shape (Wv) cast on inside wall Wb of the transfer passage, as shown in FIG. 10h. The outer wall 228w of the lower passage 111(111a)(211a)(111b)(211b) may have serrations cast into the body to collect oil as the charge flows into the combustion chamber. Alternative to having an open channel and a insert in the crankcase 28, the two halves of the crankcase 28 in certain types of crankcase design, the crankcase can be split into two halves vertically along the plane A, that is perpendicular to the crankshaft axis 19 and one or both of the two interfacing faces of the two crankcases can have open channel 11cc to form a closed channel 11aa as shown in FIG. 13 and FIG. 13b.

Figure 16:
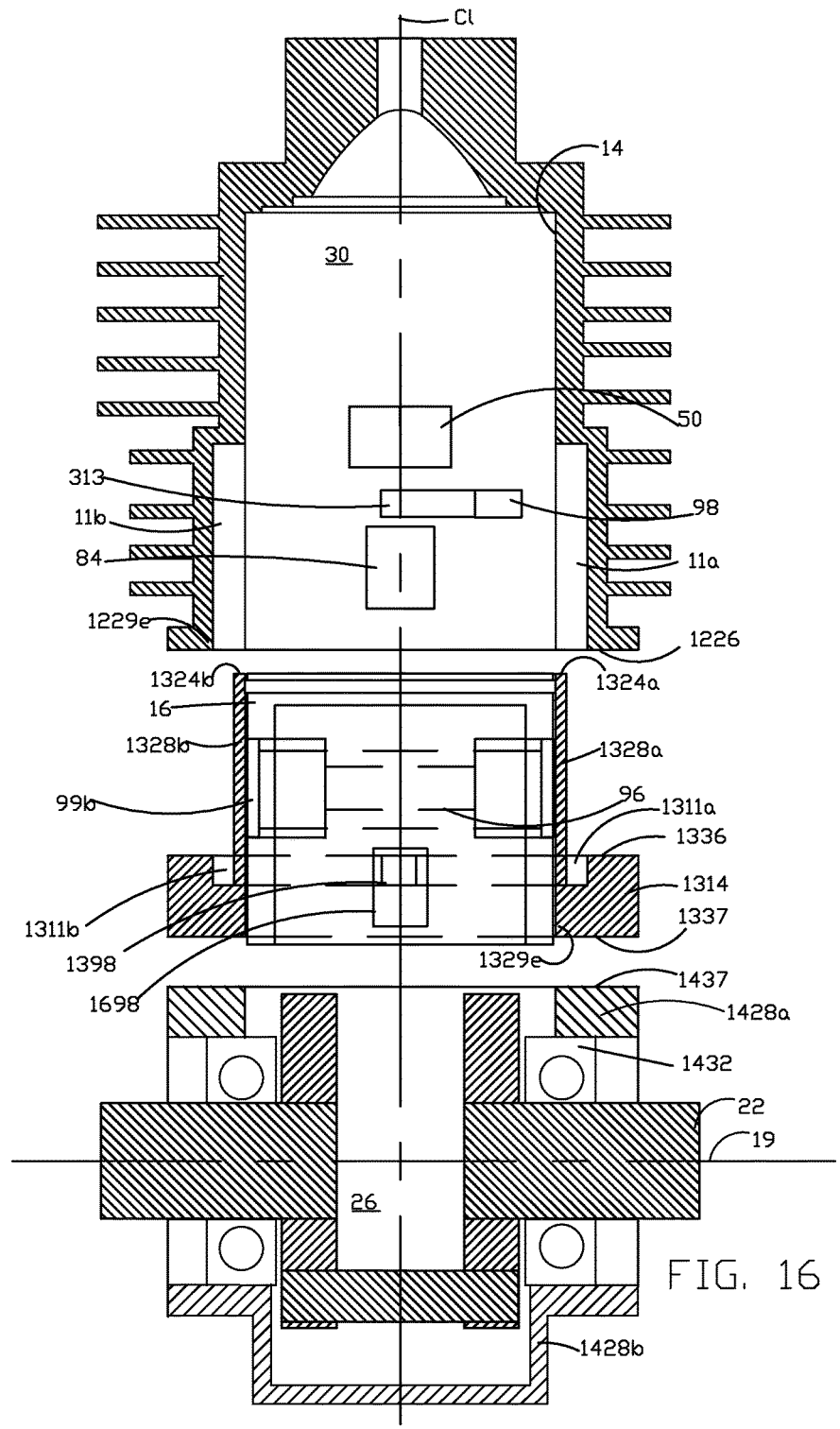
FIG. 16 shows cylinders and crankcase separated vertically to show the assembly of the engine 1100 shown in FIG. 15.

In another embodiment shown in FIGS. 15 through 16 the engine 1100 consists of an engine block 1120 made up of three parts, an upper cylinder 1212, lower cylinder (also known as upper crankcase) 1314, and a lower crankcase 1428. The piston 16 slides up and down in the upper and a section of the lower cylinders periodically opening and closing the exhaust port 50 air inlet port 98, air-fuel inlet port 84, transfer ports 33 (33a' and 33a). The piston 16 also has a port or a slot 1698 cut out on the skirt of the piston to keep the air port 1398 in the lower end of the bore 14 uncovered during the gas exchange processes, as shown in FIG. 15. The crankcase port 1398 is off-set from the inlet port 84. The gas exchange occurs when the piston is moving upward inducting air in to the transfer passages 11 and during the scavenging process where air stored in the transfer passage is then transferred or forced into the combustion chamber 30 through the transfer ports 11a and 11a' followed by the air-fuel mixture that is in situ in the crankcase changer 26 through the same transfer passage and the ports. The embodiment discloses that the transfer passage cover 1328a and 1328b, shown in FIG. 15 through 16, extending into the upper cylinder to form an inner wall of the transfer passage 11 is integral with the lower cylinder 1314 (also known as upper crankcase) and the lower cylinder 1314 has a portion of the transfer passage/channel 1311a and 1311b as a channel on the flange or the interface 1336, as shown in FIG. 15-16. The interface 1336 mates with the interface 1226 of the upper cylinder 1212 to form an enclosed transfer passages 1311a and 1311b or a duct. The two passage 1311a and 1311b merge together and open into the inside of lower cylinder 1314 at the crankcase port 1398. The transfer cover/plate 1328a and 1328b is only a segment of the cylindrical portion along the length of the axis of the cylinder (Cl). Air inlet passage 313 has an air inlet port 98 in the bore 14 at one end and an inlet 98' at the carburetor/heat dam end as shown in FIGS. 15a, 15b, and 15d. FIGS. 15a through 15c show cross sectional views of the cylinder block at different planes when the piston is at BDC. FIG. 15d shows sectional view of the cylinder at position when the air inlet port 98 is open and air-fuel inlet port 84 is still closed. The piston 16 has cut outs as disclosed with other embodiments for the transfer of air from ambient into transfer passages 11a through the windows 100a and 100b and ports 99a and 99b. The air passage 96 between the windows 100a and 100b may be a separate tubular piece that will also act as a pressure balancing passage between the piston windows. The air passage 96 shown is more or less parallel to the piston pin 200 and provides a shortest distance between the windows.

FIG. 16 shows the engine block consisting of an upper cylinder 1212, lower cylinder 1314, and the crankcase 1428 separated vertically for clarity. The lower cylinder 1314 and lower crankcase 1428 can be fastened together prior to assembling into the upper cylinder 1212. The lower cylinder (upper crankcase) 1314 and the lower crankcase 1428 capture the main bearings 1432. In FIGS. 15 through 16, only outlines of the Piston 16 are shown to indicate the locations of the ports and windows. The connecting rod is not shown in the Figures for clarity of showing ports. The person skilled in the art can understand the functionalities of the features. It must be noted that a portion 1311 of the transfer passage 11a can be on the interface 1226, 1336, or 1437. It is also possible to make the transfer passage cover/plate out of any thin material that can withstand the cylinder wall temperature of 500 degrees F. or so. For example sheet metal can be forged or bent to make part of the transfer passage. Therefore, it is clear from the above description that the transfer passage plate 1328a and 1328b are integral to the lower cylinder 1314 and they form only a fraction of the circumferential segment of the bore 14, and are not supported by the bearings. A section of the transfer passage in the interface can traverse upward into the upper cylinder and it can be covered by a shorter plate. In that case the opening of the end of the transfer passage is in the upper cylinder. Therefore, the transfer passage will periodically establish gaseous communication between the combustion chamber 30 and the crankcase chamber 26 through transfer port 33 in the cylinder and an air port 1398 near the bottom of the cylinder.

Figure 17B:
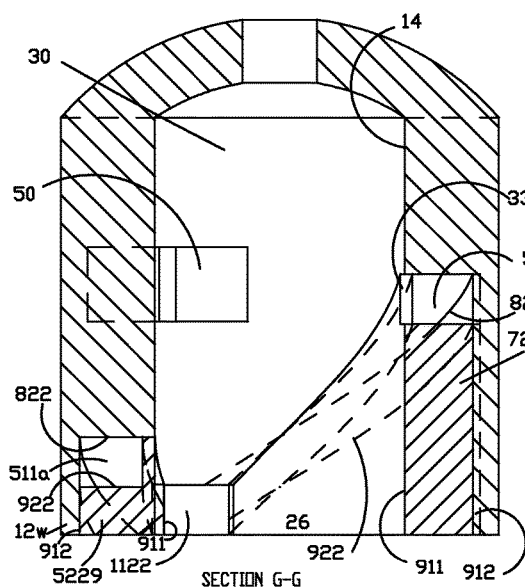
FIGS. 17a and 17b show perspective view and sectional view of a two-stroke engine cylinder shown in FIG. 17.
Figure 17A:
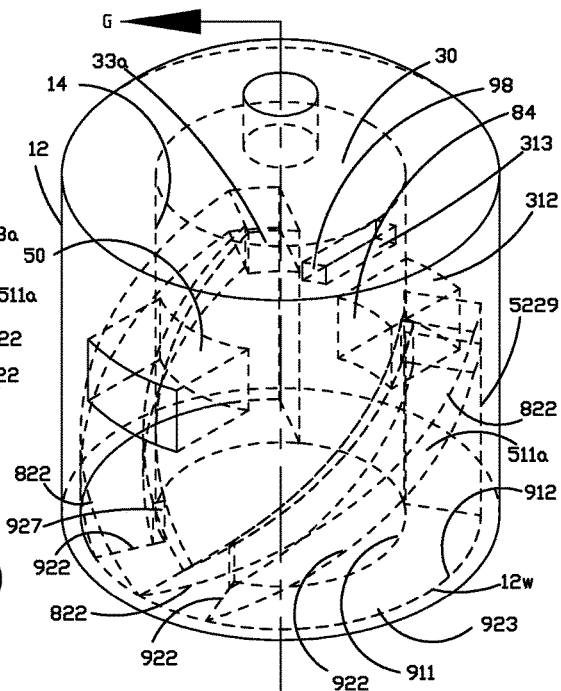
Figure 17:
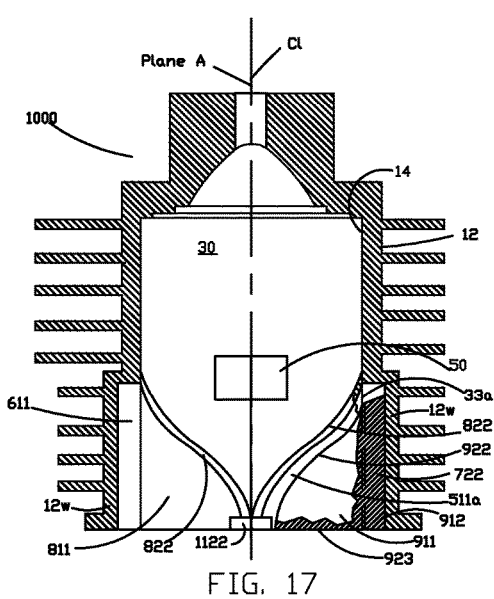
FIG. 17 shows cross sectional view of a two-stroke engine cylinder having a spiraling (like a helix) transfer passage (511a).
Figure 17C:
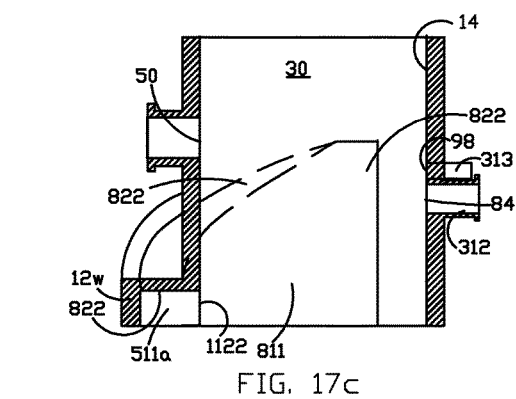
FIG. 17c shows another view of the cylinder shown in FIG. 17, but without the insert.

FIGS. 17 through 18b—disclose spiraling (helix like) transfer passages in a two-stroke engine cylinder. FIGS. 17 through 17g show the cylinder having an open cavity 811 and FIGS. 18 through 18c show the cylinder having a closed cavity 811. An open cavity 811 is a recess in the lower section of the cylinder bore 14 having an outer wall 12w. The radial distance of the outer wall 12w is greater than the radius of the bore 14 from the axis Cl of the bore 14. The closed cavity 811 is a space between the cylinder bore 14 and outer wall 12w, but having openings along vertical cavity 611 on one side and at the bottom 923. The nominal circumferential length (Lc) of the cavity 811 at the bottom and the nominal circumferential length (Li) of the insert 5229 at the bottom are greater than (at least 1.5 times) the nominal circumferential width (L33) of the transfer port (33a or 33b). FIG. 17h shows an example of the insert (plug) used in conjunction with the cylinder shown in FIG. 17 and FIG. 18d shows the insert (plug) used in cylinder having closed cavity type cylinder. The cylinder block 12 comprises at least one spiraling cavity 811 starting at the lower end 510 of the cylinder bore 14 and spiraling up toward the transfer port 33a, which can have an inner cylinder wall 14b shown in FIG. 18b in the section of the cylinder having the insert 5229 and the cavity 811, which then forms an enclosed cavity 811. The inner wall 14b is integral to the cylinder block 12 and the cavity 811 has an outer wall 12w, a ceiling 822 spiraling upward like a helix or spiral, and an opening at the transfer port 33 of the cylinder and a port 1122 at the bottom. This means the transfer port 33 in the combustion chamber and the crankcase case port 1122 are axially and circumferentially offset from each other and preferably the port 1122 is axially below the exhaust port toward the crankcase chamber. The sector of the cavity extends circumferentially from the port 1122 at the bottom to the vertical open channel or a passage (cavity) 611, which is in line axially with the transfer port 33a. The opening at the bottom of the vertical channel (cavity) 611 is at least 1% more than the width of the transfer port 33a, which is the draft required for die casting the cylinder. Alternatively, the spiraling cavity 811 can be an open cavity without the inner wall 14b, as shown in FIGS. 17, 17a, 17b, and 17c. However, the spiraling open cavity is closed by having a matching spiraling insert 5229 that fits into the open cavity to form a closed spiraling passage at the top of the insert 5229, shown in FIG. 17b and the insert is shown in FIG. 17h. The transfer passage 511a is called spiraling passage because the passage spirals down from the transfer port 33a at the top toward the crankcase chamber 26 or the bottom of the cylinder block 12, similar to a spiraling staircase in a light house. The lower end of the spiraling passage 511a has a crankcase port 1122 opening into the crankcase chamber 26. The spiraling passage can open at the lower end of the cylinder bore 14 or in the upper crankcase portion 228c or into the lower crankcase portion 1428. The vertical cavity 611 is plugged by the insert 5229 from bottom while leaving an opening at the top and the opening is the transfer port 33a, as shown in the right section of FIGS. 17 and 17b. The bottom of the insert 5229 need not be supported by the bearing. The spiraling cylinder cavity comprises a ramp ceiling 822 ramping down from the top of the transfer port 33, wrapping around the outer wall 12w of cylinder 12, toward the lower end of the transfer passage 511a and ending at crankcase port 1122. The ramp ceiling 822 is integral to the cylinder block 12. The spiraling cavity 811 has an outer wall 12w on one side and an inner wall 14b on the inside of the cavity 811 in a closed type cavity. It has vertical portion 611 and the passage 611 can be either open or closed type as in any current two stroke engine. However, embodiments disclosed here have open channel, which is cost effective to manufacture. FIGS. 17b and 17c show just the cylinder having the cavities 811 and 611. The bottom (opposite to the ramp ceiling) side of the cavities 811 and 611 is completely open before inserting the insert (plug) 5229. In an open type cavity 811 shown in FIGS. 17 and 17c, the inner wall 14b does not exist, and in that case, the inner face 911 of the insert 5229 is raised to contact the cavity ceiling 822 to form a closed passage 511a, outer wall 912 of the insert 9229 rests against the outer wall 12w of the cylinder. FIG. 17c shows just the insert 5229 having a spiraling insert floor 922 (also called insert ramp 924 or top face of the insert) ramping down circumferentially from the insert top face 523 down toward the bottom 923 of the insert 5229. As shown, the height of the insert 5229 is gradually decreasing from top to the bottom as the floor 922 ramps down. The floor 922 constitutes at least one of the walls of the closed transfer passage 511a. The insert has a vertical insert block 722 that matches with the vertical channel or passage (cavity) 611 in the cylinder block 12, the outer wall 912 seats is against the outer wall 12w of the vertical passage 611 and therefore does not allow any gas to flow straight down the vertical passage 611. The depth 723 of the insert block 722 is same as the depth of the passage 611, and therefore, unlike the previous art, the insert completely blocks the vertical passage 611, and instead the passage for the transfer of charge is provided through a spiraling transfer passage 511a along the top face or ramp 922. The bottom 923 of the insert passage is supported by the upper crankcase 1314 or lower crankcase 1428 (28), as the case may be. The spiraling is generally preferred to ramp down toward the lower side of the exhaust port 50 to achieve longer passage and a smoother ramp angle. However, passage can also spiral toward the intake port 84. The inner wall 911 of the insert has a radius slightly larger than the radius (R4) of the cylinder bore 14 and the outer wall 912 has a radius to match with the radius or contour of the outer cylinder wall 12w. The lower side of the insert can extend into a section of the upper crankcase if the cylinder block 14 extends down to form upper portion of the crankcase (as shown in FIG. 3), particularly when the engine block consists of two piece assembly, the upper cylinder block 12 and the lower crankcase 28. The insert 5229 can be integral to the lower cylinder block 1314 as in the engine shown in FIGS. 15 and 16 if the engine block is comprised of three pieces; cylinder block, upper crankcase, and a lower crankcase. The top face 523 of the vertical block of the insert can be angled to direct the flow of the charge appropriately away from the exhaust port and upward. The edges of the ramp in the insert may have soft gasket for air tight fit between the insert and the cavity. The insert 5299 may be a hollow or have a cored out cavity to reduce the weight and material cost. The cavity is cored out from the bottom side 923. In order to show the difference with and without the insert, right side of the cylinder is shown to have the insert while left side is shown not to have the insert in FIG. 17. FIG. 17e shows cross sectional view of the insert and it shows the channel 926 having three faces enclosing the spiraling transfer passage. The channel on top of the insert 5229 has two side walls; 927 on the inner side of the insert and a wall 929 on the outer side closer to the inner face of the cylinder wall cavity 811. The channel can be of U shape having either sharp corners or rounded corners. The floor and the side walls may have serrated finish to capture the oil flowing toward to the combustion chamber 30 and return to the crankcase by virtue of flow of air into the crankcase during intake stroke. The serration is shaped to prevent flow of oil deposit sticking to the walls of the channel FIG. 17f shows U channel having only the inner side wall 927. In this case, the inner side wall of the cylinder cavity 811 itself acts as one of the walls to form the channel Therefore, as disclosed the spiraling channel acts as at least a portion of the transfer passage and has the advantage of achieving a longer transfer passage than in a conventional two-stroke engine, secondly it helps separate the oil (mist and droplets) present in the air-fuel mixture when it flows from crankcase chamber 26 into the combustion chamber 30. The top faces of the side walls may have a softer material or a gasket to press against the cylinder cavity to make the channel a tight enclosure from one of the channel opening into the crankcase chamber to the other end opening into the transfer port 33. It must be appreciate that the insert 5229 may be made up of two pieces, a vertical insert block 722 and the helical section having ramp and the vertical block 722 does not have any passage and it simply blocks the vertical passage 611. As described, the insert 5229 has an inner wall 911 and an outer wall 912, the transfer passage is formed by virtue of having a ceiling 811 in the cylinder 14, a floor (or ramp) 922 on the top face of the insert 9229, outer wall 12w on one side, and either cylinder wall 14b on the other side (or raised edge 927) of the face 911. Therefore, unlike the prior art disclosed, the insert does not have a passage behind the outer wall 912 and therefore fore has an advantage of providing a longer transfer passage and locating the crankcase port 1122 (aperture 162 shown in FIG. 2 of U.S. Pat. No. 6,848,399) farther away from the bearing. The insert material may be made of non-metallic, such as high temperature plastic. IN essence, the insert 5229 acts as a plug in the cavity 811, but has a passage above the top face 922 of the plug called insert. It must be noted that more than one passage 511a may be incorporated in each insert either branching near the port out to individual transfer ports in a multi ported engine or have individual passage all the way from the crankcase. It must be note that the insert 5229 and the cavity 811 does not need to have the vertical cavity 611.

Embodiment disclosed in FIG. 19 takes advantage of having air passage in the piston to distribute air into transfer passages on either sides of the piston while only one air inlet is used, by using only one reed valve assembly 88c that acts as a cover plate 88b for the transfer passage 11 that is to the right of the Plane A. In this arrangement air from ambient is supplied to the reed valve assembly 88c through only one air pipe 88a and a fraction approximately 50% of air flows into the transfer passage closer to the reed assembly and the remaining fraction of air approximately 50% flows through the air passage that is entirely inside the piston to the other transfer passage farther away from the reed valve assembly. Therefore, the advantage is that only one set of reed can be used and also cool the piston by having air passage in the hallow piston or a tubular passage 96 entirely inside the piston. Therefore, it is cost saving design.

Figure 17D:
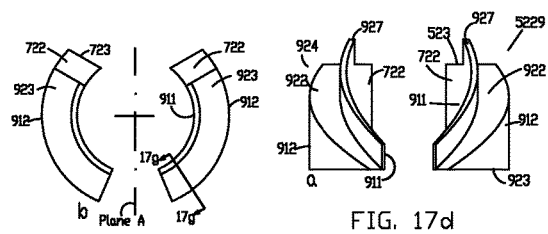
FIG. 17d shows top view and rear view of the insert 5229 used in cylinder shown in FIG. 17.
Figure 20:
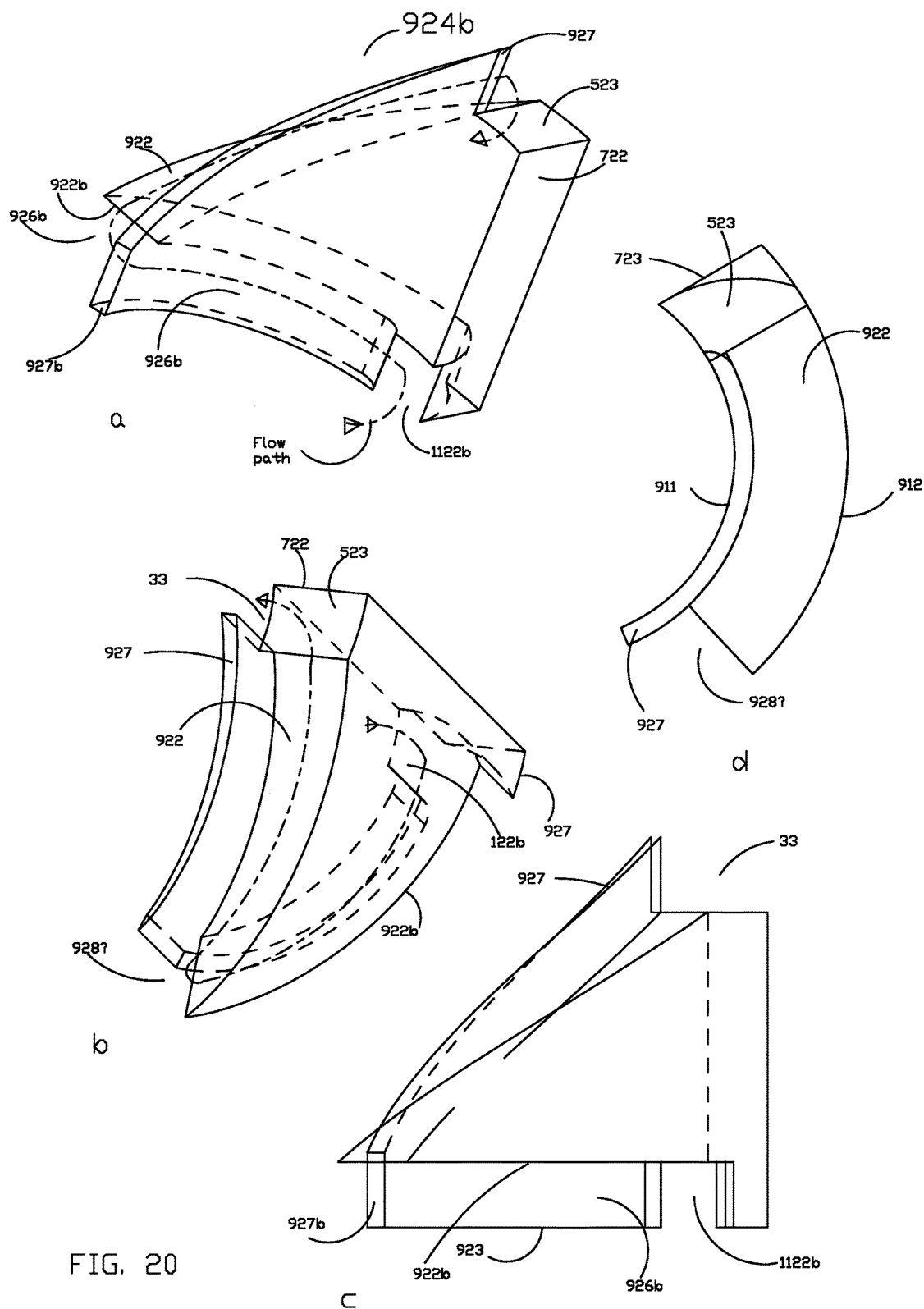
FIG. 20 a through FIG. 20d show various views of an insert (924b) having a channel (portion of the transfer passage) cut out in the bottom of the insert.
Figure 21:
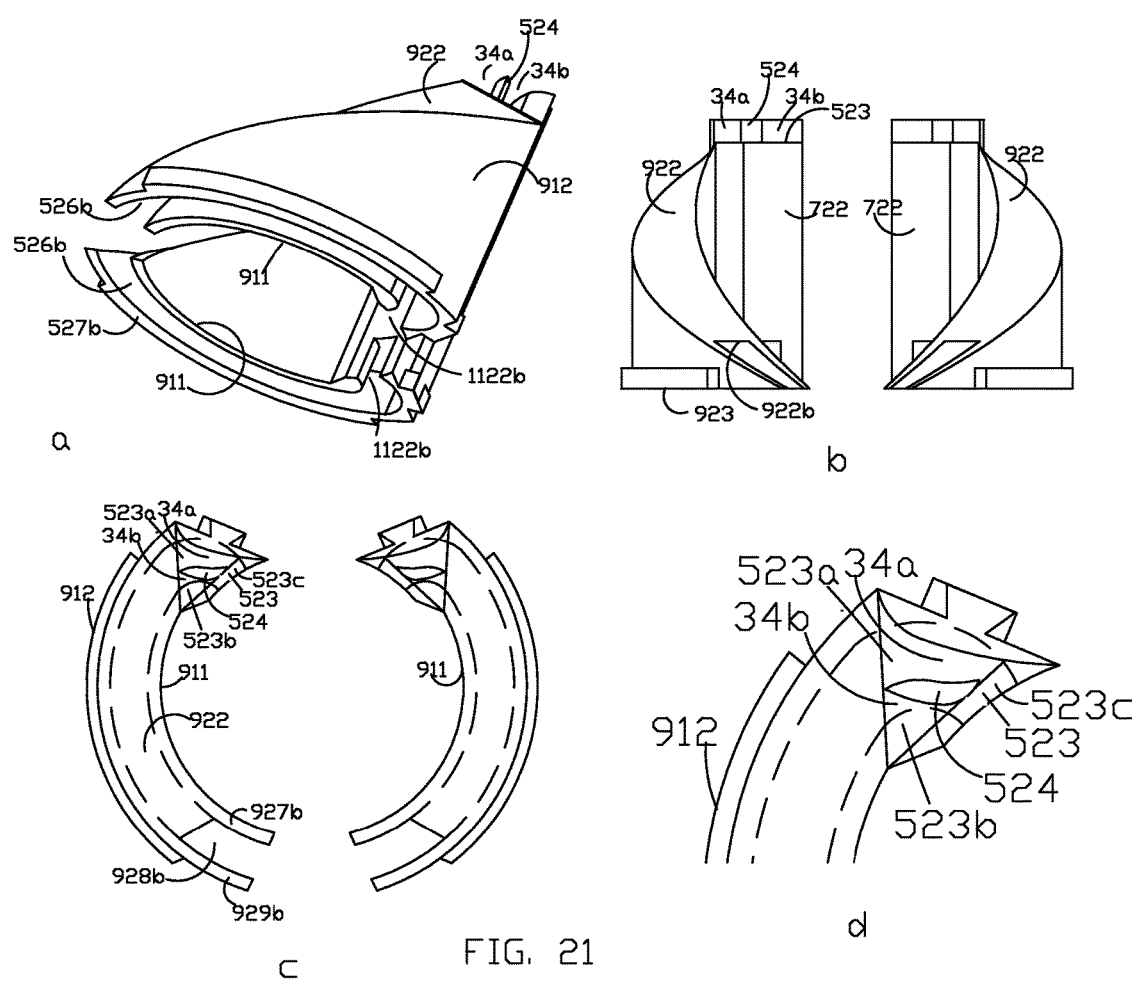

FIG. 20a through FIG. 20d show various views of inert 924b which is similar to the insert shown in FIGS. 17, 17b and 17d, but has a channel 926b which is a portion of the transfer passage 11. The purpose of the channel at the bottom is to lengthen the length of the transfer passage 11 in the cylinder section itself. Alternatively, as detailed in FIGS. 9 thru 14, in which a portion of the transfer passage is in the crankcase. The advantage with the having channel in the bottom of the insert is that crankcase can be of standard or conventional type. A shown in the FIG. 20, the crankcase end of the transfer passage opens into the crankcase at port 1122b and is in line with the transfer port 33. Therefore, the configuration shown in FIGS. 20 thru 22 show that the crankcase port 1122b and the transfer port 33 are geometrically similar to the conventional ports, but in the embodiment disclosed, the transfer passage is longer in length by virtue of the insert having a portion of the passage in the channel 926b. The channel is curved around the cylinder substantially concentric to the axis CL of the cylinder 14 and is in plane perpendicular to the axis CL of the cylinder. The channel 926b has an opening 1122b into the crankcase chamber 26 and the other end has an opening 928 connecting into the upper spiraling transfer passage 511a, which has at the other end a transfer port 33 opening in to the cylinder. The included angle between the port 1122b and the opening 928 is less than or equal to 180 degrees and more than at least 5 degrees. The channel 926b has a roof 922b on top, crankcase flange on the opposite side forming the floor, has a side wall 927b on the inner side toward the center of the cylinder in the case of insert 924b shown in FIG. 20, and the channel 926b may have another side wall 929b on the outer side as shown in FIG. 21. The intersection of the two channels 926b and the spiraling passage 511a may have a radius for smoother flow and serration to collect oil mist thrown out due to centrifugal force on the oil droplets. Therefore, in the embodiment disclose din FIGS. 20 thru 22, the entire transfer passage is in the cylinder block 14, and yet the length of the transfer passage is more than the normally achievable length in a conventional transfer passage. The advantage is that the longer transfer passage is packaged very compactly inside the cylinder block, rather than extend into the crankcase chamber, as in prior arts.

Figures 23, 24:
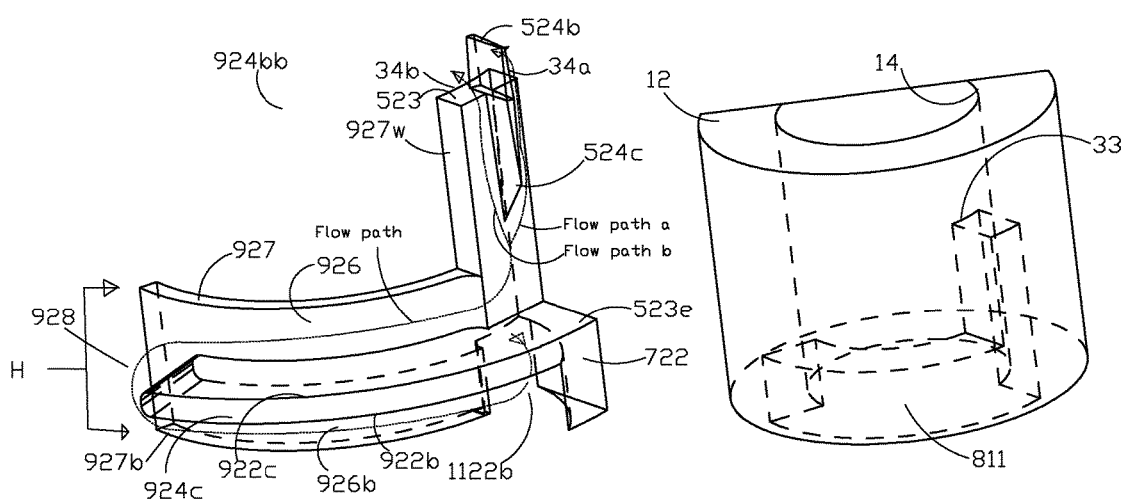
FIG. 23 shows the insert with two parallel and a vertical transfer passage
FIG. 24 shows a cylinder having a cavity to match the insert shown in FIG. 23.

Another distinct feature of the embodiment disclose din FIG. 21d is the divided transfer port. The transfer port 33 is divided into two separate exits into the cylinder, although they both have a common transfer passage 511a from the crankcase chamber up to the top face 523. A baffle 524, shown in FIG. 21, divides the exit of the transfer passage 511 at port 33 into two separate passages 34a and 34b and each has its own distinct profile to help direct flow of the air and air fuel mixture into the combustion chamber 30. Another advantage with the insert is that the face 523 can be cast or molded into complex multiple shapes, such has 523a, 523b, 523c, etc. Each can be at different angles to the horizontal plane. For example, face 523c may include upward, while 523b may have a sharp rise to induce swirl in the charge as it enters the combustion chamber 30. The features of the face and the passage may be such that the flow velocity is reduced to reduce the short circuit loss of the charge. The baffle 524 may have curved vertical faces to direct the flow appropriately to either act as a divergent diffuser or a convergent jet. The baffle 524 may extend in to the spiraling passage 511 up to the end 928 of the spiraling passage 511a where it connects with the channel 526b. The lower wall 927b may have a matching grove on the interface/flange 1336 of the upper crankcase 1314 to position and latch the insert into position. It must be noted that multiple zig-zag channels may be cut in the insert to increase the length of the transfer passage. FIG. 23 shows another embodiment of the insert having two horizontal channels 926 and 926b substantially parallel to each other and concentric to the axis Cl of the cylinder 14 separated by a partition wall 924c, having a floor 922c for the upper passage 926 and a roof 922b for the lower passage 926b, and the wall 924c is substantially horizontal and on a planes perpendicular to the axis CL of the cylinder 14. The two channels/passages 926 and 926b are connected at one end at 928 and the top passage 926 connects to a vertical portion 926v of the transfer passage 511, and the vertical portion may be divided into two separate passages by virtue of a baffle 524c extending partially down ward from the top of the transfer passage 926v and the port 33. The vertical section of the baffle 524c may have diverging cross sectional area or of any suitable shape and may extend as far down as necessary to optimize the flow of the medium into the combustion chamber 30. It is clear that the length of the vertical portion of the transfer passage 511 is shorter than the distance between the transfer port 33 and the crankcase port 1122b. However, the embodiment disclosed show that the total length of the transfer passage 511 includes length of the vertical portion 526v, plus length of the upper passage 926, plus the length of the lower passage 926b and is longer than the vertical distance between the transfer port 33 and the crankcase port 1122b. Alternative to having channels 926 and 926b one above the other, they can be concentric with two different radii in the same plane. The vector distance between the transition point 928 and the transfer port 33 may be optimized as needed. It also must be noted that the transfer port 33 and the crankcase port 1122 need not be on the same vertical line and instead be angularly off-set as needed. The advantage of the embodiment is that the contact area along the cylinder wall and the piston skirt is larger the and it supports the sliding piston from top to bottom stroke on all 360 degrees, unlike it is when the upper passage is spiraling. It is also be possible to have the channels vertically cast or molded in a parallel manner to increase the total length of the transfer passage. The advantage of the insert 924bb is that the height "H" of the cavity in the cylinder is less than the cavity shown for the inserts 924b and 522b. Secondly, the length of the transfer passage is more than the length of the transfer passage achievable in a conventional design, where the passage is straight running down from transfer port to the opening into the crankcase at the bottom of the passage. The insert can be either open type as in insert 924 or closed type as in insert 5229.

Various embodiments have been described in an illustrative manner. Each embodiment complement one another for optimum design and performance of a stratified engine for lowering the emissions. The transfer passage and the plate can also wrap around the crankshaft main bearing in the bearing boss, for example to overcome the limitations of the prior arts. It is to be understood that the terminology which has been used is intended to be in the nature of words of description rather than of limitation. While there have been described herein, exemplary embodiments, other modifications shall be apparent to those skilled in the art from the teachings herein and, it is, therefore, desired to be secured in the appended claims all such modifications as fall within the true spirit and scope of the described and contemplated embodiments.

LIST OF ELEMENTS

First port (air inlet port) (98)
Second port (charge inlet port) (84)
Third port (exhaust port) (50)
Fourth port (33a')
Fifth port (1122)
Sixth port (99a)
Seventh port (99b)
Eighth port (33a)
Ninth port (1123)
Tenth port (44)
Eleventh port (98c)
Twelfth port (33b)
Thirteenth port (33b')
Fourteenth (1123)
First transfer passage (11b')
Second transfer passage (11a')
First window (100a)
Second window (100b)
Piston insert (window) (900)
First piston insert (900a) for the first window (101a)
Second piston insert (900b) for the second window (100b)
Air channel insert (800)
End cap (34a)
Heat dam (402)
Partition wall (406)
Curvature (408)
Section of heat dam (404)
Cylinder portion of plate (228a and 229a)
Upper crankcase portion of plate (228c and 229c)
Lower crankcase portion of plate (22bc and 229b)
Interface (526)
Bottom end of cylinder (510)
Top section of the plate (528)
Air inlet passage (313)
Tubular duct (528)
Transfer passage inner walls (Wa, Wb, and Wc)
Cast wedge shape (Wv)
Flat face (634)
Radial face (636)
Engine block (1120)
Upper cylinder (1212)
Lower cylinder (1314)
Crankcase (1428)
Transfer passage in the interface/flange (1311b and 1311a)
Air port (1398)
Cylinder portion plate integral to lower cylinder (1328a and 1328B)
Port in the piston skirt (1698)
Crankshaft (22)
Crankshaft main bearing (1432)
Axis of the cylinder (Cl)
Axis of the crankshaft (19)
Dummy passage (196)
Deflector (97) (101a and 1010b)
Air channel (96, 96a, 96c)
Piston crown (16b)
Air channel wall (17a, 17b, 16c)
Spiraling transfer passage (511, 511a and 511b)
Cavity ceiling (822)
Spiraling insert floor (922)
Insert ramp (924)
Insert top face (523)
Insert block (722)
Insert edge (723)
Cylinder passage cavity (811)
Insert (5229)
Insert segment face (or inner wall) (911)
Insert outer wall (912)
Insert bottom (923)
Channel (926)
Inner side wall (927)
Outer wall (929)

The invention claimed is:

1. A two stroke engine (10) comprising:
   a) a hollow crankcase (28);
   b) a hollow cylinder (12) including a bore (14) opening at one end into the an opening of the crankcase, the cylinder including:
      at least one first port (98) for the admission of air; a second port (84) for the admission of a mixture of air and fuel; and a third port (50) for the expulsion of exhaust gasses;
   c) a piston (16) situated within the cylinder (12), in which:
      the piston (16) is free to move up and down along an axial dimension of the cylinder (12); and
      the piston (16) substantially fills a cross-sectional area of the cylinder (12) so as to substantially divide the volume of the cylinder into a combustion chamber (30) on one side of the piston and a crankcase chamber (26) on the other side of the piston;
   d) a piston pin (200) that is attached to the piston (16), in which the long axis of the pin lies substantially perpendicular to the direction of motion of the piston;
   e) a crankshaft (22) extending through the crank case (28);
   f) a crank web (21) attached at its center to the crankshaft;
   g) a connecting rod (18), in which one end of the connecting rod is attached to the piston pin (200) and the other end of the connecting rod (18) is attached to a the crank pin (20) on the crankweb (21); and
   h) an ignition source (1005) operable to supply ignition to the combustion chamber (30), in which the engine translates up and down motion of the piston (16) into a circular motion of the crankshaft (22) via the intermediation of connecting rod (18) and crank web (21);
   in which the hollow cylinder (12) has a cavity (811) having an outer wall (12w) and includes at least one spiraling transfer passage (511a) with at least one fourth port (33a') opening into the combustion chamber (30), and at least one fifth port (1122) opening into the crankcase chamber (26);
   a ramp ceiling (822) integral with the cylinder and in the transfer passage (511a); wherein the an insert (5229) having a spiraling floor (or top face) (922) and the cavity (811) constitute a closed spiraling transfer passage (511a), and the insert is supported by the hollow crankcase (28);
   the insert (5229) having an inner wall (911) and an outer wall (912) in which the outer wall (912) is on the outer wall (12w) of the cavity; and
   the fifth port (1122) is angularly and linearly positioned away from the fourth port (33a').

2. The two stroke engine of claim 1 wherein the insert (5229) of claim 1 is integral with the hollow crankcase (28).

3. The two stroke engine of claim 1 wherein the engine has more than one transfer passage (511a) each transfer passage comprising an insert (5229).

4. A two stroke engine (10) comprising:
   a) a hollow crankcase (28);
   b) a hollow cylinder (12) opening at one end into an opening of the crankcase, the cylinder including:
      at least one first port (98) on a bore (14) of the cylinder (12) for the admission of air;
      a second port (84) for the admission of a mixture of air and fuel; and
      a third port (50) for the expulsion of exhaust gasses:
   c) a piston (16) situated within the cylinder (12), in which:
   the piston (16) is free to move up and down along an axial dimension of the cylinder (12); and
   the piston (16) substantially fills a cross-sectional area of the cylinder (12) so as to substantially divide the volume of the cylinder into a combustion chamber (30) on one side of the piston and a crankcase chamber (26) on the other side of the piston;
   d) a piston pin (200) that is attached to the piston (16), in which the long axis of the pin lies substantially perpendicular to the direction of motion of the piston;
   e) a crankshaft (22) extending through the crank case (28);
   f) a crank web (21) attached at its center to the crankshaft;
   g) a connecting rod (18), in which one end of the connecting rod is attached to the piston pin (200) and the other end of the connecting rod (18) is attached to a crank pin (20) on the crank web (21); and
   h) an ignition source (1005) operable to supply ignition to the combustion chamber (30), in which the engine translates up and down motion of the piston (16) into a circular motion of the crankshaft (22) via the intermediation of connecting rod (18) and crank web (21);
   in which the hollow cylinder (12) has a cavity (811) on one side of the long axis of the piston pin (200) and another cavity (811) on the other side of the long axis of the piston pin (200) in conjunction with matching inserts forming transfer passages (11) with an eighth transfer port (33a) at a top end on one side of the long axis of the piston pin (200) opening into the combustion chamber (30) and a fourth transfer port (33a') at top end on the other side of the long axis of the piston pin (200) opening into the combustion chamber (30) and at least one crankcase port (1122) at a lower end opening into the crankcase chamber (26);
   in which the eighth transfer port (33a) a fourth transfer port (33a') and the crankcase port (1122) are not on the same vertical line on the bore (14);
   in which the cylinder (12) has a substantially straight cavity (611) that is plugged up to the eighth transfer port (33a) by one of the matching inserts which includes a substantially vertical insert block (722);
   in which the cavity (811) and straight cavity (611) have an outer wall (12w); and
   a ceiling (822) extending from a crankcase port (1122) to the transfer port (33a) in the cavity (811).

5. The two stroke engine (1100) of claim 4 or claim 1, further comprising:
   at least one first passage way (96) in the piston (16) defining a completely interior surface throughout the piston with a sixth port (99a) opening into a first window (100a) on one side of the long axis of the piston pin (200) and a seventh port (99b) opening into a second window (100b) on the other side of the long axis of the piston pin, such that at a given position of the piston (16), the sixth port (99a) interfaces to a one and only first (air inlet) port (98) and the seventh port (99b) interfaces to the fourth port (33 a') through the second cavity (100b) and the first window (100a) interfaces to the eighth port (33a);
   in which the an angle Alpha2 measured between the midpoint of the first port (98) on the bore (14) and the midpoint of the fourth port (33a') farthest from the first port (98) on the bore is greater than the an angle Alpha1 measured between the midpoint of the first port (98) on the bore (14) and the midpoint of the eighth port (33a) closest to the first port (98) on the bore (14) and the ratio between the angles Alpha2 and Alpha1 is at least 1.25 and the layout of an eighth transfer port (33a) and a fourth transfer port (33a') with respect to the first port (98) is asymmetrical; and in which the first passage way (96) in the piston (16) is substantially parallel to the pin (200) and gaseous communication between the first and second windows (100*a* and 100*b*) on either side of the pin (200) and has ambient air flowing intermittently through the first passage way (96) in the piston (16) in one direction from the sixth port (99*a*) to the seventh port (99*b*).

6. The two stroke engine of claim 5 wherein the first passage way (96) is a passage through the piston pin (200).

7. The two stroke engine of claim 5 wherein the first passage way (96) is a passage way above the piston pin (200) and in which top wall is the piston crown (16*b*).

8. The two stroke engine of claim 5 wherein the first Window (100*a*) has an outer wall (1030) which has an outward (convex) curvature.

9. The two stroke engine of claim 5 wherein the first passage way is located below the piston crown (16*b*) connecting the first and second windows (100*a* and 100*b*) and the first passage way (96) has a wall (16*c*) above the piston pin (200); and at least one or all of the first passage ways (96, 96*a*, or 96*c*) is/are transferring ambient air from one of the first and second windows located closer to the first port (98) to the other of the first and second windows farthest from the first port (98) in one direction only during at least a portion of the intake stroke and expansion stroke wherein the ambient air cools the piston (16).

10. The two-stroke engine of claim 5, wherein the piston further comprises:
a skirt 16*a*;
a piston crown 16*b*;
wherein the piston crown (16*b*) and the piston skirt (16*a*) are integral and have a piston boss for supporting the piston pin (200);
wherein the first passage way (96) is off-set from the pin (200)
wherein the sixth port (99*a*) is connected with the first window (100*a*) and the seventh port (99*b*) is connected with the second window (100*b*) and the first passage way (96) is substantially parallel to the pin (200);
wherein the first passage way (96) is the shortest distance between the first and second windows (100*a* and 100*b*) on either side of the pin (200) and has ambient air flowing intermittently through the first passage way (96) in the piston (16) from the sixth port (99*a*) to the seventh port (99*b*).

11. The two-stroke engine of claim 5, wherein the piston further comprises:
a sealed dummy passage (196) parallel to the first air passage (96) and a piston skirt on the side closer to the exhaust port 50 forming a wall on one side and another wall (196*a*) closer to the pin 200, and a piston crown (16*b*) forming another wall at the top, wherein the wall 196*a* has a recess in the mid section for the connecting rod 18; and
wherein the dummy passage is a dead trapped volume entirely inside the piston to reduce the volume of the crankcase chamber.

12. The two stroke engine of claim 5 wherein the piston further comprises:
a piston skirt (16*a*);
a piston crown (16*b*);
wherein the piston crown (16*b*) and the piston skirt (16*a*) are integral and have a piston boss for the piston pin 200;
wherein the first passage way (96) is substantially parallel to the pin (200) and has the shortest distance between the first and second windows (100*a* and 100*b*) on either sides of the pin (200) and has ambient air flowing intermittently through the first passage way (96) in the piston (16) in one direction only from the sixth port (99*a*) to the seventh port (99*b*);
wherein the piston (16) further comprises:
a sealed dummy passage (196) parallel to the first passage way (96)
wherein the piston skirt is located on the side closer to the exhaust port (50) forming a wall on one side and another wall (196*a*) closer to the pin 200, and the piston crown (16*b*) forms another wall at the top, and the another wall (196*a*) has a recess in the mid section for the connecting rod 18; and
wherein the dummy passage is a dead trapped volume entirely inside the piston to reduce the volume of the crankcase chamber.

13. The two stroke engine of claim 5 wherein the first passage way (96) is a separate tube (96*t*) inserted in the piston (16).

14. The two stroke engine of claim 13 wherein the first passage way (96) has a deflector (97) at the inlet side of the first passage way (96).

15. The two stroke engine of claim 4 wherein the crankcase (26) further comprises:
at least one fourteenth port (1122) opening into the crankcase chamber (26) on other side of the long axis of the pin (200), a portion of a transfer passage (11*a*) is in the crankcase (26) as a channel (11*aa*) having a curvature significantly concentric to the a curvature (R1) of the crank web (21) and;
wherein the channel (11*aa*) in the crankcase has a first lid (228*a*) which has a radius (R2) significantly concentric to radius (R1) of the crank web (21), and one end of the first lid (228*a*) is attached to the a bottom end of the cylinder bore (14) and the other end of the first lid (228*a*) is sandwiched at mating surfaces (13, 526) between the cylinder (12) and the crankcase (26), the channel (11*aa*) has a second lid (228*b*) which has a radius (R2) significantly similar to radius (R1) of the crank web, and one end of the second lid (228*b*) is sandwiched at the interface attached to the bottom end of the bore (14) on the right side of the long axis (19) of the crank shaft and the other end of the second lid (228*b*) is sandwiched at the mating surfaces (13, 526) between the cylinder (12) and the crankcase (26) on the left side of the long axis (19) of the crankshaft.

16. The two stroke engine of claim 4 wherein each insert is a plate having a radius greater than a radius of a bore of the cylinder,
wherein each plate covers a respective transfer passage in the cylinder and an upper crankcase portion of each plate covers the respective transfer passage in the cylinder and an upper crankcase portion of each plate covers the respective transfer passage in an upper section of the crankcase and a lower crankcase portion of each plate covers the respective transfer passage in a lower section of the crankcase;
wherein the lower crankcase portion has a lower crankcase port;
wherein the upper crankcase portion and lower crankcase portion of each plate have a radius greater than radius of the crank web (24); and
wherein the cylinder portion and upper and the lower crankcase portions of each plate are integral (one piece) and supported by the lower crankcase (28) section and not supported by a main bearing of the crankshaft.

17. The two stroke engine of claim 16 wherein each plate has a curvature in a portion located in the upper portion of the cylinder portion of the plate (530) and a straight face in a portion located in the cylinder portion of the plate below the curvature face.

18. The two stroke engine of claim 4 wherein the cylinder further comprises:
- a cylinder portion (228*a*) of a plate (528 or 529 or 530) covering the transfer passage in the cylinder block (12) and an upper crankcase portion (228*c* or 229*c*) of the plate (528 or 529 or 530) covers the transfer passage in the upper crankcase;
- in which the upper crankcase portion (228*c* or 229*c*) of the plate has a radius greater than a radius of the crank web (21);
- in which the upper crankcase portion (228*c* or 229*c*) of the plate (528 or 529) is concentric to the axis (19) of the crankshaft (22); and
- in which cylinder portion (228*a*) of the plate and upper crankcase portion (228*b*) of the plate are integral (one piece) and the plate is supported by a lower section of the crankcase (28) and not supported by the a main bearing of the crankshaft.

\* \* \* \* \*